United States Patent [19]
Long

[11] Patent Number: 6,020,899
[45] Date of Patent: *Feb. 1, 2000

[54] SYSTEM FOR VIEWING THE STRUCTURE OF COMPUTER GRAPHICAL ELEMENTS

[75] Inventor: Timothy Merrick Long, New South Wales, Australia

[73] Assignees: Canon Kabushiki Kaisha, Tokyo, Japan; Canon Information Systems Research Austrailia Pty Ltd., New South Wales, Australia

[ * ] Notice: This patent issued on a continued prosecution application filed under 37 CFR 1.53(d), and is subject to the twenty year patent term provisions of 35 U.S.C. 154(a)(2).

[21] Appl. No.: 08/664,331

[22] Filed: Jun. 14, 1996

[30] Foreign Application Priority Data

Jun. 16, 1995 [AU] Australia ................................. PN3603

[51] Int. Cl.⁷ ..................................................... G06F 15/00
[52] U.S. Cl. ............................................................ 345/440
[58] Field of Search ..................................... 345/440, 441, 345/443, 133, 134

[56] References Cited

U.S. PATENT DOCUMENTS

| | | | |
|---|---|---|---|
| 5,016,183 | 5/1991 | Shyong | 364/470 |
| 5,321,811 | 6/1994 | Kato et al. | 345/520 |

FOREIGN PATENT DOCUMENTS

WO 95/29463  11/1995  WIPO .

OTHER PUBLICATIONS

Micrografx Draw Plus, Using Draw Plus, Chapter Six, pp. 6–1 to 6–10, (1990).

James D. Foley, et al., Computer Graphics: Principles and Practice, Second Edition, Addison–Wesley Publishing Co., 1987, pp. 347–469.

*Primary Examiner*—Phu K. Nguyen
*Attorney, Agent, or Firm*—Fitzpatrick, Cella, Harper & Scinto

[57] ABSTRACT

The present invention provides a method and apparatus for displaying a grouped structure (23) in a computer graphics image. This involves providing at least one selection tag (18) for the grouped structure. A group display mode is used so that, when a selection tar (18) of the grouped structure is selected, portions (25,26) of the structure of the group structured are determined. The portions (25,26) of the structure of the grouped structure (23) are then displayed. Preferably, the displayed portions (25,26) initially comprise a top level portion (25) of the grouped structure (23). This further involves displaying further levels (26) of the grouped structure (23). Preferably, the displayed portions of the structure are displayed in a tree format. Optionally, the tree format includes nodes (25,26) denoting part of the grouped structure (23). This involves providing means for selecting a current node (26) within the tree format and displaying at least the child nodes (27,28), if any, of the current node (26), upon selection of the current node (26). Optionally, a subportion of the displayed portions of the structure can be selected and interactive access can be provided to the selected sub-portion.

27 Claims, 11 Drawing Sheets

SYSTEM FOR VIEWING THE STRUCTURE OF COMPUTER GRAPHICAL ELEMENTS

FIELD OF THE INVENTION

The present invention relates to the construction or creation of computer graphics images and, more particularly, provides a simplified form of visualising the interrelationships between elements or objects contained in an image created using a computer graphics applications package.

BACKGROUND OF THE INVENTION

With the pace of advancement of computers, computer systems including software application packages for the creation of full color computer images of substantial complexity are becoming ever more prevalent. The complexity of the images created is also increasing so that created images made up of hundreds, or even thousands of separate objects are common.

The human creator of such a complex image often relies on a hierarchical, or top-down, approach to deal with the complexity of the image. In this respect, "grouping" operations well know to those skilled in the art of creating complex computer graphics are used to treat a group of objects as a single entity for copying, moving, resealing, or other complex operations.

As the complexity of an image increases, the complexity of the hierarchy of interrelated objects also increases. Often the creator of an image wishes to access a certain object or group of objects within the hierarchy. However, these objects can be either partially or fully obscured by other objects and can form part of a large collection of different groups of objects. Thus, even if a given object has a certain number of associated control points, as is normal in the art, it is unlikely that a particular object can be selected within a large complex hierarchy of objects. This is particularly the case where the object to be selected or chanced is "buried" deep within the hierarchy with other objects also overlapping the current object.

At the very least, a considerable disadvantage of the prior art resides in the substantial frustration and annoyance experienced by the creator in having to move and "ungroup" a substantial number of objects within the hierarchy merely to alter the characteristics of one of those objects. Further, another disadvantage arises because the particular groupings are often of great importance and cannot be readily recovered once an ungrouping operation has been performed.

SUMMARY OF THE INVENTION

It is an object of the present invention to provide a system for simply and efficiently dealing with images having a substantial number of objects which are interrelated in a complex manner and to overcome one or more disadvantages of the prior art.

In accordance with a first aspect of the present invention, there is provided a method for displaying a grouped structure in a computer graphics image, the method comprising:

providing at least one selection tag for the grouped structure;

utilising a group display mode such that, when a selection tag of the grouped structure is selected in the group display mode, portions of the structure of the grouped structure are determined; and displaying the portions of the structure of the grouped structure.

In accordance with a second aspect of the invention, there is provided an apparatus for displaying a grouped structure in a computer graphics image, comprising:

means for providing at least one selection tag for the grouped structure;

means for providing a group display mode and for determining portions of the structure of the grouped structure in response to selection of a selection tag of the grouped structure in the group display mode; and means for displaying the portions of the structure of the grouped structures, wherein the display means is coupled to the group display mode means.

BRIEF DESCRIPTION OF THE DRAWINGS

The embodiments of the invention will now be described with reference to the accompanying drawings, in which.

DETAILED DESCRIPTION

Embodiments of the invention will now be described with reference to FIGS. 1 to 15. In particular, a method and apparatus according to the preferred embodiment is provided for producing a "tree-view" on demand of a group structure in a computer graphics image when required by a user. The method and apparatus facilitate control over the complexity of the hierarchical ordering of the objects in an image. This enables a user to interrogate the structure of a given image and individually access the objects within it.

Figure 12:
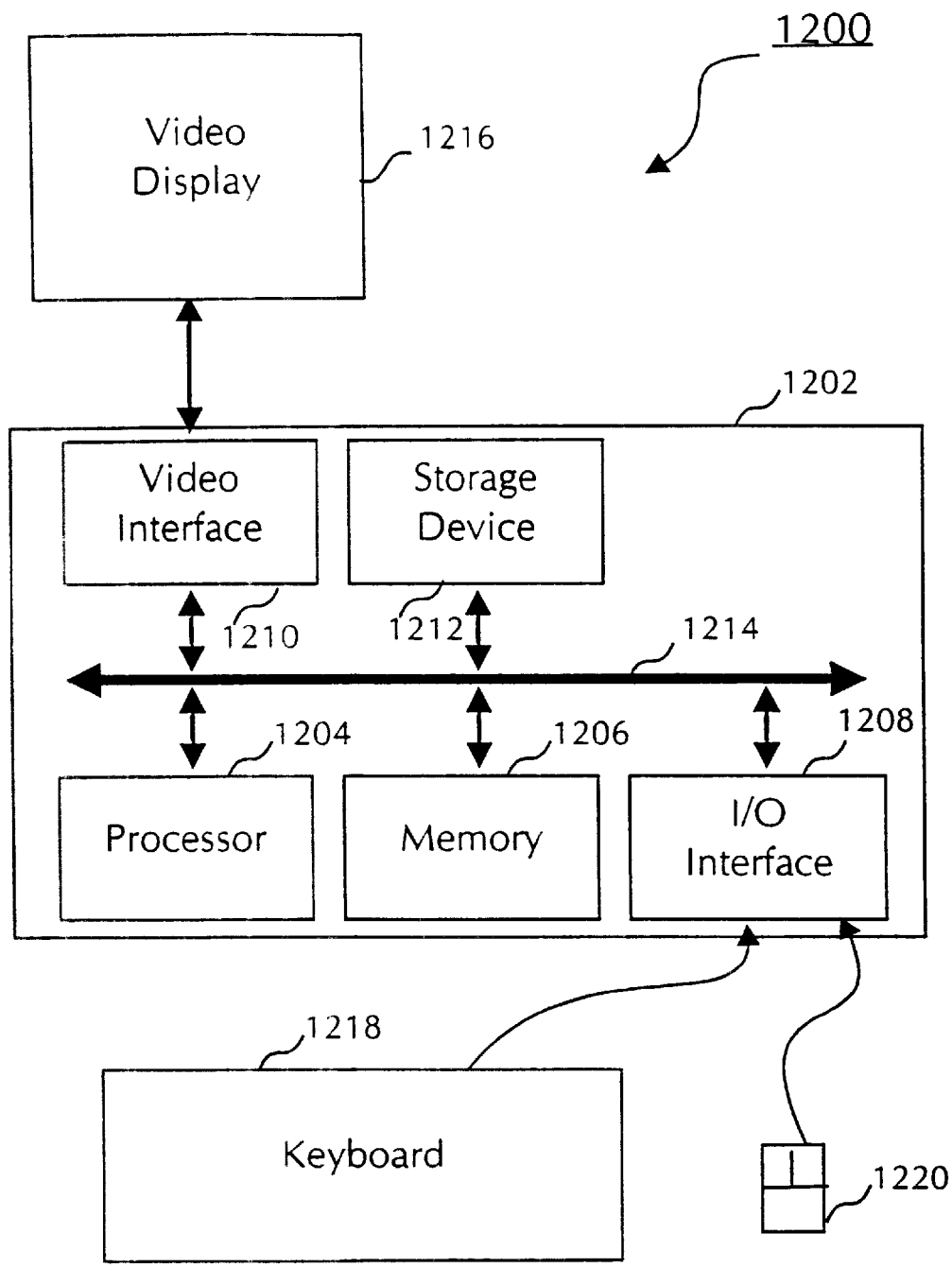
FIG. 12 is a block diagram of a general purpose computer with which the preferred embodiment can be implemented.

In accordance with the preferred embodiment, the system can be practiced using a conventional general purpose computer such as the one shown in FIG. 12. The computer system 1200 consists of the computer 1202, a video display 1216, and input devices 1218, 1220. In addition, the computer 1200 system can also have any of a number of other output devices including line printers, laser printers, plotters, and other reproduction devices connected to the computer 1202. The computer system 1200 can be connected to one or more other computers using an appropriate communication channel such as a modem communications path, a computer network, or the like.

The computer 1202 itself consists of a central processing unit(s) (simply referred to as a processor hereinafter) 1204, a memory 1206 which can include random access memory (RAM) and read-only memory (ROM), an input/output (IO) interface 1208, a video interface 1210, and one or more storage devices generally represented by a block 1212 in FIG. 12. The storage device(s) 1212 can consist of one or more of the following: a floppy disc, a hard disc drive, a magneto-optical disc drive, CD-ROM or any other of a number of non-volatile storage devices well known to those skilled in the art. Each of the components 1204 to 1212 is typically connected to one or more of the other devices via a bus 1214 that in turn can consist of data, address, and control buses.

The video interface 1210 is connected to the video display 1216 and provides video signals from the computer 1202 for display on the video display 1216. User input to operate the computer 1202 can be provided for one or more input devices. A user can use the keyboard 1218 and/or a pointing device such as the mouse 1220 to provide input to the computer 1202. The input devices 1218, 1220 are further described below in relation to the preferred embodiment.

The system for viewing the structure of computer graphical elements according to the preferred embodiment is preferably implemented using a general purpose computer, such as computer system 1200 of FIG. 12. Operation of the system is now described with reference to FIGS. 13 to 15.

Figure 13:
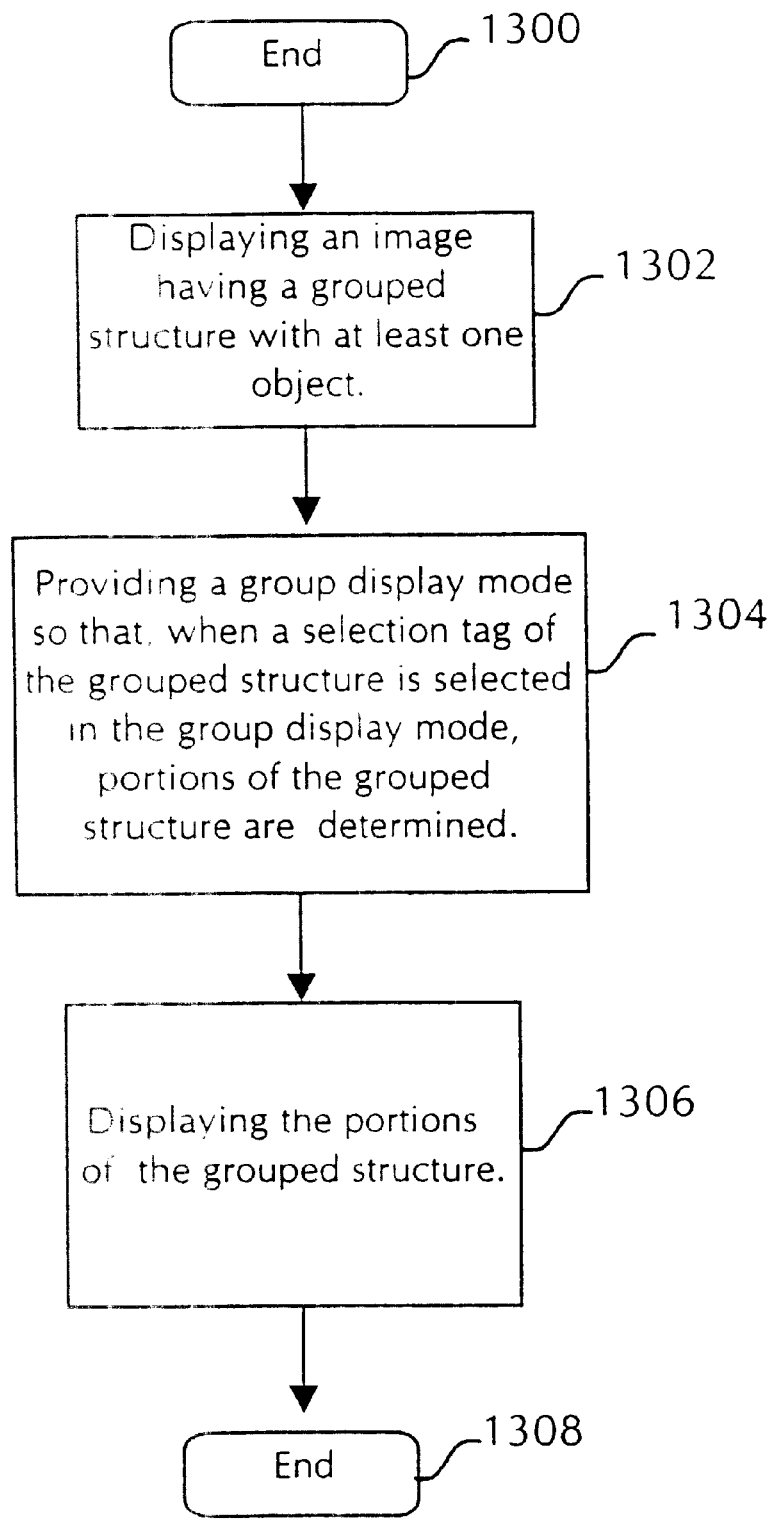
FIG. 13 is a flow diagram illustrating the method according to the preferred embodiment.

In FIG. 13, processing begins at step 1300. In step 1302, an image is displayed having a group structure, where the image has at least one object within the group. In step 1304, the system provides a group display mode for displaying portions of the group structure. When a selection tag of the grouped structure is selected in the group display mode, portions of the structure of the grouped structure are determined. The selection tag is selected by a user operating an input device 1218, 1220, which is preferably the mouse 1220. The selection tag of the group structure is displayed on the video display 1216 by the computer 1202. In step 1308, processing stops.

Figure 14:
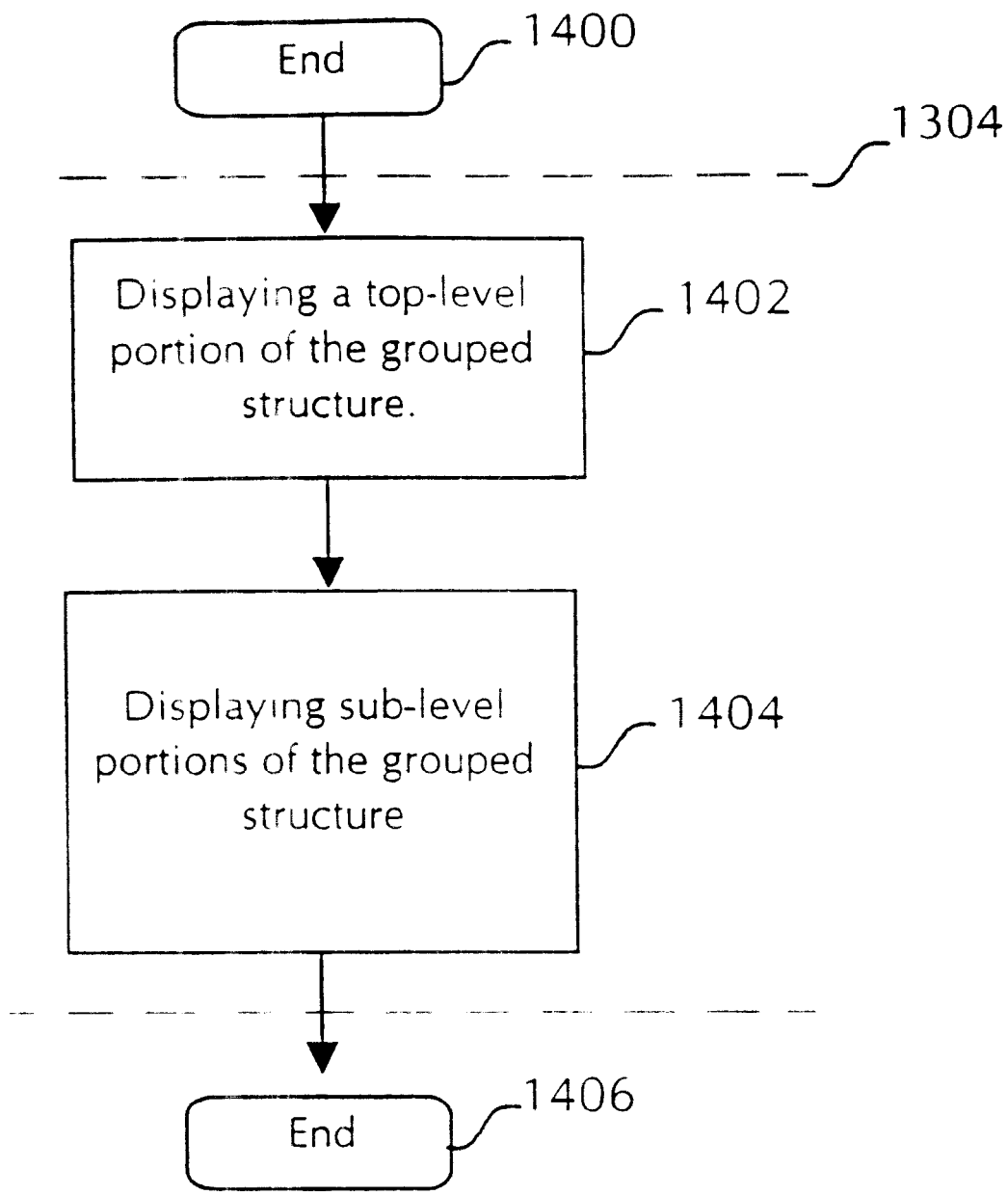
FIG. 14 is a detailed flow diagram illustrating a number of steps that can be practiced in step 1304 of FIG. 13.

Preferably, step 1304 of FIG. 13 comprises two further sub-steps, as shown in FIG. 14 and indicated by dashed lines. In step 1402, a top-level portion of the group structure is displayed on the video display 1216 by the computer 1202. In step 1404, one or more sub-level portions of the group structure can be displayed on the video display 1216.

Figure 15:
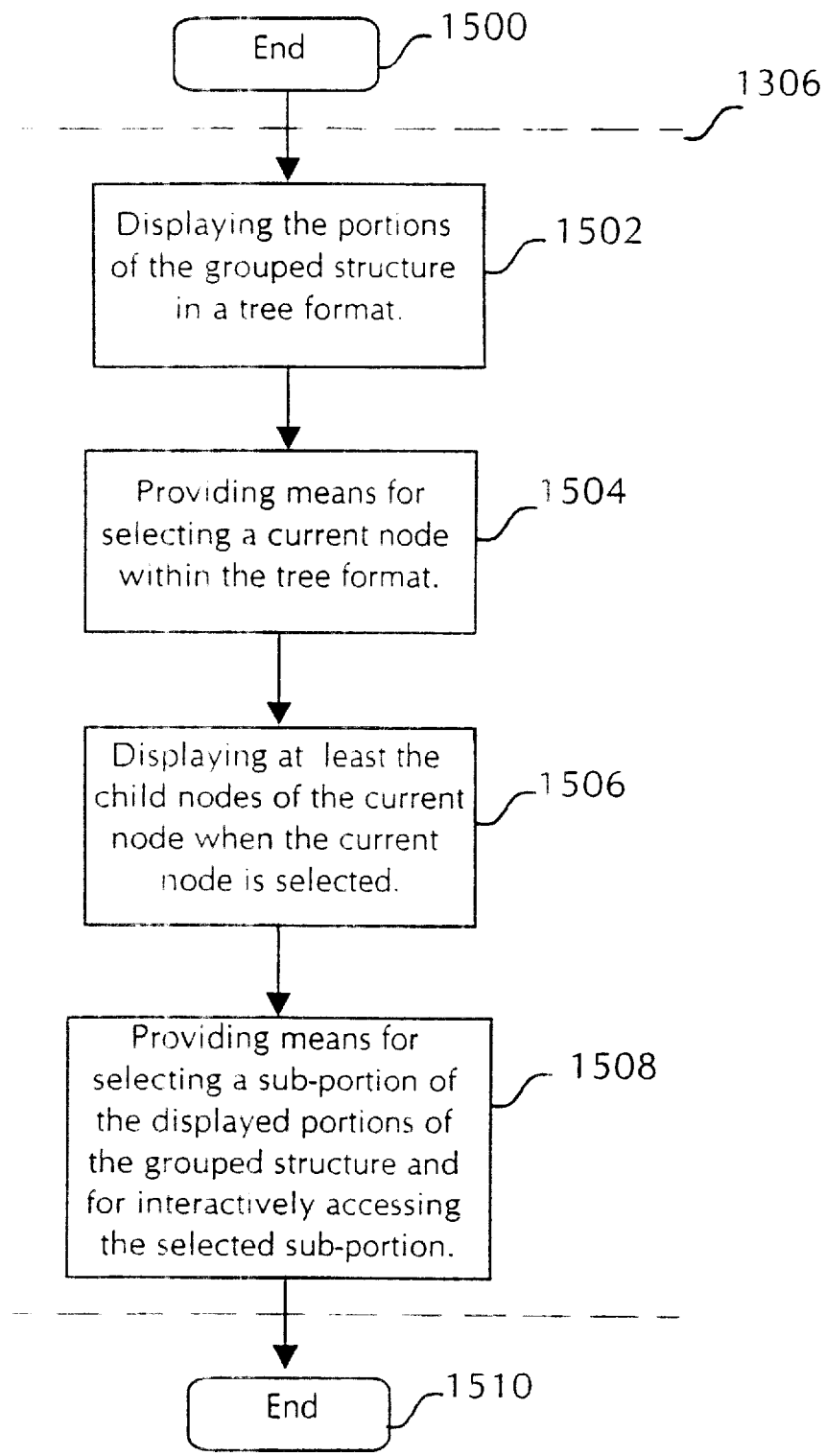
FIG. 15 is a detailed flow diagram illustrating a number of steps that can be practiced in step 1306 of FIG. 13.

FIG. 15 is a detailed flow diagram illustrating a number of steps that can be practiced as part of step 1306 of FIG. 13. In step 1502, the portions of the group structure are displayed in a tree format. In step 1504, means for selecting a current node within the tree format is provided. Optionally, in step 1506, the child nodes of the current node are displayed when the current node is selected. Optionally, in step 1508, means for selecting a sub-portion of the displayed portions of the group structure and for interactively accessing the selected sub-portion are provided.

The method and apparatus in accordance with the preferred embodiment shown in FIGS. 12 to 15 will now be described by way of a number of examples shown in FIGS. 1 to 11.

Figure 1:
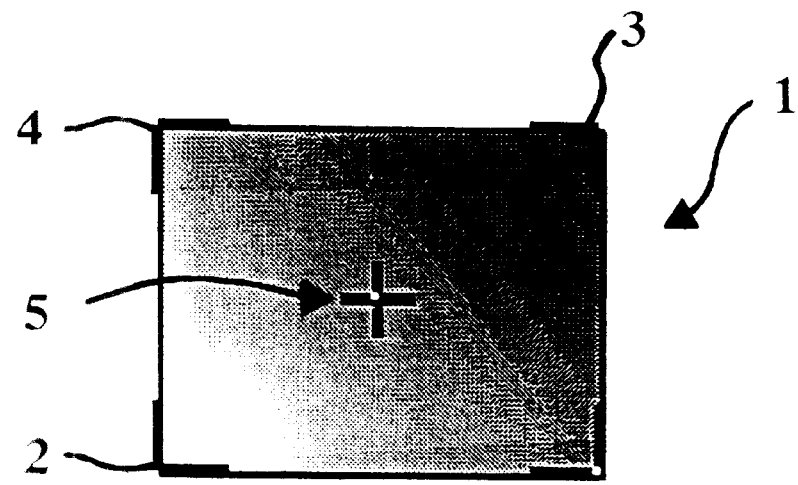
FIG. 1 illustrates an object drawn utilising a computer graphics package.

FIG. 1 illustrates a square 1 having a blend from white to black which gradually increases from, white in the bottom, left-had corner 2 to black in the top, right-hand corner 3. The square 1 has the usual control points 4 at each corner in addition to central control point 3 indicated by a cross. The control points 4,5 allow for the manipulation of the square 1 in the usual manner. A more detailed discussion of conventional control point techniques can be found in a standard text in the field (e.g. see Foley, James D. et al. *Computer Graphics: Principles and Practice*, Addison-Wesley Publishing Company Inc., Reading, Mass. 1990, Chapters 8 to 10).

The method and apparatus according to the preferred embodiment provides a tree-view as a mode of operation of a computer graphics, application. Once this mode is set, an interactive input device, such as "mouse" or the like, 1220 can be utilised to select one of the control points 4,5. Upon selection of the object 1, a "tree-view" or the hierarchical structure of the object is immediately illustrated over the object 1.

Figure 2:
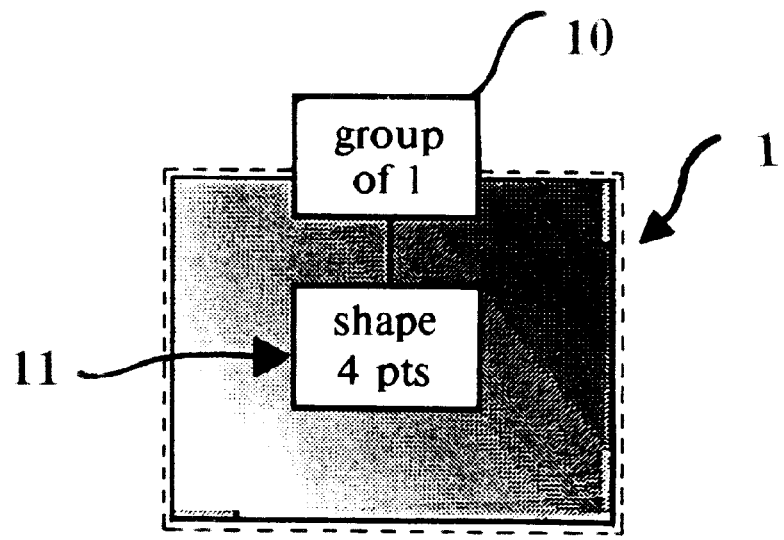
FIG. 2 illustrates a "tree-view" of the object of FIG. 1 according to the preferred embodiment.

FIG. 2 illustrates a corresponding tree view of the object 1 having nodes 10 and 11 when the central control point 5 is selected in tree-viewing mode. The two nodes 10,11 of the tree-view show information relevant to the hierarchical structure of the selected element 1. In this example, the node 10 indicates that the object 1, which exists by itself, is in a group having one element. The node 11 also informs the user that the object 1 has four corner control points 4 that can be manipulated. While the following embodiments will be described in terms of four or five control points, it will be apparent to a person skilled in the art that the system can be practised with other numbers of control points without departing from the scope and spirit of the invention.

The preferred embodiment will now be described with reference to a graphics application package that allows for grouping together of objects in the conventional manner, well known to those skilled in the art. For example, in FIG. 3, two objects 16,17 are shown having the same form as the object 1 of FIG. 1. The object 17 has been produced from the object 1 using conventional copy and paste operations. The two objects 16,17 have also been conventionally grouped together to form a grouped object 23, generally indicated by dashed lines. Five group control points 18 to 22 have also been provided for the manipulation of the overall group structure 23.

Figure 3:
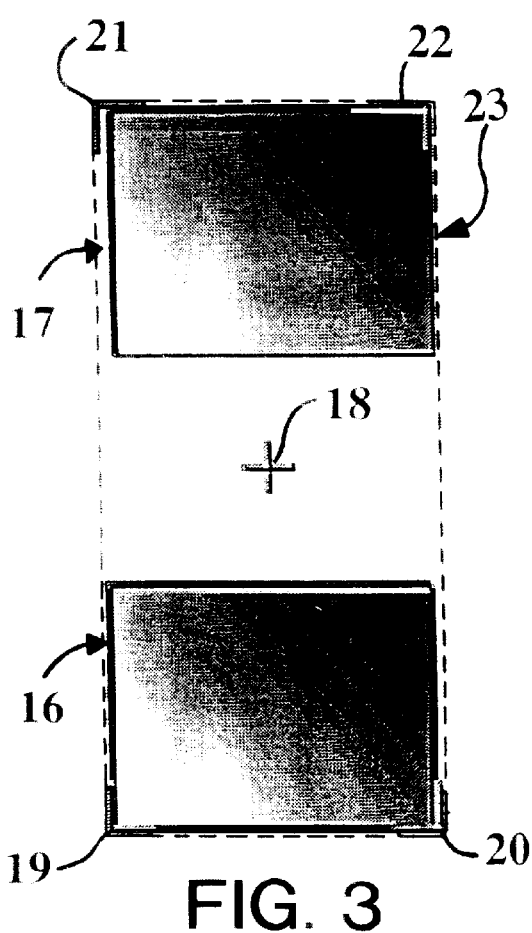
FIG. 3 illustrates two objects constructed in accordance with FIG. 1 and grouped together.
Figure 4:
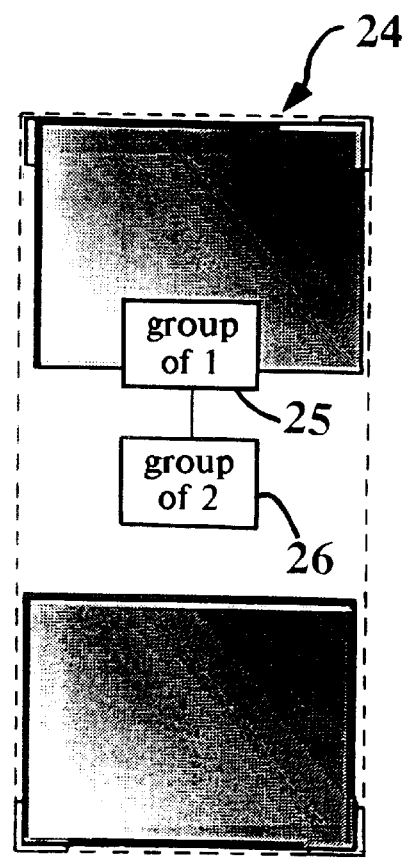
FIGS. 4 and 5 illustrate various tree-views of the grouped structure of FIG. 3.

FIG. 4 illustrates an initial tree-view 24 in accordance with the preferred embodiment that includes nodes 25,26 describing the structure of the group 23 of FIG. 3. The node 25, being the roof node of the tree-view, is used to inform the user that the group 23 is grouped together, Node 26 informs the user that the group 23 comprises two sub-elements or groups.

Figure 5:
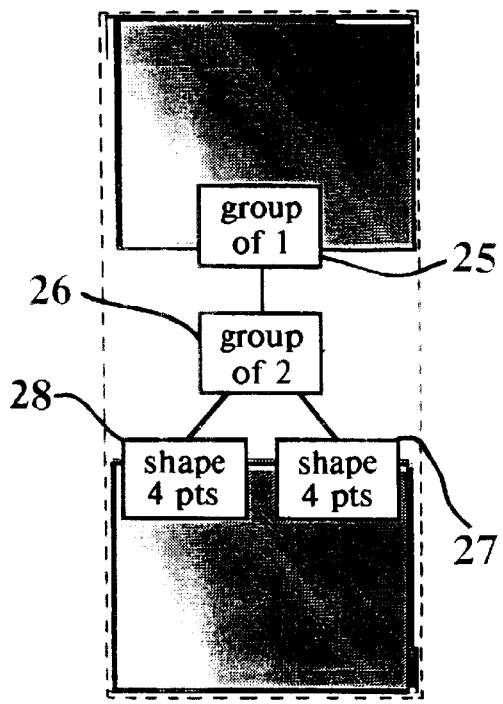

In tree-viewing mode, when the node 26 is selected by the user using an interactive pointing device 1220, the displayed presentation of FIG. 4 is transformed into the displayed presentation of FIG. 5. In the latter view, a further level of the "tree" indicated by a node 26 shows more detail of the structure of the overall object 23 of FIG. 3. In particular, two further nodes 27,28 show that the two squares 16,17 in the group 23 of FIG. 3 each have four independent control points.

Figure 6:
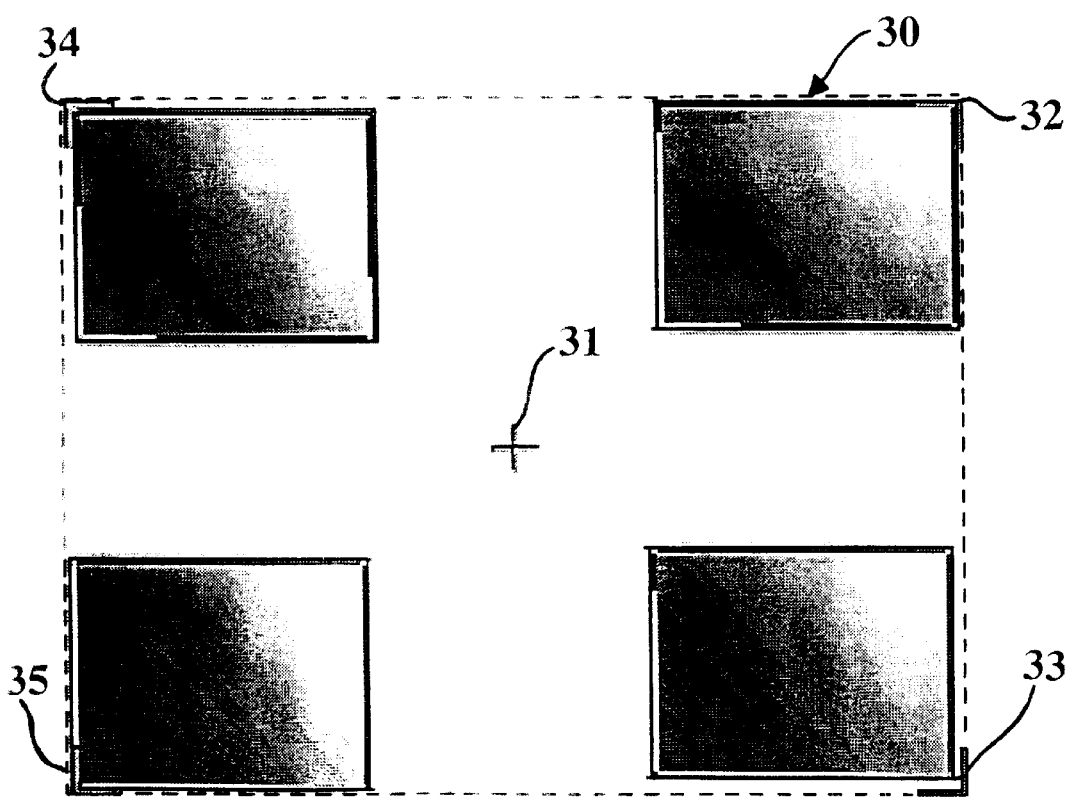
FIG. 6 illustrates two objects constructed in accordance with FIG. 3 which have been grouped together.

FIG. 6 illustrates two copies of the object 23 of FIG. 3 which have been grouped together to form a grouped object 30. This grouped object 30 can be easily produced by copying and pasting the object 23 of FIG. 3 and subsequently grouping the two objects together. Upon grouping, the object 30 is displayed with five control points 31 to 35.

Figure 7:
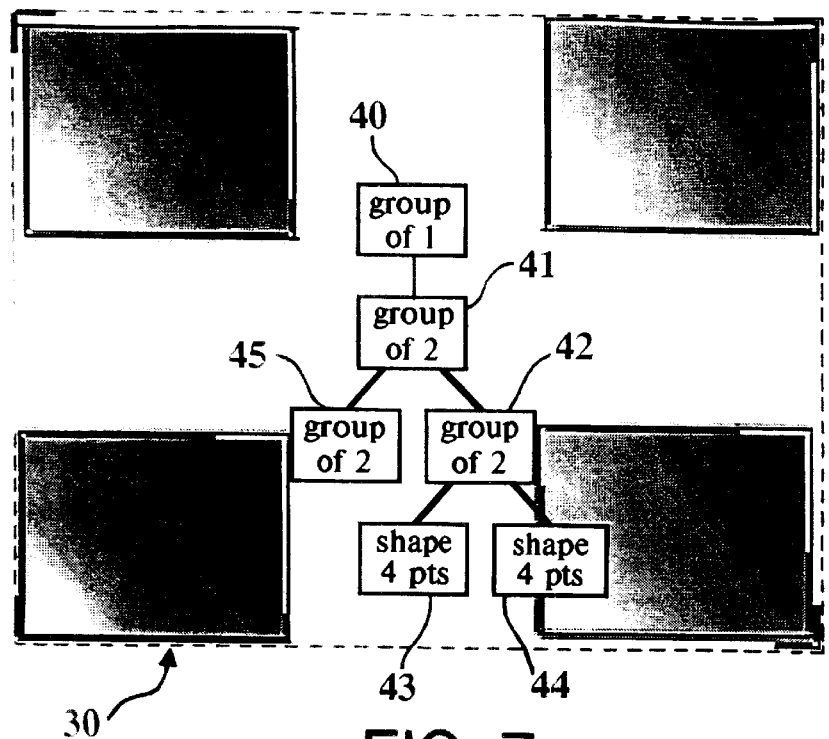
FIGS. 7 and 8 illustrate various tree-views of the object of FIG. 6.

FIG. 7 illustrates a tree-view of the object 30 of FIG. 6 when the control point 31 is chosen in tree-view mode. Initially, only the highest nodes 40 and 41 in the hierarchy are illustrated. However, when node 41 is selected using the interactive pointing device, nodes 42 and 45 appear in the tree-view mode. Further, upon selection of the node 42, nodes 43 and 44 appear in the tree-view mode. By the process of node selection, the user of the tree-view system is able to determine the level to which the tree is displayed using the interactive pointing device 1220.

Figure 8:
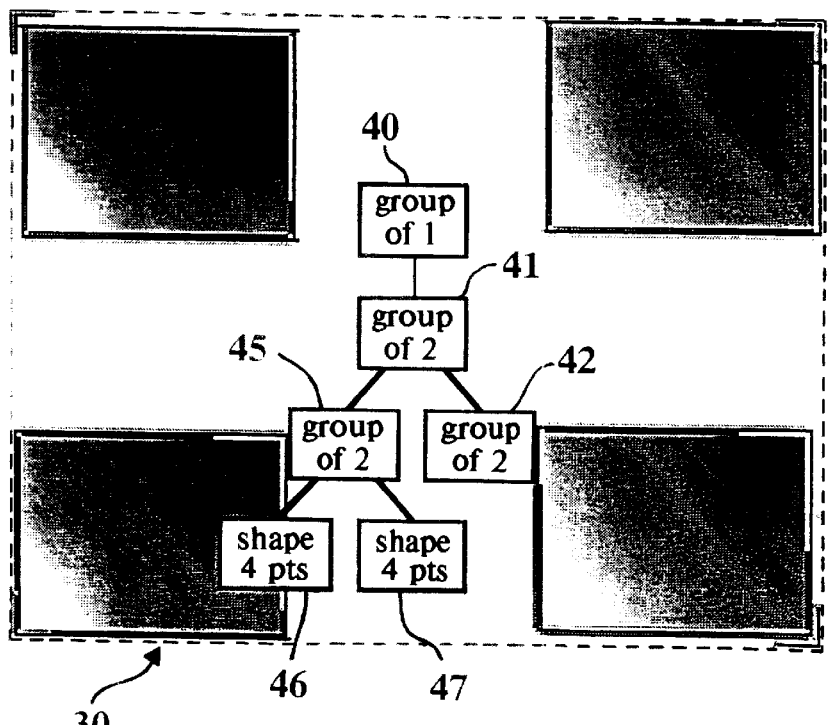

When the node 45 is selected instead of node 42, the tree-view of FIG. 7 is transformed to be that shown in FIG. 8. In FIG. 8, the sub-tree nodes of the node 42 have been removed and the sub-tree nodes 46,47 of the selected node 45 are shown. The preferable displaying of only one set of child nodes 42 and 45 results in an increase in the clarity and the ease of operation of the tree-view system.

Figure 9:
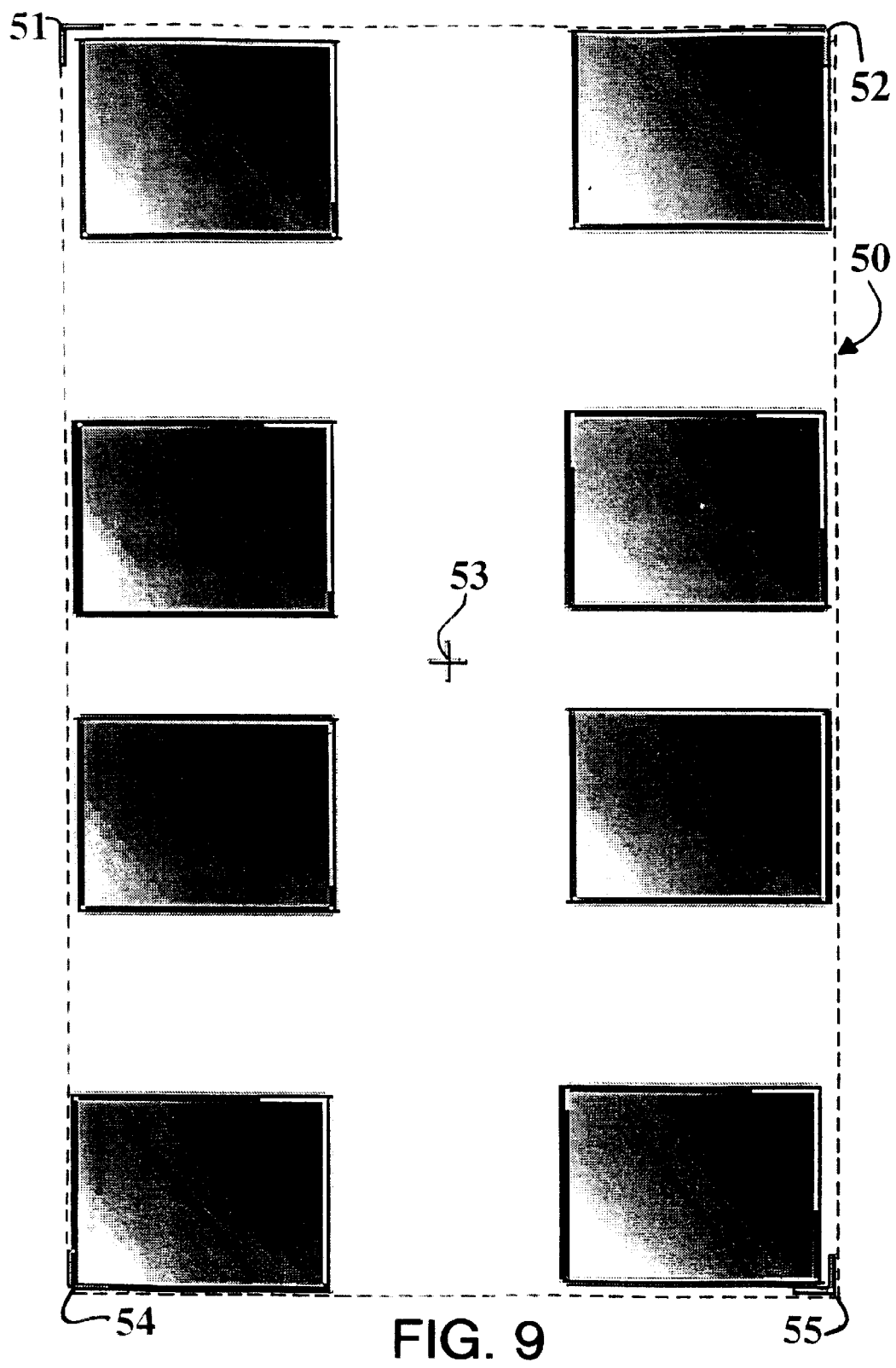
FIG. 9 illustrates an object constructed from two objects constructed in accordance with FIG. 6.

FIG. 9 illustrates an object 50 comprising two of the objects 30 of FIG. 6, which are placed beside one another and grouped together in the conventional manner. The resulting object 50 has five control points 51 to 55 for the selection and/or modification thereto.

Figure 10:
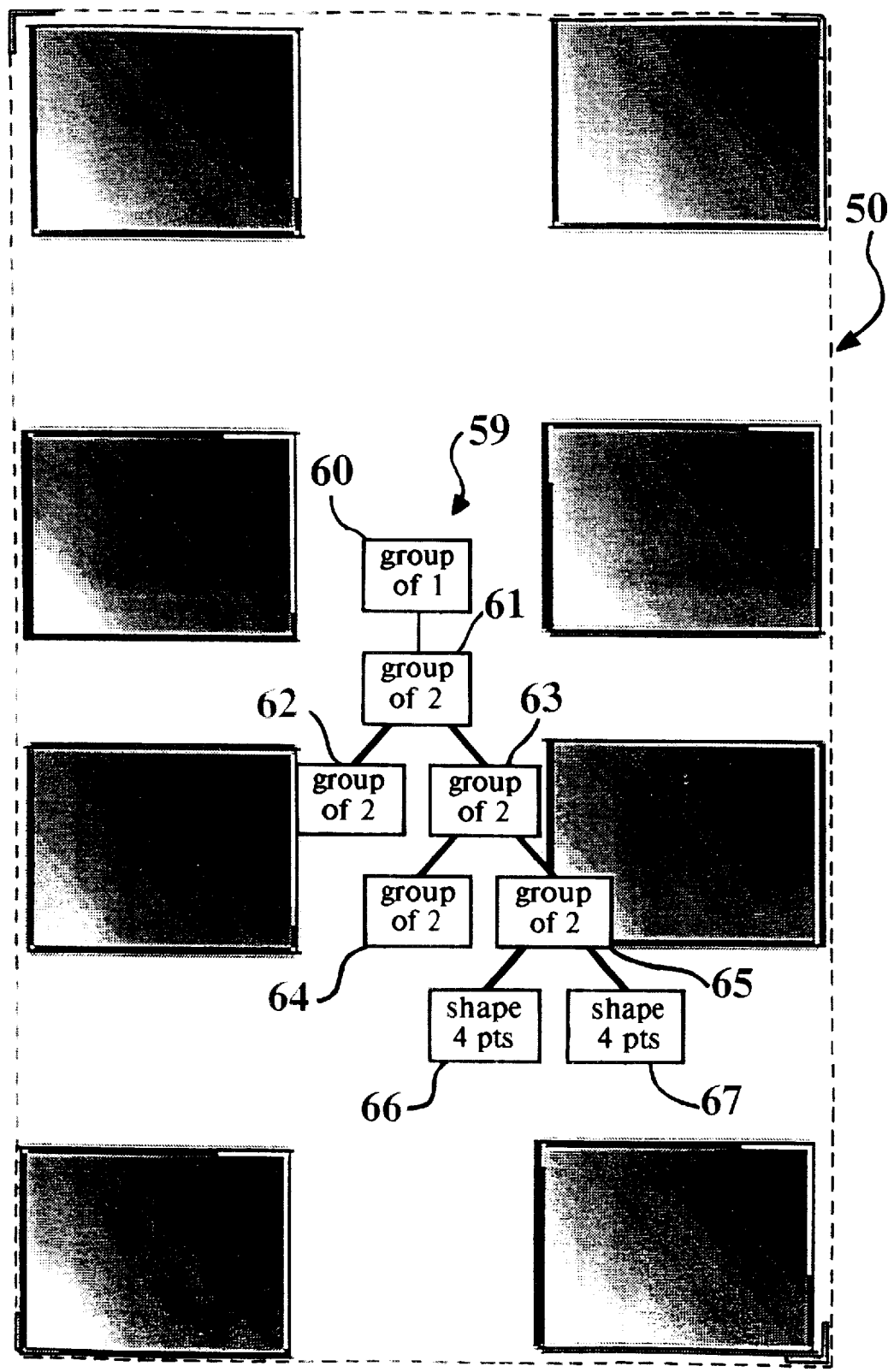
FIG. 10 illustrates a tree-view of the object of FIG. 9.

FIG. 10 illustrates the corresponding tree-view 59 of the object 50. The tree-view 59 is illustrated when the control point 53 (FIG. 9) is selected in tree-viewing mode. Initially, in this mode, only nodes 60 and 61 are displayed. However, when the node 61 is selected using an interactive pointing device 1220, nodes 62 and 63 are further illustrated. When the node 63 is selected using the interactive pointing device, nodes 64 and 65 are displayed. Further, when the node 65 is selected using the interactive pointing device, nodes 66 and 67 are further illustrated. Thus, the tree-view 59 provides for the selective displays of the grouped structure of all the objects making up the object 50.

Preferably, the tree-viewing system has a further mode in which nodes (e.g., the nodes 60 to 67 of FIG. 10) can be individually selected. In this alternative mode, once a node (e.g. 67) is individually selected, the group structure 50 is "ungrouped" to the extent necessary to allow access to the corresponding object (e.g. 67).

Figure 11:
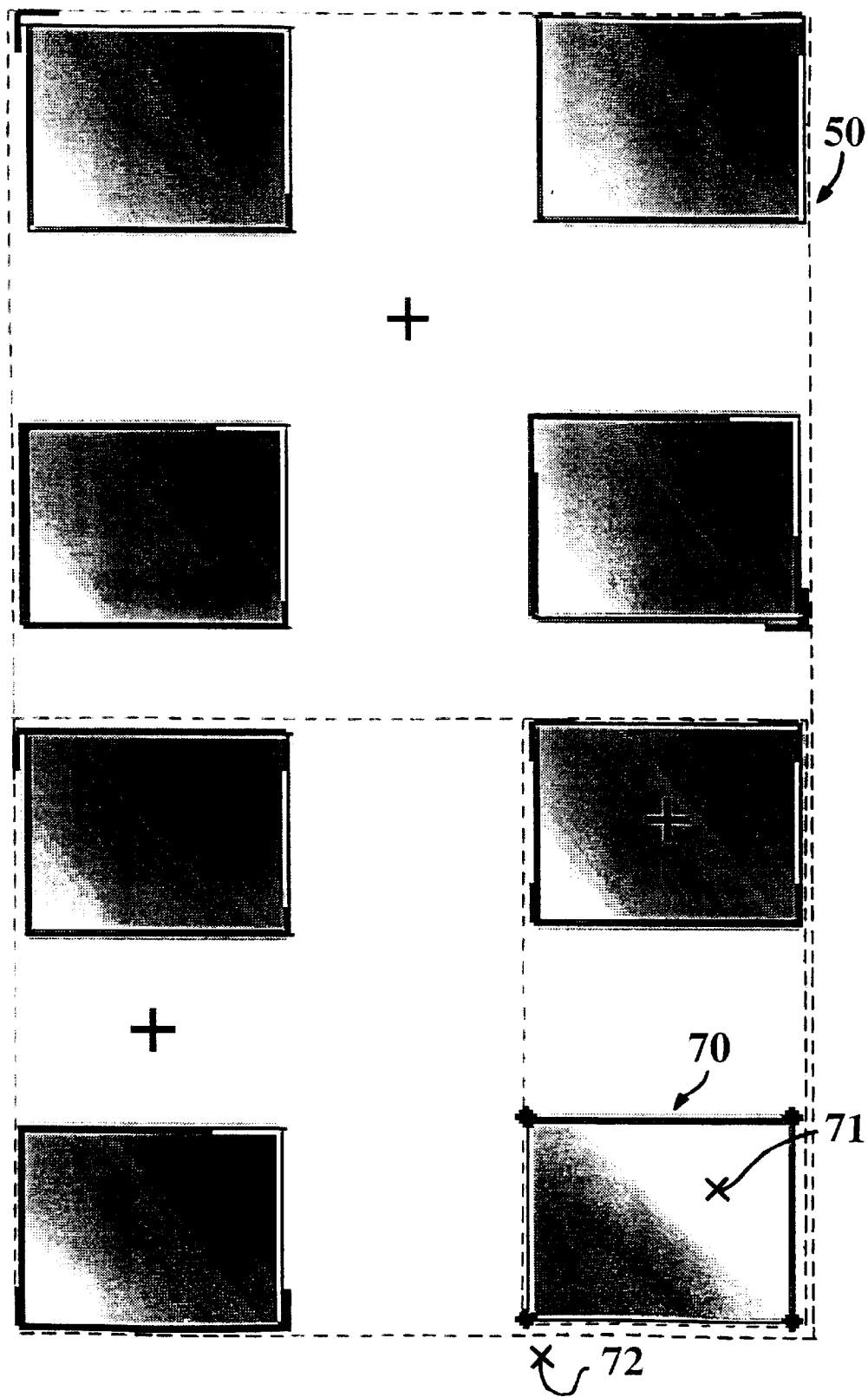
FIG. 11 illustrates the selection of an object within a group in accordance with the preferred embodiment.

FIG. 11 illustrates the resultant display when the node 67 of FIG. 10 is selected in this alternative mode. The node 67 corresponds to an object 70 in the overall object 50, which is "ungrouped" to the extent necessary to allow access to the object 70. The attributes of the object 70 can then be selectively altered. For example, the blend of object 70 can be altered using blend control points 71,72.

As can be seen from the foregoing description of the embodiments of the invention, utilisation of the tree-viewing system allows for the effective control of the hierarchical complexity of an image that is made up of a substantial number of grouped objects.

In the attached Appendix A. the implementation according to the preferred embodiment is written in two computer languages. The first language is the "C" programming language and the second is "ICI" programming language. In particular, the preferred embodiment has been implemented using the Microsoft Windows (Trade Mark) operating system and the programming language Microsoft Visual C++. Both Microsoft Windows and Microsoft Visual C++ are well known in the art and commonly used to create graphical application programs.

Additionally, use has been made of the "ICI" programming language which is an interpreted language having a "C" like syntax. Appendix A also contains ICI source code for implementing the preferred embodiment. It will be apparent to a person skilled in the art that this language has a C-like pseudocode syntax. The ICI programming language has verge similar constructs to the C programming language, but extends the C programming language.

A description of the ICI programming language is provided in Appendix B, which is incorporated herein by cross-reference. For details on obtaining the ICI language, reference is made to the regular list of language and compilers posted to the Internet news group comp.compilers, amongst others. Additionally, subscription to the Internet ICI mailing list can be obtained by sending a message to the Internet address ici-request@research.canon.oz.au.

The code of the Appendix A assumes, for example, that the overall structure of a selected group of objects is readily available and stored in the form of an accessible tree. The code in the Appendix includes instructions for dealing with the selection of a node using an interactive pointing device, and the subsequent display of child nodes of a selected node. Additionally, there is included code for the rendering of the tree-view node structure as illustrated by the figures of the present application.

Accordingly, the method and apparatus according to the preferred embodiment can be readily implemented in the "C" programming language or another comparable high-level programming language.

The foregoing only describes a small number of embodiments of the present invention. However, it will be apparent to those skilled in the art that modifications and changes can be made thereto without departing from the scope and spirit of the invention.

- 10 -

APPENDIX A
```
    /*
     * treeview.ici
     */
 5  static horz_step;
    static vert_step;
    static node_width;
    static node_height;

10  /*
     * paint_node_set
     */
    extern
    paint_node_set(nodes)
15  {
        auto  g;
        auto  p;
        auto  t1;
        auto  t2;
20
        /*
         * First draw all the joining lines. For each node on display, if
         * it has a parent and it is on disply, draw a connecting line.
         */
25      forall (g in nodes)
        {
            if (!nodes[p = g._parent])
                continue;
            tree_line
30          (
                doc,
                g._tree_x,
                g._tree_y + node_height / 2.0,
                p._tree_x,
35              p._tree_y,
            );
        }

/*
40       * Now draw the nodes themselves.
         */
        forall (g in nodes)
        {
            t1 = g.what;
45          t2 = "";
            switch (t1)
            {
            case "group":
```

```
                                    - 11 - if (g.op != "over")
                        t1 = g.op;
                    else
                        t2 = sprintf("of %d", nels(g.gobs));
 5                  break;

case "coladj":
                    t2 = "Color Adjustor";
                    break;
10
                case "shape":
                    if (nels(g.edges) == 1)
                        t2 = sprintf("%d pts", nels(g.edges[0].points));
                    else
15                      t2 = sprintf("%d edg", nels(g.edges));
                    break;

case "text":
                    t2 = vis(interval(implode(g.text) ~~ $regexp("^([^\r\n]*)"), 0, 8));
20                  break;

case "rtf":
                    t2 = "RTF";
                    break;
25
                case "char":
                    t2 = sprintf("%s",g.char);
                    break;

30              case "image":
                    t2 = g.fname ~~ #([^\:]*)$#;
                    t2 = t2 ~~ #^([^.]*)#;
                    break;
                }
35
                tree_node
                (
                    doc,
                    g._tree_x,
40                  g._tree_y,
                    t1,
                    t2,
                    !!doc._select[g]
                );
45          }
        }
                static
```

- 12 -

```
        update_tree_nodes()
        {
                auto  old;
                auto  cur;
 5              auto  main;
                auto  gob;
                auto  g;
                auto  x, y;

10              old = doc._tree_nodes;
                main = set();
                gob = doc._tree_now;
                x = gob._tree_x;
                y = gob._tree_y;
15              for (g = gob; g != NULL; g = g._parent)
                {
                        if (!doc._tree_placed[g])
                        {
                                g._tree_x = x;
20                              g._tree_y = y;
                                doc._tree_placed[g] = 1;
                                y += vert_step;
                        }
                        else
25                      {
                                x = g._tree_x;
                                y = g._tree_y + vert_step;
                        }
                        main[g] = 1;
30              }
                cur = copy(main);
                forall (gob in main)
                {
                        if (gob.gobs == NULL)
35                              continue;
                        x = 0.0;
                        forall (g in gob.gobs)
                        {
                                if (doc._tree_placed[g])
40                                      break;
                                x += horz_step;
                        }
                        if (doc._tree_placed[g])
                                x = g._tree_x - x;
45                      else
                        {
                                x = gob._tree_x - (nels(gob.gobs) - 1) * horz_step / 2;
                                if (x + nels(gob.gobs) * horz_step > window_edge(doc, 1))
```

```
                                             - 13 -
                            x = window_edge(doc, 1) - nels(gob.gobs) * horz_step;
                         if (x < window_edge(doc, 0))
                            x = window_edge(doc, 0);
                }
 5              y = gob._tree_y - vert_step;
                forall (g in gob.gobs)
                {
                        g._tree_x = x;
                        g._tree_y = y;
10                      x += horz_step;
                        doc._tree_placed[g] = 1;
                        cur[g] = 1;
                }
        }
15      forall (g in (old - cur) + (cur - old))
        {
                damage_tree_node(doc, g._tree_x, g._tree_y);
                if (g._parent != NULL)
                        damage_rect(doc, g._tree_x, g._tree_y + node_height / 2.0,
20   g._parent._tree_x, g._parent._tree_y);
        }
        doc._tree_nodes = cur;
}

25   /*
      * tree_view_mouse_down_hit
      */
     extern
     tree_view_mouse_down_hit()
30   {
        auto gob;

tree_sizes(doc, &node_width, &node_height);
        horz_step = node_width * 1.2;
35      vert_step = node_height * 1.5;

gob = doc._hit_t._gob;
        doc._hit_t = gob;
        doc._tree_down = gob;
40      doc._tree_now = gob;
        doc._tree_nodes = set();
        doc._tree_placed = set();
        gob._tree_x = doc._hit_x;
        gob._tree_y = doc._hit_y;
45      update_tree_nodes();
        mouse_move_func = tree_view_mouse_move;
        mouse_up_func = tree_view_mouse_up;
        add_overlay_invert_func(invert_treeview_overlay_box);
```

- 14 -

```
        return 1;
    } static
 5  tree_view_mouse_move()
    {
        auto  g;
        auto  half_height;
        auto  half_width;
10
        half_height = node_height / 2.0;
        half_width = node_width / 2.0;
        forall (g in doc._tree_nodes)
        {
15          if
            (
                doc._nowx > g._tree_x - half_width
                &&
                doc._nowx < g._tree_x + half_width
20              &&
                doc._nowy > g._tree_y - half_height
                &&
                doc._nowy < g._tree_y + half_height
            )
25          {
                if (doc._tree_now != g)
                {
                    doc._tree_now = g;
                    update_tree_nodes();
30              }
                if (doc._tree_hit != g)
                {
                    remove_overlays();
                    doc._hit_t = g;
35              }
                restore_overlays();
                return 0;
            }
        }
40      if (doc._hit_t != NULL)
        {
            remove_overlays();
            doc._hit_t = NULL;
        }
45      restore_overlays();
        return 0;
    }
```

- 15 -

```
     static
     tree_view_mouse_up()
     {
          auto g;
 5
          kill_all_overlays();
          forall (g in doc._tree_nodes)
          {
               damage_tree_node(doc, g._tree_x, g._tree_y);
10             if (g._parent != NULL)
                    damage_rect(doc, g._tree_x, g._tree_y + node_height / 2.0,
     g._parent._tree_x, g._parent._tree_y);
          }
          doc._tree_nodes = set();
15
          if (doc._hit_t == NULL)
               return;
          for (g = doc._hit_t; g != NULL; g = g._parent)
          {
20             g.closed = 0;
               doc._select[g] = 0;
          }
          g = doc._hit_t;
          g.closed = 1;
25        if (doc._shift)
               doc._select[g] = 1;
          else
               doc._select = set(g);
     }
30
     extern
     invert_treeview_overlay_box()
     {
          auto g;
35
          if ((g = doc._hit_t) == NULL)
               return;
          rgb(1, 1, 1);
          xor_pen(doc, 1);
40        frame(doc, g._xmin, g._ymin, g._xmax, g._ymax);
          xor_pen(doc, 0);
     } include "icihdrs.h"
45   #include "kit.h"
     #include "app.h"
     #include "doc.h"
     #include "modals.h"
```

- 16 -

```
#include "csc.h"
include <ctype.h> int float_ret(double); /*### should be in ici fwd.h */

/*
 * ###
 */
BOOL        TI_construct_spline_outlines(char const *rtf, object_t *doc, object_t
*gob, int, FloatXY *, int to_cache);

/*
 * Tree view geometry in pixels.
 */
#define    TV_NODE_WIDTH  30
define    TV_NODE_HEIGHT 20 static COLORREF    current_colour;
static HBRUSH      current_brush;
static HPEN        current_pen;
static POINT       *points;
static int         npoints;

/*
 * kd_from_pic
 *
 * Return a pointer to the KIT_Doc structure associated with the given
 * ICI structure. Should ever attempt to return NULL, it would indicate
 * that some ICI code had held onto a document after it was closed and
 * then called us to do something with it.
 */
static KIT_Doc *
kd_from_pic(struct_t *pic)
{
    KIT_Doc  *kd;

for (kd = ka.ka_Docs; kd != NULL && kd->kd_Pic != pic; kd = kd->kd_Next)
        ;
    ASSERT(kd != NULL, "No doc to match pic");
    return kd;
} static int
f_help_keyword()
{
    char       *key;
```

- 17 -

```
         if (typecheck("s", &key))
             return 1;
         WinHelp(frame_window_handle, help_file(), HELP_KEY, (unsigned long)key);
         return loose_ret(objof(&o_null));
 5   } static int
     f_debug()
     {
10       char *s;

if (typecheck("s", &s))
             return 1;
         MessageBox(frame_window_handle, s, "ICI Debug", MB_OK);
15       return loose_ret(objof(&o_null));
     }

/*
      * ICI: rgb(r, g, b)
20      *
      * Set the current colour based on 0..1 R, G & B values.
      */
     static int
     f_rgb()
25   {
         double   c[3];
         int      i[3];

if (typecheck("nnn", &c[0], &c[1], &c[2]))
30           return 1;
         i[0] = (int)(c[0] * 255);
         i[1] = (int)(c[1] * 255);
         i[2] = (int)(c[2] * 255);
         current_colour = RGB(i[0], i[1], i[2]);
35       if (current_brush != NULL)
         {
             DeleteObject(current_brush);
             current_brush = NULL;
         }
40       if (current_pen != NULL)
         {
             DeleteObject(current_pen);
             current_pen = NULL;
         }
45       return loose_ret(objof(&o_null));
     }

/*
```

```
                                        - 18 -

* ICI: frame(xmin, ymin, xmax, ymax)
      *
      * Fill the rectangle based on the current colour..
      */
   5  static int
      f_frame()
      {
              double     xmin;
              double     ymin;
  10          double     xmax;
              double     ymax;
              int        x[2];
              int        y[2];
              HGDIOBJ    saved;
  15          KIT_Doc    *kd;
              struct_t   *pic;

if (typecheck("dnnnn", &pic, &xmin, &ymin, &xmax, &ymax))
                      return 1;
  20          kd = kd_from_pic(pic);
              ASSERT(kd != NULL && kd->kd_DC != NULL, "No doc or DC");
              y[0] = yw_from_ymm(kd, ymin);
              x[0] = xw_from_xmm(kd, xmin);
              y[1] = yw_from_ymm(kd, ymax);
  25          x[1] = xw_from_xmm(kd, xmax);
              if (current_pen == NULL)
                      current_pen = CreatePen(PS_SOLID, 1, current_colour);
              saved = SelectObject(kd->kd_DC, current_pen);
              MoveToEx(kd->kd_DC, x[0], y[0], NULL);
  30          LineTo(kd->kd_DC, x[1], y[0]);
              LineTo(kd->kd_DC, x[1], y[1]);
              LineTo(kd->kd_DC, x[0], y[1]);
              LineTo(kd->kd_DC, x[0], y[0]);
              SelectObject(kd->kd_DC, saved);
  35      return loose_ret(objof(&o_null));
      }

/*
      * ICI: tree_node(cx, cy, text1, text2, selected)
  40  *
      * Draw a tree view node.
      *
      * Parameters:
      *
  45  * cx      The x coord of the centre of the node in picture space.
      *
      * cy      The y coord as above.
      *
```

- 19 -

```
 *  text1     The first line of the two line label.
 *
 *  text2     The second line of the two line label.
 *
5*  selected  1 if the node is to be drawn selected, else 0.
 */
static int
f_tree_node()
{
10      double       cx;
        double       cy;
        char         *text1;
        char         *text2;
        long         selected;
15      RECT         r;
        KIT_Doc      *kd;
        struct_t     *pic;
        HGDIOBJ      saved;

20      if (typecheck("dnnssi", &pic, &cx, &cy, &text1, &text2, &selected))
                return 1;
        kd = kd_from_pic(pic);
        ASSERT(kd != NULL && kd->kd_DC != NULL, "No doc or DC");
        r.top = yw_from_ymm(kd, cy) - TV_NODE_HEIGHT / 2;
25      r.left = xw_from_xmm(kd, cx) - TV_NODE_WIDTH / 2;
        r.bottom = r.top + TV_NODE_HEIGHT;
        r.right = r.left + TV_NODE_WIDTH;
        FillRect(kd->kd_DC, &r, ltgray_brush);
        FrameRect(kd->kd_DC, &r, selected ? red_brush : black_brush);
30      saved = SelectObject(kd->kd_DC, black_pen);
        SelectObject(kd->kd_DC, small_font);
        SetBkMode(kd->kd_DC, TRANSPARENT);
        SetTextAlign(kd->kd_DC, TA_TOP | VTA_CENTER);
        ExtTextOut(kd->kd_DC, r.left + TV_NODE_WIDTH / 2, r.top,
35              ETO_CLIPPED, &r, text1, strlen(text1), NULL);
        SetTextAlign(kd->kd_DC, TA_BOTTOM | VTA_CENTER);
        ExtTextOut(kd->kd_DC, r.left + TV_NODE_WIDTH / 2, r.bottom,
                ETO_CLIPPED, &r, text2, strlen(text2), NULL);
        SelectObject(kd->kd_DC, saved);
40      return loose_ret(objof(&o_null));
}

/*
 * ICI: damage_tree_node(cx, cy)
45 *
 * Parameters:
 *
 * cx      The x coord of the centre of the node in picture space.
```

- 20 -

```
 *  cy      The y coord as above.
 */
static int
f_damage_tree_node()
{
        double          cx;
        double          cy;
        RECT            r;
        KIT_Doc         *kd;
        struct_t        *pic;

if (typecheck("dnn", &pic, &cx, &cy))
                return 1;
        kd = kd_from_pic(pic);
        r.top = yw_from_ymm(kd, cy) - TV_NODE_HEIGHT / 2;
        r.left = xw_from_xmm(kd, cx) - TV_NODE_WIDTH / 2;
        r.bottom = r.top + TV_NODE_HEIGHT;
        r.right = r.left + TV_NODE_WIDTH;
        InvalidateRect(kd->kd_WindowHandle, &r, FALSE);
        return loose_ret(objof(&o_null));
}

/*
 * ICI: tree_line(x0, y0, x1, y1)
 */
static int
f_tree_line()
{
        double          x0;
        double          y0;
        double          x1;
        double          y1;
        KIT_Doc         *kd;
        struct_t        *pic;
        HGDIOBJ         saved;

if (typecheck("dnnnn", &pic, &x0, &y0, &x1, &y1))
                return 1;
        kd = kd_from_pic(pic);
        ASSERT(kd != NULL && kd->kd_DC != NULL, "No doc or DC");
        saved = SelectObject(kd->kd_DC, black_pen);
        MoveToEx(kd->kd_DC, xw_from_xmm(kd, x0), yw_from_ymm(kd, y0), NULL);
        LineTo(kd->kd_DC, xw_from_xmm(kd, x1), yw_from_ymm(kd, y1));
        SelectObject(kd->kd_DC, saved);
        return loose_ret(objof(&o_null));
}
```

```
/*
 * ICI: tree_sizes(&width, &height)
 *
 * Return the size of a tree node, which is constant size in pixel space,
 * in the current picture (mm) space.
 */
static int
f_tree_sizes()
{
        double          width;
        double          height;
        KIT_Doc         *kd;
        struct_t        *pic;

if (typecheck("d--", &pic))
                return 1;
        kd = kd_from_pic(pic);
        ASSERT(kd != NULL, "No doc");
        width = TV_NODE_WIDTH / (kd->kd_Scale * win_horz_ppmm);
        height = TV_NODE_HEIGHT / (kd->kd_Scale * win_vert_ppmm);
        if (retcheck("-ff", &width, &height))
                return 1;
    return loose_ret(objof(&o_null));
} static
f_window_edge()
{
        long            which;
        double          edge;
        KIT_Doc         *kd;
        struct_t        *pic;

if (typecheck("di", &pic, &which))
                return 1;
        kd = kd_from_pic(pic);
        ASSERT(kd != NULL && kd->kd_DC != NULL, "No doc or DC");
        switch (which)
        {
        case 0: /* left */
                edge = xmm_from_xw(kd, 0);
                break;

case 1: /* right */
                edge = xmm_from_xw(kd, kd->kd_WindowSize.x);
                break;
        }
```

- 22 -

```
            return float_ret(edge);
    } static int
  5     f_polyline()
        {
                array_t        *a;
                object_t       *o;
                long           flag;
 10             int            n;
                int            i;
                HGDIOBJ        saved;
                KIT_Doc        *kd;
                struct_t       *pic;

15             if (typecheck("dai", &pic, &a, &flag))
                        return 1;
                kd = kd_from_pic(pic);
                ASSERT(kd != NULL && kd->kd_DC != NULL, "No doc or DC");
 20             if (npoints < (n = (a->a_top - a->a_base) / 2))
                {
                        points = realloc(points, n * sizeof(POINT));
                        npoints = n;
                }
 25             for (i = 0; i < n; ++i)
                {
                        o = a->a_base[i * 2];
                        if (!isfloat(o))
                                return argerror(0);
 30                     points[i].x = xw_from_xmm(kd, floatof(o)->f_value);
                        o = a->a_base[i * 2 + 1];
                        if (!isfloat(o))
                                return argerror(0);
                        points[i].y = yw_from_ymm(kd, floatof(o)->f_value);
 35             }
                if (current_pen == NULL)
                        current_pen = CreatePen(PS_SOLID, 1, current_colour);
                saved = SelectObject(kd->kd_DC, current_pen);
                switch ((int)CF_ARG1())
 40             {
                case 0:
                        Polyline(kd->kd_DC, points, n);
                        break;

45             case 1:
                        if ((n = ((n - 1) / 3) * 3 + 1) >= 4)
                                bez(kd->kd_DC, points, n);
                        break;
```

```
            case 2:
                for (i = 1; i < n; i += 3)
                {
                    /*paint_cpoint(flag, 0, points, npoints, i);*/
                }
                break;

case 3:
                for (i = 0; i < n; ++i)
                {
                    if
                    (
                        abs(points[i].x - kd->kd_MouseDown.x) <= 3
                        &&
                        abs(points[i].y - kd->kd_MouseDown.y) <= 3
                    )
                    {
                        SelectObject(kd->kd_DC, saved);
                        return int_ret(i);
                    }
                }
                break;
        }
        SelectObject(kd->kd_DC, saved);
        return loose_ret(objof(&o_null));
    } static int
    f_paint_cpoint()
    {
        long        selected;
        double      d[6];
        POINT       p[3];
        KIT_Doc     *kd;
        struct_t    *pic;

if (typecheck("dinnnnnn", &pic, &selected, &d[0], &d[1], &d[2], &d[3], &d[4],
    &d[5]))
            return 1;
        kd = kd_from_pic(pic);
        ASSERT(kd != NULL && kd->kd_DC != NULL, "No doc or DC");
        p[0].x = xw_from_xmm(kd, d[0]);
        p[0].y = yw_from_ymm(kd, d[1]);
        p[1].x = xw_from_xmm(kd, d[2]);
        p[1].y = yw_from_ymm(kd, d[3]);
        p[2].x = xw_from_xmm(kd, d[4]);
        p[2].y = yw_from_ymm(kd, d[5]);
```

- 24 -

```
            paint_cpoint(kd, selected, p);
            return loose_ret(objof(&o_null));
        }

5       static int
        f_xor_pen()
        {
            long        on;
            KIT_Doc     *kd;
10          struct_t    *pic;

if (typecheck("di", &pic, &on))
                return 1;
            kd = kd_from_pic(pic);
15          ASSERT(kd != NULL && kd->kd_DC != NULL, "No doc or DC");
            if (on)
                SetROP2(kd->kd_DC, R2_XORPEN);
            else
                SetROP2(kd->kd_DC, R2_COPYPEN);
20          return loose_ret(objof(&o_null));
        } static int
        f_rect_tags()
25      {
            double          d[4];
            ShortXYMinMax   r;
            int             t;
            long            selected;
30          KIT_Doc         *kd;
            struct_t        *pic;

if (typecheck("dinnnn", &pic, &selected, &d[0], &d[1], &d[2], &d[3]))
                return 1;
35          kd = kd_from_pic(pic);
            ASSERT(kd != NULL && kd->kd_DC != NULL, "No doc or DC");
            r.x.min = xw_from_xmm(kd, d[0]);
            r.y.min = yw_from_ymm(kd, d[1]);
            r.x.max = xw_from_xmm(kd, d[2]);
40          r.y.max = yw_from_ymm(kd, d[3]);
            if (r.x.min > r.x.max)
            {
                t = r.x.min;
                r.x.min = r.x.max;
45              r.x.max = t;
            }
            if (r.y.min > r.y.max)
            {
```

- 25 -

```
                t = r.y.min;
                r.y.min = r.y.max;
                r.y.max = t;
            }
        paint_tag(kd->kd_DC, 0, selected, r.x.min, r.y.min);
        paint_tag(kd->kd_DC, 1, selected, r.x.max, r.y.min);
        paint_tag(kd->kd_DC, 2, selected, r.x.max, r.y.max);
        paint_tag(kd->kd_DC, 3, selected, r.x.min, r.y.max);
        paint_tag(kd->kd_DC, 4, selected, (r.x.max + r.x.min) / 2, (r.y.max +
    r.y.min) / 2);
        return loose_ret(objof(&o_null));
    } f_dotted_rect()
    {
        double          d[4];
        ShortXYMinMax   r;
        int             t;
        long            selected;
        KIT_Doc         *kd;
        struct_t        *pic;

if (typecheck("dinnnn", &pic, &selected, &d[0], &d[1], &d[2], &d[3]))
            return 1;
        kd = kd_from_pic(pic);
        ASSERT(kd != NULL && kd->kd_DC != NULL, "No doc or DC");
        r.x.min = xw_from_xmm(kd, d[0]);
        r.y.min = yw_from_ymm(kd, d[1]);
        r.x.max = xw_from_xmm(kd, d[2]);
        r.y.max = yw_from_ymm(kd, d[3]);
        if (r.x.min > r.x.max)
        {
            t = r.x.min;
            r.x.min = r.x.max;
            r.x.max = t;
        }
        if (r.y.min > r.y.max)
        {
            t = r.y.min;
            r.y.min = r.y.max;
            r.y.max = t;
        }
        dotted_rect(kd, selected, &r);
        return loose_ret(objof(&o_null));
    } f_rect_outline()
    {
```

```
        double              d[8];
        HGDIOBJ             saved;
        KIT_Doc             *kd;
        struct_t    *pic;
 5      static HPEN         blue_dash_pen;

if (blue_dash_pen == NULL)
            blue_dash_pen = CreatePen(PS_DOT, 1, RGB(0, 0, 255));

10      if (typecheck("dnnnnnnnn", &pic, &d[0], &d[1], &d[2], &d[3], &d[4], &d[5],
    &d[6], &d[7]))
            return 1;
        kd = kd_from_pic(pic);
        ASSERT(kd != NULL && kd->kd_DC != NULL, "No doc or DC");
15      saved = SelectObject(kd->kd_DC, blue_dash_pen);
        MoveToEx(kd->kd_DC, xw_from_xmm(kd, d[0]), yw_from_ymm(kd, d[1]),
    NULL);
        LineTo(kd->kd_DC, xw_from_xmm(kd, d[2]), yw_from_ymm(kd, d[3]));
        LineTo(kd->kd_DC, xw_from_xmm(kd, d[4]), yw_from_ymm(kd, d[5]));
20      LineTo(kd->kd_DC, xw_from_xmm(kd, d[6]), yw_from_ymm(kd, d[7]));
        LineTo(kd->kd_DC, xw_from_xmm(kd, d[0]), yw_from_ymm(kd, d[1]));
        SelectObject(kd->kd_DC, saved);
      return loose_ret(objof(&o_null));
    }
25
    static int
    f_cpoint_outline()
    {
        double              d[8];
30      POINT               p[4];
        HGDIOBJ             saved;
        KIT_Doc             *kd;
        struct_t    *pic;
        static HPEN         blue_dash_pen;
35
        if (blue_dash_pen == NULL)
            blue_dash_pen = CreatePen(PS_DOT, 1, RGB(0, 0, 255));

if (typecheck("dnnnnnnnn", &pic, &d[0], &d[1], &d[2], &d[3], &d[4], &d[5],
40  &d[6], &d[7]))
            return 1;
        kd = kd_from_pic(pic);
        ASSERT(kd != NULL && kd->kd_DC != NULL, "No doc or DC");
        p[0].x = xw_from_xmm(kd, d[0]);
45      p[0].y = yw_from_ymm(kd, d[1]);
        p[1].x = xw_from_xmm(kd, d[2]);
        p[1].y = yw_from_ymm(kd, d[3]);
        p[2].x = xw_from_xmm(kd, d[4]);
```

- 27 -

```
            p[2].y = yw_from_ymm(kd, d[5]);
            p[3].x = xw_from_xmm(kd, d[6]);
            p[3].y = yw_from_ymm(kd, d[7]);
            saved = SelectObject(kd->kd_DC, blue_dash_pen);
5           bez(kd->kd_DC, p, 4);
            SelectObject(kd->kd_DC, saved);
        return loose_ret(objof(&o_null));
    }

10  /*
     * ### Not used (apparently).
     */
    static int
    f_blob_tag()
15  {
            double          d[2];
            ShortXY         r;
            long            selected;
            KIT_Doc         *kd;
20          struct_t        *pic;

if (typecheck("dinn", &pic, &selected, &d[0], &d[1]))
                return 1;
        kd = kd_from_pic(pic);
25      ASSERT(kd != NULL && kd->kd_DC != NULL, "No doc or DC");
        r.x = xw_from_xmm(kd, d[0]);
        r.y = yw_from_ymm(kd, d[1]);
        paint_tag(kd->kd_DC, 6, selected, r.x, r.y);
        return loose_ret(objof(&o_null));
30  } static int
    f_x_tag()
    {
35          double          d[2];
            ShortXY         r;
            long            selected;
            KIT_Doc         *kd;
            struct_t        *pic;
40
        if (typecheck("dinn", &pic, &selected, &d[0], &d[1]))
                return 1;
        kd = kd_from_pic(pic);
        ASSERT(kd != NULL && kd->kd_DC != NULL, "No doc or DC");
45      r.x = xw_from_xmm(kd, d[0]);
        r.y = yw_from_ymm(kd, d[1]);
        paint_tag(kd->kd_DC, 6, selected, r.x, r.y);
        return loose_ret(objof(&o_null));
```

- 28 -

```
        } static int
        f_code_dir()
        {
                extern char *ici_dir;

if (ici_dir == NULL)
                        return loose_ret(objof(&o_null));
                return str_ret(ici_dir);
        } static int
        f_file_dialog()
        {
                KIT_Doc         *kd;
                long            for_save;
                char            *extension;
                char            *initial;
                object_t        *func;
                char            name_buf[FILENAME_MAX];

if ((kd = current_doc()) == NULL)
                {
                        set_status(S_ERROR, error);
                        return loose_ret(objof(&o_null));
                }
                if (typecheck("isso", &for_save, &extension, &initial, &func))
                        return 1;

strncpy(name_buf, initial, sizeof(name_buf) - 1);
                for (;;)
                {
                        if
                        (
                                !file_dialog
                                (
                                        name_buf,
                                        sizeof(name_buf),
                                        for_save,
                                        extension,
                                                "OpenCraft (*.kit)\0*.kit\0"
                                                "All images\0*.tif;*.tiff;*.pcd;*.bmp\0"
                                                "TIFF files (*.tif;*.tiff)\0*.tif;*.tiff\0"
                                                "PhotoCD files (*.pcd)\0*.pcd\0"
                                                "BMP files (*.bmp)\0*.bmp\0"
                                                "All files (*.*)\0*.*\0",
```

- 29 -

```
                            FALSE /* !Note recent. */
                        )
                    )
                        break;
 5              if (ici_func(func, "os", kd->kd_Pic, name_buf) == NULL)
                        break;
                set_status(S_ERROR, error);
        }
10      return loose_ret(objof(&o_null));
    } static int
    f_rename_file()
15  {
        char *old_fname;
        char *new_fname;
        if (typecheck("ss", &old_fname, &new_fname))
            return 1;
20      CopyFile(old_fname, new_fname, FALSE);
        return loose_ret(objof(&o_null));
    } static int
25  f_set_title_bar()
    {
        char        *title;
        KIT_Doc     *kd;
        struct_t    *pic;
30
        if (typecheck("ds", &pic, &title))
            return 1;
        kd = kd_from_pic(pic);
        ASSERT(kd != NULL, "No doc");
35      SetWindowText(kd->kd_WindowHandle, title);
        return loose_ret(objof(&o_null));
    } static int
40  f_set_status()
    {
        switch (NARGS())
        {
        case 0:
45          set_status((int)CF_ARG1(), NULL);
            break;

case 1:
```

- 30 -

```
            if (!isstring(ARG(0)))
                return argerror(0);
            set_status((int)CF_ARG1(), stringof(ARG(0))->s_chars);
            break;
5
        default:
            return argcount(1);
        }
        return loose_ret(objof(&o_null));
10  } static int
    f_set_page_size()
    {
15      double          width;
        double          height;
        KIT_Doc         *kd;

if (typecheck("nn", &width, &height))
20          return 1;
        /*
         * This is very special. set_page_size() is only called during
         * old_doc() before the ICI structure has been assigned. The
         * relevent doc is the first one in the list.
25       */
        kd = ka.ka_Docs;
        ASSERT(kd->kd_Pic == NULL, "set_page_size with old doc");
        kd->kd_PageSizeInmm.x = (float)width;
        kd->kd_PageSizeInmm.y = (float)height;
30      return loose_ret(objof(&o_null));
    } static int
    f_get_page_size()
35  {
        double          width;
        double          height;
        KIT_Doc         *kd;
        struct_t        *pic;
40
        if (typecheck("d--", &pic))
            return 1;
        kd = kd_from_pic(pic);
        ASSERT(kd != NULL, "No doc");
45      width = kd->kd_PageSizeInmm.x;
        height = kd->kd_PageSizeInmm.y;
        if (retcheck("-ff", &width, &height))
            return 1;
```

```
            return loose_ret(objof(&o_null));
        } static int
    5   f_get_image_size()
        {
            char    *s;
            OP_ImageInfo ii;

10      if (typecheck("s--", &s))
                return 1;
            if (!OP_image_file_info(s, &ii))
            {
                ii.ii_WidthInmm = 150.0;
    15          ii.ii_HeightInmm = 100.0;
            }
            if (retcheck("-ff", &ii.ii_WidthInmm, &ii.ii_HeightInmm))
                return 1;
            return loose_ret(objof(&o_null));
    20  } static int
        f_hypot()
        {
    25      double   d[2];

if (typecheck("nn", &d[0], &d[1]))
                return 1;
            return float_ret(_hypot(d[0], d[1]));
    30  } static int
        f_hit_threshold()
        {
    35      KIT_Doc    *kd;
            struct_t   *pic;

if (typecheck("d", &pic))
                return 1;
    40      kd = kd_from_pic(pic);
            ASSERT(kd != NULL, "No doc");
            return float_ret(fabs(xmm_from_xp(kd, ka.ka_HitTolerance)));
        }

45  static int
        f_undo_depth()
        {
            KIT_Doc    *kd;
```

- 32 -

```
            struct_t     *pic;

if (typecheck("d". &pic))
                return 1;
  5         kd = kd_from_pic(pic);
            ASSERT(kd != NULL, "No doc");
            return int_ret(ka.ka_UndoDepth);
        }

10     static int
        f_damage_rect()
        {
            double       d[4];
            RECT         r;
 15         long         t;
            KIT_Doc      *kd;
            struct_t     *pic;

if (typecheck("dnnnn". &pic. &d[0]. &d[1], &d[2], &d[3]))
 20             return 1;
            kd = kd_from_pic(pic);
            ASSERT(kd != NULL, "No doc");
            r.left = xw_from_xmm(kd, d[0]);
            r.top = yw_from_ymm(kd, d[1]);
 25         r.right = xw_from_xmm(kd, d[2]);
            r.bottom = yw_from_ymm(kd, d[3]);
            if (r.left > r.right)
            {
                t = r.left;
 30             r.left = r.right;
                r.right = t;
            }
            if (r.top > r.bottom)
            {
 35             t = r.top;
                r.top = r.bottom;
                r.bottom = t;
            }
            r.left -= 3;
 40         r.right += 3;
            r.top -= 3;
            r.bottom += 3;
            InvalidateRect(kd->kd_WindowHandle, &r, FALSE);
            return loose_ret(objof(&c_null));
 45     } static int
        f_damage_render()
```

- 33 -

```
        {
                double          d[5];
                int             slop;
                int             x0, y0, x1, y1;
5               KIT_Doc         *kd;
                struct_t        *pic;

if (typecheck("dnnnnn", &pic, &d[0], &d[1], &d[2], &d[3], &d[4]))
                        return 1;
10              kd = kd_from_pic(pic);
                ASSERT(kd != NULL, "No doc");
                x0 = xw_from_xmm(kd, d[0]);
                y0 = yw_from_ymm(kd, d[1]);
                x1 = xw_from_xmm(kd, d[2]);
15              y1 = yw_from_ymm(kd, d[3]);
                slop = (long)(d[5] * kd->kd_Scale * win_horz_ppmm);
                damage_render(kd, x0, y0, x1, y1, slop);
            return loose_ret(objof(&o_null));
        }
20
        static int
        f_flush_render_damage()
        {
                flush_render_damage();
25          return loose_ret(objof(&o_null));
        } static int
        f_to_inspector()
30      {
                if (NARGS() < 1)
                        return argcount(1);

if (!isstring(ARG(0)))
35                      return argerror(0);

if (!to_inspector(stringof(ARG(0))->s_chars))
                        return 1;
            return loose_ret(objof(&o_null));
40      } static int
        f_rip_write()
        {
45              if (!isstring(ARG(0)))
                        return argerror(0);
                /*rip_write(stringof(ARG(0))->s_chars, stringof(ARG(0))->s_nchars);*/
            return loose_ret(objof(&o_null));
```

```
    } static int
    f_rip_flush()
5   {
        rip_flush_job();
        return loose_ret(objof(&o_null));
    }

10  static int
    f_option()
    {
        char    *s;
        int     m;
15
        if (typecheck("s", &s))
            return 1;

if (strcmp(s, "OPTIONS_ANTIALIAS") == 0)
20          m = ID_MENU_OPTIONS_ANTIALIAS;
        else if (strcmp(s, "OPTIONS_OUTLINE") == 0)
            m = ID_MENU_OPTIONS_OUTLINE;
        else if (strcmp(s, "OPTIONS_DRAG_SNAP") == 0)
            m = ID_MENU_OPTIONS_DRAG_SNAP;
25      else if (strcmp(s, "OPTIONS_MOVE_SNAP") == 0)
            m = ID_MENU_OPTIONS_MOVE_SNAP;
        else
            argerror(0);

30      if (GetMenuState(frame_window_menu_handle, m, 0) & MF_CHECKED)
            return loose_ret(objof(o_one));
        return loose_ret(objof(o_zero));
    }

35  /*
     * ICI: ropen
     *
     * Open a resource as a file. A read-only copy of the resource is
     * opened. The resource is named with "type/id". Eg: "TEXT/30001".
40   * Only allows a numeric id.
     */
    int
    f_ropen()
    {
45      file_t  *f;
        char    *name;
        char    *mode;
        HRSRC   resource_handle;
```

- 35 -

```
        HGLOBAL    data_handle;
        char *data;

mode = "r";
5   if (typecheck(NARGS() > 1 ? "ss" : "s", &name, &mode))
            return 1;
    if (strcmp(mode, "r") != 0 && strcmp(mode, "rb") != 0)
    {
            sprintf(error = errbuf, "attempt to use mode \"%s\" to ropen \"%s\"",
10  mode, name);
            return 1;
    }
        resource_handle = FindResource(applications_handle, name, "TEXT");
        if (resource_handle == NULL)
15      {
            sprintf(error = errbuf, "could not find resource \"%s\"", name);
            return 1;
        }

20      data_handle = LoadResource(applications_handle, resource_handle);
        if (data_handle == NULL)
        {
            sprintf(error = errbuf, "could not load resource \"%s\"", name);
            return 1;
25      } data = LockResource(data_handle);

if ((f = sopen(data, SizeofResource(applications_handle, resource_handle))) ==
30  NULL)
            return 1;
        f->f_name = stringof(ARG(0));

/*
35       * Obsolete calls but Win32s might still need them.
         */
        UnlockResource(resource_handle);
        FreeResource(resource_handle);

40      return obj_ret(objof(f));
    } static int
    f_locate_image()
45  {
        char *old_image;
        char *old_doc;
        char *new_doc;
```

- 36 -

```
        char    new_image[FILENAME_MAX + 128];
        int     _access(char const *, int); /* Can't include io.h because of sopen()
clash. */

5      if (typecheck("sss", &old_image, &old_doc, &new_doc))
                return 1;

if (strcmp(old_doc, new_doc) != 0)
        {
10              char *n;
                char *m;
                char *o;
                char *i;

15              /*
                 * The document as a whole has moved. First
                 * try and locate the image by assuming it moved
                 * in the same way as the document.
                 */
20              for
                (
                        i = old_image, o = old_doc;
                        *i != '\0' && tolower(*i) == tolower(*o);
                        ++i, ++o
25              )
                        ;

/*
                 * old_image..i is now the old 'directory'.
                 * old_doc..o is also the old 'directory'.
30               * i..old_image[strlen(old_image)] is the old image 'basename'.
                 * o..old_doc[strlen(old_doc)] is the old doc 'basename'.
                 */
                for
                (
35                      n = new_doc + strlen(new_doc) - 1, m = old_doc + strlen(old_doc)
- 1;
                        n > new_doc && m > o && tolower(*n) == tolower(*m);
                        --n, --m
                )
40                      ;
                /*
                 * new_doc..n is now the new doc 'directory'.
                 */
                memcpy(new_image, new_doc, n - new_doc);
45              strcpy(new_image + (n - new_doc), i);
                if (_access(new_image, 4/*Read*/) == 0)
                {
                        return str_ret(new_image);
```

- 37 -

```
            }
        }
        /*
         * Either the document didn't move, or if it did, the image
 5       * didn't move with it. Try the original image name.
         */
        if (_access(old_image, 4/*Read*/) == 0)
            return loose_ret(ARG(0));
        /*
10       * Can't find the image in either of the possible places.
         * Time to ask the user about it.
         */
        for (;;)
        {
15          sprintf(new_image, "Opening %s", old_doc);
            sprintf(errbuf, "Could not access the image %s.\nChoose a replacement?",
        old_image);
            switch (MessageBox(frame_window_handle, errbuf, new_image,
        MB_YESNOCANCEL | MB_ICONQUESTION))
            {
20          case IDYES:
            default: /* Not expected. */
                if (GetFileTitle(old_image, new_image, sizeof(new_image)) != 0)
                    new_image[0] = '\0';
                if
25              (   !file_dialog
                    (
                        new_image,
                        sizeof(new_image),
                        FALSE, /* !For save. */
30                      NULL, /* No default extension. */
                        "All images\0*.tif;*.tiff;*.pcd;*.bmp\0"
                            "TIFF files (*.tif;*.tiff)\0*.tif;*.tiff\0"
                            "PhotoCD files (*.pcd)\0*.pcd\0"
35                          "BMP files (*.bmp)\0*.bmp\0"
                            "All files (*.*)\0*.*\0",
                        FALSE /* !Note recent. */
                    )
                )
40                  continue; /* Ask again. */
                return str_ret(new_image);

case IDNO:
                sprintf(errbuf, "%s will be displayed as a grey box.", old_image);
45              MessageBox(frame_window_handle, errbuf, new_image, MB_OK);
                return loose_ret(objof(&o_null));

case IDCANCEL:
```

- 38 -

```
                    error = "Open canceled.";
                    return 1;
                }
            }
5       } static int
        f_set_pic_extent()
        {
10          long        arg;
            double      d[4];
            KIT_Doc     *kd;

if (typecheck("iffff", &arg, &d[0], &d[1], &d[2], &d[3]))
15              return 1;
            kd = (KIT_Doc *)arg;
            kd->kd_PicExtentInmm.x.min = (float)d[0];
            kd->kd_PicExtentInmm.y.min = (float)d[1];
            kd->kd_PicExtentInmm.x.max = (float)d[2];
20          kd->kd_PicExtentInmm.y.max = (float)d[3];
            return loose_ret(objof(&o_null));
        } static int
25      f_update_nhidden()
        {
            long        n;
            KIT_Doc     *kd;
            struct_t    *pic;

30          if (typecheck("di", &pic, &n))
                return 1;
            kd = kd_from_pic(pic);
            ASSERT(kd != NULL, "No doc");
35          kd->kd_HideBarNItems = n;
            recalc_hidebar_geometry(kd);
            return loose_ret(objof(&o_null));
        }

40
        static int
        f_lowprec()
        {
            double d;
45      #define     PREC        (1.0 / 20.0)

if (typecheck("f", &d))
                return 1;
```

- 39 -

```
            if (d > 0)
                    d += PREC / 2.0;
            else
                    d -= PREC / 2.0;
            d -= fmod(d, PREC);
            return float_ret(d);
    } static int
    f_write_direct()
    {
            char   *string;

if (typecheck("s", &string))
                    return 1;
            write_direct(string);
            return loose_ret(objof(&o_null));
    } static int
    f_set_text_runs_and_rules()
    {
            object_t          *gob;
            struct_t          *run;
            double            d[2];
            array_t           *codes;
            array_t           *widths;
            FloatXY           block_size;
            char              *rtf;
            TextRun           *runs;
            TextRun           *tr;
            TextRun           *trnext;
            TextRuledLine     *rules;
            TextRuledLine     *trl;
            TextRuledLine     *trlnext;
            int               i;

if (typecheck("osff", &gob, &rtf, &d[0], &d[1]))
                    return 1;
            block_size.x = (float)d[0];
            block_size.y = (float)d[1];

if
            (
                    !TI_set_text
                    (
                            rtf,
```

- 40 -

```
                1,
                &block_size,
                &runs,
                &rules
5       )
    )
    {
            error = "Could not set text";
            return 1;
10  }
    for (tr = runs; tr != NULL; tr = trnext)
    {
            trnext = tr->tr_Next;
            if
15          (
                ici_call
                (
                    "append_text_run",
                    "o=oisfffiii",
20                  &run,
                    gob,
                    tr->tr_BlockIndex,
                    tr->tr_TypefaceName,
                    tr->tr_SizeInHalfPoints / (2.0 * 72.0) * 25.4,
25                  tr->tr_StartPoint.x,
                    tr->tr_StartPoint.y,
                    tr->tr_RGB[0],
                    tr->tr_RGB[1],
                    tr->tr_RGB[2]
30              )
                !=
                NULL
            )
                return 1;
35          codes = (array_t *)fetch(run, get_cname("codes"));
            if (pushcheck(codes, tr->tr_NumChars))
                return 1;
            widths = (array_t *)fetch(run, get_cname("widths"));
            if (pushcheck(widths, tr->tr_NumChars))
40              return 1;
            for (i = 0; i < tr->tr_NumChars; ++i)
            {
                if ((*codes->a_top = objof(new_int(tr->tr_Chars[i].sc_CharCode))) == NULL)
                    return 1;
45              ++codes->a_top;
                if ((*widths->a_top = objof(new_float(tr->tr_Chars[i].sc_Width))) == NULL)
```

```
                            - 41 - return 1;
                ++widths->a_top;
            }
            free((void *)tr->tr_TypefaceName);
            free(tr->tr_Chars);
            free(tr);
        }
#ifdef    NOTDEF
        for (trl = rules; trl != NULL; trl = trlnext)
        {
            trlnext = trl->trl_Next;
            if
            (
                ici_call
                (
                    "append_text_rule",
                    "oiffffiii",
                    gob,
                    0,/*tr->tr_BlockIndex,*/
                    trl->trl_Start.x,
                    trl->trl_Start.y,
                    trl->trl_End.x,
                    trl->trl_End.y,
                    trl->trl_RGB[0],
                    trl->trl_RGB[1],
                    trl->trl_RGB[2]
                )
                !=
                NULL
            )
                return 1;
            free(trl);
        }
#endif
    return loose_ret(objof(&o_null));
} static int
f_convert_rtf_to_splines()
{
    object_t    *doc;
    object_t    *gob;
    char        *rtf;
    double      dx;
    double      dy;
    FloatXY     block_size;
    int         sum;
    int         total;
```

- 42 -

```
          int       to_cache;
          char      buffer[100];
          if (typecheck("oosffiii", &doc, &gob, &rtf, &dx, &dy, &sum, &total,
      &to_cache))
5             return 1;
          block_size.x = dx;
          block_size.y = dy;
          if (to_cache)
              sprintf(buffer,"Converting text object %d/%d to a group of
10    chars....",sum,total);
          else
              sprintf(buffer,"Converting text object %d/%d to a path....",sum,total);
          start_gauge(buffer);
          TI_construct_spline_outlines(rtf, doc, gob, 1, &block_size, to_cache);
15        return loose_ret(objof(&o_null));
      } static int
      f_update_completion_gauge()
20    {
          int pos;
          if (typecheck("i", &pos))
              return 1;
          update_gauge(pos, NULL);
25        return loose_ret(objof(&o_null));
      } static int
      f_finish_completion_gauge()
30    {
          finish_gauge();
          return loose_ret(objof(&o_null));
      }

35    static int
      f_csc_convert()
      {
          long    l;
          CSC_Map *csc;
40        double  in[3];
          double  out[3];
          float   inf[3];
          float   outf[3];

45        if (typecheck("iFFF", &l, &in[0], &in[1], &in[2]))
              return 1;
          csc = (CSC_Map *)l;
          inf[0] = in[0];
```

- 43 -

```
        inf[1] = in[1];
        inf[2] = in[2];
        if (!CSC_convert_spot(csc, inf, outf))
        {
5           error = CSC_error_message;
            return 1;
        }
        out[0] = outf[0];
        out[1] = outf[1];
10      out[2] = outf[2];
        if (retcheck("-fff", &out[0], &out[1], &out[2]))
            return 1;
        return loose_ret(objof(&o_null));
    }
15
    static cfunc_t    kit_cfuncs[] =
    {
        {CF_OBJ, "get_image_size",   f_get_image_size},
        {CF_OBJ, "option",           f_option},
20      {CF_OBJ, "rip_write",        f_rip_write},
        {CF_OBJ, "rip_flush",        f_rip_flush},
        {CF_OBJ, "flush_render_damage",f_flush_render_damage},
        {CF_OBJ, "damage_render",    f_damage_render},
        {CF_OBJ, "to_inspector",     f_to_inspector},
25      {CF_OBJ, "damage_rect",      f_damage_rect},
        {CF_OBJ, "hit_threshold",    f_hit_threshold},
        {CF_OBJ, "hypot",            f_hypot},
        {CF_OBJ, "paint_cpoint",     f_paint_cpoint},
        {CF_OBJ, "cpoint_outline",   f_cpoint_outline},
30      {CF_OBJ, "rect_outline",     f_rect_outline},
        {CF_OBJ, "dotted_rect",      f_dotted_rect},
        {CF_OBJ, "code_dir",         f_code_dir},
        {CF_OBJ, "set_page_size",    f_set_page_size},
        {CF_OBJ, "get_page_size",    f_get_page_size},
35      {CF_OBJ, "file_dialog",      f_file_dialog},
        {CF_OBJ, "rename_file",      f_rename_file},
        {CF_OBJ, "set_title_bar",    f_set_title_bar},
        {CF_OBJ, "help_keyword",     f_help_keyword},
        {CF_OBJ, "debug",            f_debug},
40      {CF_OBJ, "xor_pen",          f_xor_pen},
        {CF_OBJ, "rgb",              f_rgb},
        {CF_OBJ, "frame",            f_frame},
        {CF_OBJ, "tree_node",        f_tree_node},
        {CF_OBJ, "damage_tree_node", f_damage_tree_node},
45      {CF_OBJ, "tree_line",        f_tree_line},
        {CF_OBJ, "tree_sizes",       f_tree_sizes},
        {CF_OBJ, "window_edge",      f_window_edge},
        {CF_OBJ, "rect_tags",        f_rect_tags},
```

```
            {CF_OBJ,   "blob_tag",        f_blob_tag},
            {CF_OBJ,   "x_tag",           f_x_tag},
            {CF_OBJ,   "polyline",        f_polyline, (int (*)())0},
            {CF_OBJ,   "polycurve",       f_polyline, (int (*)())1},
 5          {CF_OBJ,   "polypoint",       f_polyline, (int (*)())2},
            {CF_OBJ,   "hitpoints",       f_polyline, (int (*)())3},
            {CF_OBJ,   "notice",          f_set_status, (int (*)())S_NOTICE},
            {CF_OBJ,   "why_busy",                   f_set_status, (int (*)())S_WHY_BUSY},
            {CF_OBJ,   "what_selected",  f_set_status, (int (*)())S_WHAT_SELECTED},
10          {CF_OBJ,   "set_error",       f_set_status, (int (*)())S_ERROR},
            {CF_OBJ,   "mode",                        f_set_status, (int (*)())S_MODE},
            {CF_OBJ,   "ropen",           f_ropen},
            {CF_OBJ,   "set_pic_extent", f_set_pic_extent},
            {CF_OBJ,   "locate_image",    f_locate_image},
15          {CF_OBJ,   "update_nhidden",  f_update_nhidden},
            {CF_OBJ,   "lowprec",         f_lowprec},
            {CF_OBJ,   "write_direct",    f_write_direct},
            {CF_OBJ,   "set_text_runs_and_rules",f_set_text_runs_and_rules},
            {CF_OBJ,   "undo_depth",      f_undo_depth},
20          {CF_OBJ,   "convert_rtf_to_splines",f_convert_rtf_to_splines},
            {CF_OBJ,   "update_completion_gauge",f_update_completion_gauge},
            {CF_OBJ,   "finish_completion_gauge",f_finish_completion_gauge},
            {CF_OBJ,   "csc_convert",     f_csc_convert},
        {CF_OBJ}
25  };

BOOL
    register_ici_funcs(void)
    {
30      if (def_cfuncs(kit_cfuncs))
        {
            set_status(S_ERROR, error);
            return FALSE;
        }
35      return TRUE;
    }

/*
     * Exports: left_mouse_down_func()
40   */

/*
     * Handle the left mouse going down in the document window.
     */
45  extern
    left_mouse_down_func()
    {
        auto   old, i, g, gobs, gob;
```

- 45 -

```
/*
 * First, we check to see if the user wants to create a rectangle or
 * or an ellipse.
 */
switch (doc._defered)
{
case "CREATE_RECTANGLE":
case "CREATE_CIRCLE":
        /*
         * Create a new gob (either rectangle or circle) which will be scaled
         * to suit, later on.
         */
        if (doc._defered == "CREATE_RECTANGLE")
                g = unit_rect_shape(doc._downx, doc._downy);
        else
                g = unit_circle_shape(doc._downx, doc._downy);
        /*
         * Clear the deferred variable, as well as any active modifiers, and
         * remove any prompting messages currently visible in the status bar.
         */
        doc._defered = NULL;
        doc._modifiers = $@[set];
        show_mode();
        /*
         * We which to scale the gob which was just created so we add this to the
         * modifier set. We then copy the select set to a temporary variable and
         * then repaint the previously selected tags, causing them all to look
         * unselected. The select is set to contain the new object (no tags drawn
         * yet).
         */ doc._modifiers = set("GRAPHICS_SCALE");
        old = doc._select;
        doc._select = set(g);
        paint_tag_set(old);
        declare_that_tags_etc_look_ok();
        /*
         * Set up all the required drag variables for a scaling operation
         */
        doc._hotx = doc._downx;
        doc._hoty = doc._downy;
        doc._dragx0 = doc._downx + 1;
        doc._dragy0 = doc._downy + 1;
        doc._dragx1 = doc._downx;
        doc._dragy1 = doc._downy;
        doc._drag_ctrl = doc._ctrl;
        doc._drag_shift = doc._shift;
```

- 46 -

```
        /*
         * Let "drag_selection" take care of the rest, as we have set the modifier
type
         * to "GRAPHICS_SCALE".
         */
        drag_selection();
        return 1;
    }

/*
     * If there is nothing to interact with, there is nothing to do.....
     */
    if (doc._tags == NULL)
        return;

/*
     * Check to see if any tags have been hit....
     */
    if (hit())
    {
        /*
         * We check to see if there are any actions previously defered which are
         * waiting for a hit...
         */
        switch (doc._defered)
        {
        case "GRAPHICS_ADD_TO_GROUP":
            /*
             * Check to see that what was hit is actually a group, otherwise it
doesn't
             * make much sense, does it??
             */
            if ((gob = doc._hit_t._gob).what == "group")
            {
                gobs = gob.gobs;
                forall (g in selected_gobs())
                {
                    if (g._parent == NULL)
                    {
                        set_error("Attempt to include document as a whole in a group - Enter it first.");
                        continue;
                    }
                    /*
                     * Remove the current selected gob from its parent's gob
reference array..
                     */
                    elide_from_array(g._parent.gobs, g);
```

- 47 -

```
        /*
         * If there parent has no more children, delete it.
Otherwise, tell the parent
         * to recalc its geometry.
         */
        if (nels(g._parent.gobs) == 0)
                delete_gob(g._parent),
        else
                schedule_geometry_update(g._parent);
        /*
         * Add the current selected gob to the group, and set its
backptr.
         */
        push(gobs, g);
        g._parent = gob;
    }
    /*
     * Recalc the group's geometry..
     */
    schedule_geometry_update(gob):
}
return 0;

case "VIEW_TREE_VIEW":
    return tree_view_mouse_down_hit();
}
/*
 * Check for a hit on a cpoint.
 */
if (doc._hit_t._tagtype == "cpoint")
{
    if ((i = handle_any_defered_cpoint_hit_action()) >= 0)
        return i;
    if (doc._hit_i != 1)
    {
        /*
         * Hit on an in/out handle thingy.
         */
        return hit_on_cpoint_angle_handle("hit-handle");
    }
} if (!doc._select[doc._hit_t])
{
    /*
     * Hit on unselected object.
     */
    if (!doc._shift)
```

- 48 -

```
        {
            /*
             * The shift key wasn't down. Therefore, we deselect all the
currently
             * selected tags, and set the select set to the newly hit tag. We
then
             * repaint the tag set...
             */
            old = doc._select;
            doc._select = set(doc._hit_t);
            paint_tag_set(old);
            paint_tag_set(doc._select);
        }
        else
        {
            /*
             * Just add the newly clicked tag to the select set, and repaint the
tag.
             */
            doc._select[doc._hit_t] = 1;
            paint_tag_set(set(doc._hit_t));
        }
        declare_that_tags_etc_look_ok();
        if (doc._defered != NULL && nels(doc._select) > 0)
        {
            /*
             * We now have something selected, so we are now able to carry
it out...
             */
            action(doc, doc._defered);
            return 0;
        }
    }
    else
    {
        /*
         * Hit on selected object.
         */
        if (doc._shift)
        {
            /*
             * But now it is unselected. Can't do anything with
             * an unselected object.
             */
            doc._select[doc._hit_t] = 0;
            return 0;
        }
    }
```

- 49 -

```
       /*
        * There is a selection and it has been grabbed. We display a message in the
        * status bar sumarising what is selected.
        */
5      say_what_selected();
       /*
        * Set up the initial values of the drag parameters. Then, calculate the initial
        * transformation matrix required for the drag.
        */
10     setup_selection_drag_points();
       calc_transform();
       /*
        * We want to draw representations of the currently selected objects inverted,
        * transformed by the current transformation matrix. Therefore, we add the function
15      * which does this "invert_transformed" to the overlay function set.
        */
       add_overlay_invert_func(invert_transformed);
       /*
        * Since must set "mouse_move_func" to specify what occurs when the mouse moves
20      * during a drag....
        */
       mouse_move_func = [func()
25     {
               /*
                * Clear the status bar...
                */
               what_selected();
30             /*
                * Extract the latest mouse and keyboard info, and upate the drag parameters, using
                * "update_selection_drag_points". In addition, this function calls "remove_overlays"
35              * to XOR out the current overlays. We use this new data to calculate the new
                * transformation matrix.
                */
               update_selection_drag_points();
40             calc_transform();
               /*
                * We draw the overlays in their new position..
                */
               restore_overlays();
45             return 0;
       }];
       mouse_up_func = [func(nomove)
       {
```

- 50 -

```
        /*
         * Clear the message area.
         */
        what_selected();
5       /*
         * ### - not needed. Job done by kill_all_overlays below.
         * remove_overlays();
         */
        if (nomove)
10      {
            /*
             * ### ORIGINAL CODE - I THINK IT IS MOSTLY
REDUNDANT
             *
15           *if (nels(doc._modifiers) == 0)
             *{
             *     kill_all_overlays();
             *     return;
             *}
20           *update_selection_drag_points();
             *calc_transform();
             */

/*
25           * If the mouse did not move during a drag, then we simply kill
the overlays and
             * get out. This is to prevent any "crawling" due to the user
starting the drag
             * at a point slightly away from the centre of the tag.
30           */
            kill_all_overlays();
            return;
        }
        /*
35       * If the mouse did move, purge the overlay set. Then, "solidify" the
result of the
         * drag by applying the current transformation matrix to the currently
selected objects.
         */
40      kill_all_overlays();
        apply_transform_to_selection();
    }];
    return 1;
    }
45  else
    {
        /*
```

- 51 -

```
                * The left button went down, but didn't hit anything. Therefore this is a
        selection drag. where
                * the user drags out a rectangle which contains the tags he/she wants
        selected.
                */
 5              if (!doc._shift)
                {
                    /*
                    * If the shift key is not down, then the user doesn't want to keep any
10      current selections.
                    * Therefore. use the usual method of repainting the tags of the
        current selections so that
                    * they are no longer selected.
                    */
15              old = doc._select;
                doc._select = set();
                paint_tag_set(old);
                declare_that_tags_etc_look_ok();
                }
20              /*
                * Since no tag was hit. we remove any current modifiers, and clear the
        status bar.
                */
            doc._modifiers = set();
25      show_mode();
                /*
                * Since at the start of the drag, the selection rectangle contains nothing, we
        empty "_inrect". We
                * then call the selection rectangle initialisation function "start_drag_rect"
30      which initialises
                * (suprise. suprise!) the global drag parameters.
                */
                doc._inrect = set();
                start_drag_rect();
35              /*
                * Add a function which draws an XORed rectangle (geometry dependent on
        the drag parameters) to
                * the overlay function set.
                */
40              add_overlay_invert_func(invert_drag_rect);
                /*
                * Must define a function which handles a mouse move during a selection
        drag.
                */
45              mouse_move_func = [func()
                {
                    auto t, new, old;
```

```
           /*
            * "tags_in_rect" is called, which examines the contents of "_inrect",
   and
            * includes in "new" the set of tags which are now inside the rectangle
 5 but weren't
            * before; and including in "old" the set of tags which used to be part
   of "_inrect"
            * but aren't now.
            */
10          tags_in_rect(doc._inrect, new = set(), old = set());
           /*
            * Remove the current overlays, and update the drag parameters using
   the latest mouse
            * position data.
15          */
           remove_overlays();
           update_drag_rect();
           /*
            * For all the elements of "old", remove them from the select set,
20 remove them from
            * "_inrect", and repaint their tags.
            */
           if (nels(old) > 0)
           {
25              forall (t in old)
                {
                    doc._select[t] = !doc._select[t];
                    doc._inrect[t] = 0;
                }
30              paint_tag_set(old);
           }
           /*
            * For all the elements of "new", add them from the select set, add
   them to
35          * "_inrect", and repaint their tags.
            */
           if (nels(new) > 0)
           {
               forall (t in new)
40             {
                    doc._select[t] = !doc._select[t];
                    doc._inrect[t] = 1;
                }
               paint_tag_set(new);
45         }
           /*
            * Repaint the overlays in their new position and get out
            */
```

```
                                 - 53 -
                   restore_overlays();
                   return 0;
            }];
            mouse_up_func = [func(nomove)
  5         {
                   /*
                    * Remove the overlays and nuke the set containing the overlay
        functions
                    */
 10                kill_all_overlays();
                   if (doc._defered != NULL && nels(doc._select) > 0)
                          /*
                           * If we have a deferred action ready to go, call action to
        perform it on
 15                        * the newly selected tags.
                           */
                          action(doc, doc._defered);
                   else
                          /*
 20                        * Otherwise, stop any unnecessary redrawing of the tags by
        asserting that
                           * they must currently be fine...
                           */
                          declare_that_tags_etc_look_ok();
 25         }];
            return 1;
         }
      }

30   /*
       * drag_selection - handles a drag on selected objects. It uses functions such as
       "calc_transform" and
       *             "update_selection_drag_points" which query the global state (modifiers
       etc) and
 35    *             draw the intermediate result of the drag as appropriate.
       */
      static
      drag_selection()
      {
 40          /*
              * Calculate the initial transform to be applied to the selected tags, according to
        the current mouse
              * position, active modifiers etc.
              */
 45          calc_transform();
             /*
              * Add a function which draws outlines of the selected objects in XOR mode to
        the overlay set.
```

- 54 -

```
        */
        add_overlay_invert_func(invert_transformed);
        /*
         * Must redefine the mouse move function to describe what happens when the
  5    mouse moves during
         * the drag.
         */
        mouse_move_func = [func()
        {
             /*
 10           * Update the drag variables according to the current mouse position etc.
        This function also
             * calls "remove_overlays" to XOR out the currently displayed overlays.
             */
 15         update_selection_drag_points();
             /*
             * Recalculate the required transform. according to the new mouse position.
        Then, redraw the
             * overlays using this new transform.
 20          */
             calc_transform();
             restore_overlays();
             return 0;
        }].
 25     /*
         * We must redefine the mouse up function, to specify what occurs when the
        mouse button comes up
             * and the drag is completed.
             */
 30     mouse_up_func = [func(nomove)
        {
             /*
             * ### I think some of this code is a little redundant....
             */
 35         remove_overlays();
             if (nomove)
             {
                  if (nels(doc._modifiers) == 0)
                  {
 40                   kill_all_overlays();
                      return;
                  }
                  update_selection_drag_points();
                  calc_transform();
 45         }
             kill_all_overlays();
             apply_transform_to_selection();
        }];
```

- 55 -

```
        }

/*
      * Establish initial values in the doc for:
      *     _drag{x.y},{0.1}
      *     _hot(x,y)
      *
      * Using:
      *     The extent of the current selection.
      *     _down{x.y}
      */
        extern
        setup_selection_drag_points()
        {
                auto ex;

/*
                 * Obtain the bounding box of the selected tags
                 */
                ex = selection_extent();
                if (doc._modifiers["GRAPHICS_ROTATE_CENTERED"] ||
        doc._modifiers["GRAPHICS_SCALE_CENTERED"])
                {
                        /*
                         * Set the hot point to the centre of the selection.
                         */
                        doc._hotx = (ex._xmin + ex._xmax) / 2.0;
                        doc._hoty = (ex._ymin + ex._ymax) / 2.0;
                }
                else
                {
                        /*
                         * Set the hot point to the corner furthest from
                         * the mouse down point.
                         */
                        if (abs(ex._xmin - doc._downx) > abs(ex._xmax - doc._downx))
                                doc._hotx = ex._xmin;
                        else
                                doc._hotx = ex._xmax;
                        if (abs(ex._ymin - doc._downy) > abs(ex._ymax - doc._downy))
                                doc._hoty = ex._ymin;
                        else
                                doc._hoty = ex._ymax;
                }
                if (doc._hit_t != NULL)
                {
                        /*
```

- 56 -

```
         * If we know what was hit, we can "snap" the drag start position to the
         * exact position of the selection.
         */
        doc._dragx0 = doc._hit_x;
5       doc._dragy0 = doc._hit_y;
    }
    else
    {
        /*
10       * Otherwise, we just start at the current mouse position.
         */
        doc._dragx0 = doc._downx;
        doc._dragy0 = doc._downy;
    }
15   /*
     * Set the initial endpoint of the drag to be current mouse position, and load
     * current state of the CTRL and SHIFT keys into their drag equivalents.
     */
    doc._dragx1 = doc._downx;
20  doc._dragy1 = doc._downy;
    doc._drag_ctrl = doc._ctrl;
    doc._drag_shift = doc._shift;
}

25 /*
   * Update the drag paramaters in the document structure according to the latest mouse
   position
   */
   extern
30 update_selection_drag_points()
   {
       if (is_enabled("OPTIONS_DRAG_SNAP"))
           /*
            * If "drag snapping" is enabled, draw the snapping lines as required. Note
35  that the
            * drag position etc is updated inside the function which handles the tag
   snapping.
            */
           snap_drag_to_tags();
40     else
       {
           /*
            * Otherwise, we simply XOR out the current overlays and update the drag
   endpoint using
45          * the current mouse position.
            */
           remove_overlays();
           doc._dragx1 = doc._nowx;
```

- 57 -

```
                doc._dragy1 = doc._nowy;
        }
        /*
         * Update the keyboard stuff we are interested in...
         */
        doc._drag_ctrl = doc._ctrl;
        doc._drag_shift = doc._shift;
}

/*
 * start_drag_rect - initialise the drag parameters for a selection drag (an XOR
rectangle)
 */
extern
start_drag_rect()
{
        doc._dragx0 = doc._downx;
        doc._dragy0 = doc._downy;
        doc._drag_ctrl = doc._ctrl;
        doc._drag_shift = doc._shift;
        doc._dragx1 = doc._downx;
        doc._dragy1 = doc._downy;
}

/*
 * update_drag_rect - a function to update the drag parameters according to the new
mouse
 *              position and keyboard status.
 */
extern
update_drag_rect()
{
        doc._dragx1 = doc._nowx;
        doc._dragy1 = doc._nowy;
        doc._drag_ctrl = doc._ctrl;
        doc._drag_shift = doc._shift;
}

/*
 * invert_drag_rect - function to draw an XORed rectangle, according to the current
 *              drag parameters.
 */
extern
invert_drag_rect()
{
        /*
         * Use a white pen, as when it's XORed onto white, it will become black.
```

- 58 -

```
         */
         rgb(1, 1, 1);
         /*
          * Switch on the XOR drawing mode, draw the rectangle, and then switch
5         * off XOR drawing.
          */
         xor_pen(doc, 1);
         frame(doc, doc._dragx0, doc._dragy0, doc._dragx1, doc._dragy1);
         xor_pen(doc, 0);
10    }

/*
       * add_overlay_invert_func - adds a function which adds an overlay drawing function to
       *                 the "overlay_restorers" set. It then calls "restore_overlays"
15     *                 to draw the overlay in its initial position. Therefore, the
       *                 initial drag info must already have been calculated before this
       *                 function is called.
       */
      extern
20    add_overlay_invert_func(func)
      {
          doc._overlay_restorers[func] = 1;
          restore_overlays();
      }
25
      /*
       * restore_overlays - Executes all the overlay drawing functions in the
       "overlay_restorers" set
       *                 and then moves them to the "overlay_removers" set for later removal.
30     */
      extern
      restore_overlays()
      {
          auto func;
35
          forall (func in doc._overlay_restorers)
          {
              func();
              doc._overlay_removers[func] = 1;
40        }
          doc._overlay_restorers = set();
      }

/*
45     * remove_overlays - Executes all the overlay drawing functions in the
      "overlay_removers" set,
       *                 effectively removing overlays which have already been drawn. They
      functions
```

- 59 -

```
 *              are then moved to the "overlay_restorers" set to be drawn later in a
    new position.
    */
    extern
5   remove_overlays()
    {
        auto func;

forall (func in doc._overlay_removers)
10      {
            func().
            doc._overlay_restorers[func] = 1;
        }
        doc._overlay_removers = set();
15  }

/*
     * kill_all_overlays - removes all current overlays by executing all the functions in the
     *              "remove_overlays" set. It then empties both sets.
20   */
    extern
    kill_all_overlays()
    {
        auto func;
25
        forall (func in doc._overlay_removers)
            func();
        doc._overlay_removers = set();
        doc._overlay_restorers = set();
30  } extern
    duplicate_selection()
    {
35      auto g;
        auto p;

forall (g in selected_gobs())
        {
40          push(g._parent == NULL ? doc.gobs : g._parent.gobs, deep_copy_gob(g.
    1));
            set_back_refs(g._parent == NULL ? doc : g._parent);
        }
    }
45
    extern
    deep_copy_gob(g, selection_only)
    {
```

- 60 -

```
        auto newg, child;
        auto e, newe;
        auto p, newp;
        auto k, v;
5
        switch (g.what)
        {
        case "group":
        case "coladj":
10          newg = copy(g);
            forall (v, k in newg)
            {
                if
                (
15                  typeof(k) == "string"
                    &&
                    k !~ #^_#
                    &&
                    k != "gobs"
20              )
                    newg[k] = deep_copy(v),
            }
            newg.gobs = array();
            forall (child in g.gobs)
25          {
                push(newg.gobs, deep_copy_gob(child, 0));
            }
            break;

30      case "shape":
            newg = copy(g);
            forall (v, k in newg)
            {
                if
35              (
                    typeof(k) == "string"
                    &&
                    k !~ #^_#
                    &&
40                  k != "edges"
                )
                    newg[k] = deep_copy(v);

}
45          newg.edges = array();
            forall (e in g.edges)
            {
                angles_from_points(e.points);
```

```
                newe = copy(e);
                newe.points = array();
                forall (p in e.points)
                {
                    if (!selection_only || doc._select[p] || doc._select[g])
                    {
                        push(newe.points, newp = copy(p));
                        if (doc._select[p])
                        {
                            doc._select[p] = 0;
                            doc._select[newp] = 1;
                            newp._gob = newg;
                        }
                    }
                }
                if (nels(newe.points) != 0)
                {
                    points_from_angles(newe.points);
                    push(newg.edges, newe);
                }
            }
            break;

case "text":
        case "rtf":
        case "char":
        case "image":
            newg = deep_copy(g);
            break;
        }
        if (doc._select[g])
        {
            doc._select[g] = 0;
            doc._select[newg] = 1;
            newg._gob = newg;
        }
        return newg;
    }

/*
     * deep_copy
     *
     * Deep copy the saveable portions of x. I.e. the things which
     * don't start with an underbar.
     */
    static
    deep_copy(x)
    {
```

- 62 -

```
        auto v, k;

if (!isatom(x))
        {
            x = copy(x);
            forall (v, k in x)
            {
                if (typeof(k) == "string" && k - #^_#)
                    x[k] = NULL;
                else if (isatom(v))
                    continue;
                else
                    x[k] = deep_copy(v);
            }
        }
        return x;
}

/*
 * Set all backward references in this gob sub-tree. Sets:
 *
 *      _parent       The parent gob of this object.
 *      _gob          The gob associated with this object.
 *      _edge         The edge a cpoint is in.
 */
extern
set_back_refs(gob)
{
        auto g, e, p;

gob._gob = gob;
        switch (gob.what)
        {
        case "group":
        case "coladj":
                forall (g in gob.gobs)
                {
                        g._parent = gob;
                        g._gob = g;
                        set_back_refs(g);
                }
                break;

case "shape":
                forall (e in gob.edges)
                {
                        e._parent = gob;
                        e._gob = gob;
```

- 63 -

```
                    forall (p in e.points)
                    {
                        p._parent = gob;
                        p._gob = gob;
    5                   p._edge = e;
                    }
                }
            case "text":
            case "rtf":
    10          forall (p in gob.points)
                {
                    p._parent = gob;
                    p._gob = gob;
                }
    15      break;
            }
        } extern
    20  extract_gob(g)
        {
            if (g._parent == NULL)
                return;
            do
    25      {
                doc._bad_geometry[g] = 0;
                doc._select[g] = 0;
                if (g._parent != NULL)
                    elide_from_array(g._parent.gobs, g);
    30      } while ((g = g._parent) != NULL && nels(g.gobs) == 0);

schedule_geometry_update(g == NULL ? g : doc);
        }
    35  extern
        delete_gob(g)
        {
            if (g == doc._shape)
    40      {
                doc._shape = NULL;
                doc._edge = NULL;
                doc._point = NULL;
            }
    45      if (g._parent == NULL)
                return;
```

- 64 -

```
        do
        {
                doc._bad_geometry[g] = 0;
                doc._select[g] = 0;
5               if (g._parent != NULL)
                        elide_from_array(g._parent.gobs, g);

} while ((g = g._parent) != NULL && nels(g.gobs) == 0);

10      schedule_geometry_update(g == NULL ? g : doc);
        } extern
        delete_selection()
15      {
                auto select_point;
                auto t, g;

select_point = nels(doc._select) == 1 && doc._select[doc._point];
20
                set_back_refs(doc);

forall (t in doc._select)
                {
25                      g = t._gob;
                        switch (t._tagtype)
                        {
                        case "rect":
                        case "spots":
30                              delete_gob(g);
                                break;

case "cpoint":
                                angles_from_points(t._edge.points);
35                              elide_from_array(t._edge.points, t);
                                if (doc._point == t)
                                        doc._point = top(t._edge.points);
                                if (nels(t._edge.points) == 0)
                                {
40                                      elide_from_array(g.edges, t._edge);
                                        if (nels(g.edges) == 0)
                                                delete_gob(g);
                                }
                                else
45                                      points_from_angles(t._edge.points);
                                schedule_geometry_update(g);
                                break;
                        }
```

- 65 -

```
              }
              if (select_point && doc._point != NULL)
                    doc._select = set(doc._point);
              else
  5                 doc._select = set();
        } static
        say_what_selected()
 10     {
              auto g;

if (nels(doc._select) == 0)
              {
 15                 what_selected();
                    return;
              }
              if (nels(doc._select) > 1)
              {
 20                 what_selected(sprintf("%d objects.", nels(doc._select)));
                    return;
              }
              forall (g in doc._select)
                    break;
 25           if (g._gob == g)
              {
                    switch (g.what)
                    {
                    case "group":
 30                       what_selected(sprintf("An '%s' group of %d object(s)%s; %.1fmm x
        %.1fmm.",
                                g.op,
                                nels(g.gobs),
                                g.ckeys != NULL ? " (with cmap)" : "",
 35                             g._xmax - g._xmin,
                                g._ymax - g._ymin,
                          ));
                          break;
                    case "coladj":
 40                       what_selected(sprintf("An color adjusted object; %.1fmm x
        %.1fmm.",
                                g._xmax - g._xmin,
                                g._ymax - g._ymin,
                          ));
 45                       break;

case "text":
                          what_selected(sprintf("A text object; %.1fmm x %.1fmm.",
```

- 66 -

```
                    g._xmax - g._xmin,
                    g._ymax - g._ymin,
                ));
                break;
        case "rtf":
                what_selected(sprintf("An RTF text object: %.1fmm x %.1fmm.",
                    g.dh,
                    g.dv,
                ));
                break;
        case "char":
                what_selected(sprintf("A character: %.1fmm x %.1fmm.",
                    g.dh,
                    g.dv,
                ));
                break;

case "image":
                what_selected(sprintf("The image '%s': %.1fmm x %.1fmm.",
                    g.fname,
                    g._xmax - g._xmin,
                    g._ymax - g._ymin,
                ));
                break;

case "shape":
                if (nels(g.edges) > 1)
                {
                    what_selected(sprintf("A %d edge shape: %.1fmm x %.1fmm.",
                        nels(g.edges),
                        g._xmax - g._xmin,
                        g._ymax - g._ymin,
                    ));
                }
                else
                {
                    what_selected(sprintf("A single edge, %d point shape  %.1fmm x %.1fmm.",
                        nels(g.edges[0].points),
                        g._xmax - g._xmin,
                        g._ymax - g._ymin,
                    ));
                }
                break;
        }
    }
}
```

- 67 -

APPENDIX B

ICI Technical Description

Version 1.0

Tim Long

Portions © 1992-1995 Canon Information Systems Research Australia
Portions © 1992-1995 Tim Long Permission granted to reproduce as is for non-commercial use.

The ICI interpreter's *execution engine* calls on the *parser* to read and compile a statement from an input stream. The parser in turns calls on the *lexical analyser* to read tokens. Upon return from the parser the execution engine executes the compiled statement. When the statement has finished execution, the execution engine repeats the sequence.

The lexical analyser

The ICI lexical analyser breaks the input stream into tokens, optionally separated by whitespace (which includes comments as described below). The next token is always the longest string of following characters which could possibly be a token. The following are tokens:

```
/      /=     $      @      (      )      {      }
,      -      --     --=    ---    [      ]      .
*      *=     %      %=     ^      ^=     +      +=
++     -      -=     --     ->     >      >=     >>
>>=    <      <=     <=>    <<     <<=    =      ==
!      !=     !~     &      &&     &=     |      ||
|=     ;      ?      :
```

The following are also tokens:

- The character '#' followed by any sequence of characters except a newline, then another '#'. This token is a *regular-expression*.

- The character ' (single quote) followed by a single character (other than a newline) or a single *backslash character sequence* (described below), followed by another single quote. This token is a *character-code*. A single quote followed by other than the above sequence will result in an error.

- The character " (double quote) followed by any sequence of characters (other than a newline) and *backslash character sequences*, up to another double quote character. This token is a *string*.

A *backslash character sequence* is any of the following:

\n     newline (ASCII 0x0A)
\t     tab (ASCII 0x09)

- 68 -

| | |
|---|---|
| \v | vertical tab (ASCII 0x0B) |
| \b | back space (ASCII 0x08) |
| \r | carriage return (ASCII 0x0D) |
| \f | form feed (ASCII 0x0C) |
| \a | audible bell (ASCII 0x07) |
| \e | escape (ASCII 0x1B) |
| \\ | backslash (ASCII 0x5C) |
| \' | single quote (ASCII 0x27) |
| \" | double quote (ASCII 0x22) |
| \? | question mark (ASCII 0x3F) |
| \cx | control-x |
| \xx... | the character with hex code x... |
| \n | the character with octal code n. (1, 2 or 3 octal digits) |

Consecutive string-literals, seperated only by white-space, are concatenated to form a single strings-literal.

- Any upper or lower case letter, any digit, or '_' (underscore) followed by any number of the same (or other characters which may be involved in a floating point number while that is a valid interpretation). A token of this form may be one of three things:

If it can be interpreted as an integer, it is an *integer-number*.

Otherwise, if it can be interpreted as a floating point number, it is a *floating-point-number*.

Otherwise, it is an *identifier*.

Notice that keywords are not recognised directly by the lexical analyser. Instead, certain identifiers are recognised as keywords by the parser as described below.

Comments (which are white-space) are started with the characters /* and continue until the next */. Also, lines which start with a # character are ignored.

An introduction to variables, modules and scope

Variables are simple identifiers which have a value associated with them. They are in themselves typeless, depending on the type of the value currently assigned to them.

The term *module* in ICI refers to a collection of functions, declarations and code which share the same variables. Typically each source file is a module, but not necessarily.

In ICI, modules may be nested in a hierarchical fashion. Within a module, variables can be declared as either *static* or *extern*. When a variable is declared as static it is visible to code defined in the module of its definition, and to code defined in sub-modules of that one. This is termed the *scope* of the variable.

When a variable is defined as *extern* it is declared *static* in the parent module. Thus the parent module and all sub-modules of the parent module have that variable in their scope. Variables

- 69 - of this type, whether originally declared extern or static, will be henceforward referred to as static variables.

Static variables are persistent variables. That is they remain in existence even when execution completely leaves their scope, despite not being visible to any executing code. They are visible again when code flow again enters their scope.

The scoping of static variables is strictly governed by the nesting of the modules, not by the flow of execution. For example. Suppose two neighbouring modules (call them module A and module B) each define a variable called theVariable. When some code in module A calls a function defined in module B and that function refers to theVariable; it is referring to the version of theVariable defined in module B, not the one defined in module A.

Variables in sub scopes hide variables of the same name defined in outer scopes.

The second type of variable in ICI is the *automatic*, or *auto*, variable. Automatic variables are not persistent. They last only as long as a module is being parsed or a function is being executed. For instance. each time a function is entered a copy is made of the auto variables which were declared in the function. This group of variables generally only persists during the execution of the function: once the function returns they are discarded.

The parser

The parser uses the lexical analyser to read a source input stream. The parser also has reference to the variable-scope within which this source is being parsed, so that it may define variables.

The parser will define variables within the current scope, and. when code is parsed at the outermost level, return it to the execution engine for execution.

For some constructs the parser will in turn call upon the execution engine to evaluate a subconstruct within a statement.

The following sections will work through the syntax of ICI with explanations and examples. Occasionally constructs will be used ahead of their full explanation. Their intent should be obvious.

The following notation is used in the syntax in these sections. Note that the syntax given in the text is not always exact, but rather designed to aid comprehension. The exact syntax is given in a later section.

| | |
|---|---|
| bold | The bold text is literal ASCII text. |
| *italic* | The *italic* text is a construct further described elsewhere. |
| [ xxx ] | The xxx is optionally present. |
| xxx... | The xxx may be present zero or more times. |

- 70 -

As noted previously there are no reserved words recognised by the lexical anaylyser, but certain identifiers will be recognised by the parser in certain syntactic positions (as seen below). While these identifiers are not otherwise restricted, special action may need to be taken if they are used as simple variable names. They probably should be avoided. The complete list is:

```
NULL      auto      break     case
continue  default   do        else
extern    for       forall    if
in        onerror   return    static
switch    try       while
```

We now turn our attention to the syntax itself.

Firstly consider the basic statement which is the unit of operation of the parser. As stated earlier the execution engine will call on the parser to parse one top-level statement at a time. We split the syntax of a statement into two categories (purely for semantic clarity):

*statement*  *executable-statement*
    *declaration*

That is, a statement is either an *executable-statement* or a *declaration*. We will first consider the *executable-statement*.

These are statements that, at the top-level of parsing, can be translated into code which can be returned to the execution engine. This is by far the largest category of statements:

*executable-statement* expression ;
    *compound-statement*
    if ( *expression* ) *statement*
    if ( *expression* ) *statement* else *statement*
    while ( *expression* ) *statement*
    do *statement* while ( *expression* ) ;
    for ( [ *expression* ]; [ *expression* ]; [ *expression* ] ) *statement*
    forall ( *expression* [ , *expression* ] in *expression* ) *statement*
    switch ( *expression* ) *compound-statement*
    case *parser-evaluated-expression* :
    default ;
    break ;
    continue ;
    return [ *expression* ] ;
    try *statement* onerror *statement*
    ;

These are the basic executable statement types. Many of these involve *expressions*, so before examining each statement in turn we will examine the *expression*. We will do this by starting with the most primitive elements of expressions and working back up to the top level.

The lowest level building block of an expressions is the *factor*:

- 71 -

| | |
|---|---|
| *factor* | *integer-number*<br>*character-code*<br>*floating-point-number*<br>*string*<br>*regular-expression*<br>*identifier*<br>NULL<br>( *expression* )<br>[ array *expression-list* ]<br>[ set *expression-list* ]<br>[ struct [ : *expression* , ] *assignment-list* ]<br>[ func *function-body* ] |

The constructs *integer-number*, *character-code*, *floating-point-number*, *string*, and *regular-expression* are primitive lexical elements (described above). Each is converted to its internal form and is an object of type *int*, *int*, *float*, *string*, or *regexp* respectively.

A *factor* which is an *identifier* is a variable reference. But its exact meaning depends upon its context within the whole expression. Variables in expressions can either be placed so that their value is being looked up, such as in:

```
a + 1
```

Or they can be placed so that their value is being set, such as in:

```
a = 1
```

Or they can be placed so that their value is being both looked up and set, as in:

```
a += 1
```

Only certain types of expression elements can have their value set. A variable is the simplest example of these. Any expression element which can have its value set is termed an *lvalue* because it can appear on the left hand side of an assignment (which is the simplest expression construct which requires an lvalue). Consider the following two expressions:

```
1 = 2        /* WRONG */
a = 2        /* OK */
```

The first is illegal because an integer is not an lvalue, the second is legal because a variable reference is an lvalue. Certain expression elements, such as assignment, require an operand to be an lvalue. The parser checks this.

The next factor in the list above is NULL. The keyword NULL stands for the value NULL which is the general undefined value. It has its own type, NULL. Variables which have no explicit initialisation have an initial value of NULL. Its other uses will become obvious later in this document.

- 72 -

Next is the construct ( *expression* ). The brackets serve merely to make the expression within the bracket act as a simple factor and are used for grouping, as in ordinary mathematics.

Finally we have the four constructs surrounded by square brackets. These are textual descriptions of more complex data items; typically known as *literals*. For example the factor:

```
[array 5, 6, 7]
``` is an array of three items, that is, the integers 5, 6 and 7. Each of these square bracketed constructs is a textual description of a data type named by the first identifier after the starting square bracket. A full explanation of these first requires an explanation of the fundamental aggregate types.

An introduction to arrays, sets and structs

There are three fundamental aggregate types in ICI: arrays, sets, and structs. Certain properties are shared by all of these (and other types as will be seen later). The most basic property is that they are each collections of other values. The next is that they may be "indexed" to reference values within them. For example, consider the code fragment:

```
a = [array 5, 6, 7];
i = a[0];
```

The first line assigns the variable a an array of three elements. The second line assigns the variable i the value currently stored at the *first* element of the array. The suffixing of an expression element by an expression in square brackets is the operation of "indexing", or referring to a sub-element of an aggregate, and will be explained in more detail below.

Notice that the *first* element of the array has index *zero*. This is a fundamental property of ICI arrays.

The next ICI aggregate we will examine is the set. Sets are unordered collections of values. Elements "in" the set are used as indexes when working with the set, and the values looked up and assigned are interpreted as a booleans. Consider the following code fragment:

```
s = [set 200, 300, "a string"];
if (s[200])
    printf("200 is in the set\n");
if (s[400])
    printf("400 is in the set\n");
if (s["a string"])
    printf("\"a string\" is in the set\n");
s[200] = 0;
if (s[200])
    printf("200 is in the set\n");
```

When run, this will print:

- 73 -

```
200 is in the set
"a string" is in the set
```

Notice that there was no second printing of "200 is in the set" because it was removed from the set on the third last line by assigning zero to it.

Now consider structs. Structs are unordered collections of values indexed by any values. Other properties of structs will be discussed later. The typical indexes of structs are strings. For this reason notational shortcuts exist for indexing structures by simple strings. Also, because each element of a struct is actually an index and value pair, the syntax of a struct literal is slightly different from the arrays and sets seen above. Consider the following code fragment:

```
s = [struct a = 123, b = 456, xxx = "a string"];
printf("s[\"a\"] = %d\n", s["a"]);
printf("s.a = %d\n", s.a);
printf("s.xxx = \"%s\"\n", s.xxx);
```

Will print:

```
s["a"] = 123
s.a = 123
s.xxx = "a string"
```

Notice that on the second line the structure was indexed by the string "a", but that the assignment in the struct literal did not have quotes around the *a*. This is part of the notational shortcut which will be discussed further, below. Also notice the use of *s.a* in place of s["a"]. This is a similar shortcut, also discussed below.

Back to expression syntax

The aggregate literals, which in summary are:

> [ array *expression-list* ]
> [ set *expression-list* ]
> [ struct [ : *expression* . ] *assignment-list* ]
> [ func *function-body* ]

involve three further constructs, the *expression-list*, which is a comma separated list of expressions; the *assignment-list*, which is a comma separated list of assignments; and the *function-body*, which is the argument list and code body of a function. The syntax of the first of these is:

*expression-list*    *empty*
                      *expression* [ , ]
                      *expression* , *expression-list*

The *expression-list* is fairly simple. The construct *empty* is used to indicate that the whole

- 74 - list may be absent. Notice the optional comma after the last expression. This is designed to allow a more consistent formatting when the elements are line based, and simpler output from programmatically produced code. For example:

```
[array
    "This is the first element",
    "This is the second element",
    "This is the third element",
]
```

The assignment list has similar features:

*assignment-list*  empty
               *assignment [ , ]*
               *assignment , assignment-list*

*assignment*     *struct-key = expression*

*struct-key*     *identifier*
               *( expression )*

Each *assignment* is either an assignment to a simple identifier or an assignment to a full expression in brackets. The assignment to an identifier is merely a notational abbreviation for an assignment to a string. The following two struct literals are equivalent:

```
[struct abc = 4]
[struct ("abc") = 4]
```

The syntax of a *function-body* is:

*function-body*   *( identifier-list ) compound-statement*

*identifier-list*  empty
               *identifier [ , ]*
               *identifier , identifier-list*

That is, an *identifier-list* is an optional comma separated list of *identifiers* with an optional trailing comma. Literal functions are rare in most programs; functions are normally named and defined with a special declaration form which will be seen in more detail below. The following two code fragments are equivalent; the first is the abbreviated notation:

```
static fred(a, b){return a + b;}
``` and:

```
static fred = [func (a, b){return a + b;}];
```

The meaning of functions will discussed in more detail below.

Aggregates in general, and literal aggregates in particular, are fully nestable:

```
[array
    [struct a = 1, c = 2],
    [set "a", 1.2, 3],
    "a string",
    :
```

Note that aggregate literals are entirely evaluated by the parser. That is, each expression is evaluated and reduced to a particular value, these values are then used to build an object of the required type. For example:

```
[struct a = sin(0.5), b = cos(0.5)]
```

Causes the functions sin and cos to be called during the parsing process and the result assigned to the keys $a$ and $b$ in the struct being constructed. It is possible to refer to variables which may be in existence while such a literal is being parsed[1].

This ends our consideration of the lowest level element of an expression, the *factor*.

A simple factor may be adorned with a sequence of *primary-operations* to form a *primary-expression*. That is:

*primary-expression*    factor primary-operation...

*primary-operation*    [ *expression* ]
. *identifier*
. ( *expression* )
-> *identifier*
-> ( *expression* )
( *expression-list* )

The first *primary-operation* (above) we have already seen. It is the operation of "indexing" which can be applied to aggregate types. For example, if *xxx* is an array:

```
xxx[10]
``` refers to the element of xxx at index 10. The parser does not impose any type restrictions (because typing is dynamic), although numerous type restrictions apply at execution time (for instance, arrays may only be indexed by integers, and floating point numbers are not able to be indexed at all).

The second form, . *identifier*, is a notational abbreviation of [ "*identifier*" ], as seen previ-

---

[1] Literal aggregates are analagous to literal strings in K&R C. And likewise they have the property that modifications to the literal are persistent. Returning to the original use of the literal after it has been modified does not magically restore it to its original value.

- 76 - ously. Similarly the third form is again just a notational variation. Thus the following are all equivalent:

```
xxx["aaa"]
xxx.aaa
xxx.("aaa")
```

And the following are also equivalent to each other:

```
xxx[1 + 2]
xxx.(1 + 2)
```

Note that factors may be suffixed by any number of *primary-operations*. The only restriction is that the types must be right during execution. Thus:

```
xxx[123].aaa[10]
``` is legal.

The two constructs

> -> *identifier*
> -> ( *expression* )

are again notational variations. In general, constructs of the form:

> *primary-expression* -> *identifier*
> *primary-expression* -> ( *expression* )

are re-written as:

> ( * *primary-expression* ) . *identifier*
> ( * *primary-expression* ) . ( *expression* )

The unary operator * used here is the indirection operator, its meaning is discussed later.

The last of the *primary-operations*:

> ( *expression-list* )

is the function call operation. Although, as usual, no type checking is performed by the parser; at execution time the thing it is applied to must be a function. For example:

```
my_function(1, 2, "a string")
```

- 77 - and

```
xxx.array_of_funcs[10]()
``` are both function calls. Function calls will be discussed in more detail below.

This concludes the examination of a *primary-expression*.

Primary-expressions are combined with prefix and postfix unary operators to make terms:

*term*             *[ prefix-operator...] primary-expression [ postfix-operator... ]*

*prefix-operator*  Any of:
                   \* & - + ! ~ ++ -- @ $

*postfix-operator* Any of:
                   ++ --

That is, a *term* is a *primary-expression* surrounded on both sides by any number of prefix and postfix operators. Postfix operators bind more tightly than prefix operators. Both types bind right-to-left when concatenated together. That is: - !x is the same as - (!x). As in all expression compilation, no type checking is performed by the parser, because types are an execution-time consideration.

Some of these operators touch on subjects not yet explained and so will be dealt with in detail in later sections. But in summary:

Prefix operators

- \*  Indirection; applied to a pointer, gives target of the pointer.
- &  Address of: applied to any lvalue, gives a pointer to it.
- -  Negation; gives negative of any arithmetic value.
- +  Positive; no real effect.
- !  Logical not; applied to 0 or NULL, gives 1, else gives 0.
- ~  Bit-wise complement.
- ++ Pre-increment; increments an lvalue and gives new value.
- -- Pre-decrement; decrements an lvalue and gives new value.
- @  Atomic form of; gives the (unique) read-only version of any value.
- $  Immediate evaluation; see below.

Postfix operators

- ++ Post-increment; increments an lvalue and gives old value.
- -- Post-increment; decrements an lvalue and gives old value.

- 78 -

One of these operators, $, is only a pseudo-operator. It actually has its effect entirely at parse time. The $ operator causes its subject expression to be evaluated immediately by the parser and the result of that evaluation substituted in its place. This is used to speed later execution, to protect against later scope or variable changes, and to construct constant values which are better made with running code than literal constants. For example, an expression involving the square root of two could be written as:

x = y + 1.414213562373095;

Or it could be written more clearly, and with less chance of error, as:

x = y + sqrt(2.0);

But this construct will call the square root function each time the expression is evaluated. If the expression is written as:

x = y + $sqrt(2.0);

The square root function will be called just once, by the parser, and will be equivalent to the first form.

When the parser evaluates the subject of a $ operator it recursively invokes the execution engine to perform the evaluation. As a result there is no restriction on the activity which can be performed by the subject expression. It may reference variables, call functions or even read files. But it is important to remember that it is called at parse time. Any variables referenced will be immediately interrogated for their current value. Automatic variables of any expression which is contained in a function will not be available, because the function itself has not yet been invoked: in fact it is clearly not yet even fully parsed.

The $ operator as used above increased speed and readability. Another common use is to avoid later re-definitions of a variable. For instance:

($printf)("Hello world\n");

Will use the *printf* function which was defined at the time the statement was parsed, even if it is latter re-defined to be some other function. It is also slightly faster, but the difference is small when only a simple variable look-up is involved. Notice the bracketing which has been used to bind the $ to the word *printf*. Function calls are primary operations so the $ would have otherwise referred to the whole function call as it did in the first example.

This concludes our examination of a *term* (remember that the full meaning of other prefix and postfix operators will be discussed in later sections). We will now turn to the top level of expressions where *terms* are combined with binary operators:

*expression*    *term*
                  *expression infix-operator expression*

- 79 -

| | |
|---|---|
| *infix-operator* | Any of: |
| | * / % |
| | + - |
| | >> << |
| | < > <= >= |
| | == != ~ !~ ~~ ~~~ |
| | & |
| | ^ |
| | \| |
| | && |
| | \|\| |
| | : |
| | ? |
| | = += -= *= /= %= >>= <<= &= ^= \|= ~= ~~= <=> |
| | , |

That is, an *expression* can be a simple *term*, or two *expressions* separated by an *infix-operator*. The ambiguity amongst expressions built from several binary-operator separated expressions is resolved by assigning each operator a precedence and also applying rules for order of binding amongst equal precedence levels[2]. The lines of binary operators in the syntax rules above summarise their precedence. Operators on higher lines have higher precedence than those on lower lines. Thus 1+2*3 is the same as 1+(2*3). Operators which share a line have the same precedence. All operators except those on the second last line group left-to-right. Those on the second last line (the assignment operators) group right-to-left. Thus a * b / c is the same as:

(a * b) / c

But:

a = b += c is the same as:

a = (b += c)

As with unary operators, the full meaning of each will be discussed in a later section. But in summary:

Binary operators

* Multiplication, Set intersection

---

[2] The precedences and rules are identical to those of C.

- 80 -

| | |
|---|---|
| / | Division |
| % | Modulus |
| + | Addition, Set union |
| - | Subtraction, Set difference |
| >> | Right shift (shift to lower significance) |
| << | Left shift (shift to higher significance) |
| < | Logical test for less than, Proper subset |
| > | Logical test for greater than, Proper superset |
| <= | Logical test for less than or equal to, Subset |
| >= | Logical test for greater than or equal to, Superset |
| == | Logical test for equality |
| != | Logical test for inequality |
| ~ | Logical test for regular expression match |
| !~ | Logical test for regular expression non-match |
| ~~ | Regular expression sub-string extraction |
| ~~~ | Regular expression multiple sub-string extraction |
| & | Bit-wise and |
| ^ | Bit-wise exclusive or |
| \| | Bit-wise or |
| && | Logical and |
| \|\| | Logical or |
| : | Choice separator (must be right hand subject of ? operator) |
| ? | Choice (right hand expression must use : operator) |
| = | Assignment |
| += | Add to |
| -= | Subtract from |
| *= | Multiply by |
| /= | Divide by |
| %= | Modulus by |
| >>= | Right shift by |
| <<= | Left shift by |
| &= | And by |
| ^= | Exclusive or by |
| \|= | Or by |
| ~~= | Replace by regular expression extraction |
| <=> | Swap values |
| , | Multiple expression separator |

- 81 -

This concludes our consideration of *expressions*. We will now move on to each of the executable statement types in turn.

Simple expression statements

The simple expression statement:

*expression* ;

Is simply an expression followed by a semicolon. The parser translates this expression to its executable form. Upon execution the expression is evaluated and the result discarded. Typically the expression will have some side-effect such as assignment, or make a function call which has a side-effect, but there is no explicit requirement that it do so. Typical expression statements are:

```
printf("Hello world.\n");
x = y + z;
++i;
```

Note that an expression statement which could have no side-effects other than producing an error may be completely discarded and have no code generated for it.

Compound statements

The compound statement has the form:

{ *statement...* }

That is, a compound statement is a series of any number of statements surrounded by curly braces. Apart from causing all the sub-statements within the compound statement to be treated as a syntactic unit, it has no effect. Thus:

```
printf("Line 1\n");
{
    printf("Line 2\n");
    printf("Line 3\n");
}
printf("Line 4\n");
```

When run, will produce.

```
Line 1
Line 2
Line 3
Line 4
```

Note that the parser will not return control to the execution engine until all of a top-level compound statement has been parsed. This is true in general for all other statement types.

- 82 -

**The *if* statement**

The *if* statement has two forms:

```
if ( expression ) statement
if ( expression ) statement else statement
```

The parser converts both to an internal form. Upon execution, the *expression* is evaluated. If the expression evaluates to anything other than 0 (integer zero) or NULL, the following statement is executed; otherwise it is not. In the first form this is all that happens, in the second form, if the expression evaluated to 0 or NULL the statement following the *else* is executed; otherwise it is not.

The interpretation of both 0 and NULL as false, and anything else as true, is common to all logical operations in IC1. There is no special boolean type.

The ambiguity introduced by multiple if statements with an lesser number of else clauses is resolved by binding else clauses with their closest possible if. Thus:

```
if (a) if (b) dox(); else doy();
```

If equivalent to:

```
if (a)
{
    if (b)
        dox();
    else
        doy();
}
```

**The *while* statement**

The *while* statement has the form:

```
while   ( expression ) statement
```

The parser converts it to an internal form. Upon execution a loop is established. Within the loop the *expression* is evaluated, and if it is false (0 or NULL) the loop is terminated and flow of control continues after the *while* statement. But if the *expression* evaluates to true (not 0 and not NULL) the *statement* is executed and then flow of control moves back to the start of the loop where the test is performed again (although other statements, as seen below, can be used to modify this natural flow of control).

**The *do-while* statement**

The *do-while* statement has the following form:

- 83 - do *statement* while ( *expression* ) ;

The parser converts it to an internal form. Upon execution a loop is established. Within the loop the *statement* is executed. Then the *expression* is evaluated and if it evaluates to true, flow of control resumes at the start of the loop. Otherwise the loop is terminated and flow of control resumes after the *do-while* statement.

**The *for* statement**

The *for* statement has the form:

for ( [ *expression* ]; [ *expression* ]; [ *expression* ] ) *statement*

The parser converts it to an internal form. Upon execution the first *expression* is evaluated (if present). Then, a loop is established. Within the loop: If the second *expression* is present, it is evaluated and if it is false the loop is terminated. Next the *statement* is executed. Finally, the third *expression* is evaluated (if present) and flow of control resumes at the start of the loop. For example:

```
for (i = 0; i < 4; ++i)
    printf("Line %d\n", i);
```

When run will produce:

```
Line 0
Line 1
Line 2
Line 3
```

**The *forall* statement**

The *forall* statement has the form:

forall ( *expression* [ , *expression* ] in *expression* ) *statement*

The parser converts it to an internal form. In doing so the first and second *expressions* are required to be lvalues (that is, capable of being assigned to). Upon execution the first expression is evaluated and that storage location is noted. If the second *expression* is present the same is done for it. The third *expression* is then evaluated and the result noted; it must evaluate to an array, a set, a struct, a string, or NULL; we will call this *the aggregate*. If this is NULL, the *forall* statement is finished and flow of control continues after the statement; otherwise, a loop is established.

Within the loop, an element is selected from the noted aggregate. The value of that element is assigned to the location given by the first expression. If the second expression was present, it is assigned the key used to access that element. Then the statement is executed. Finally, flow of control resumes at the start of the loop.

- 84 -

Each arrival at the start of the loop will select a different element from the aggregate. If no as yet unselected elements are left, the loop terminates. The order of selection is predictable for arrays and strings, namely first to last. But for structs and sets it is unpredictable. Also, while changing the values of the structure members is acceptable. adding or deleting keys, or adding or deleting set elements during the loop will have an unpredictable effect on the progress of the loop.

As an example:

```
forall (colour in [array "red", "green", "blue"])
    printf("%s\n", colour);
``` when run will produce:

```
red
green
blue
```

And:

```
forall (value, key in [struct a = 1, b = 2, c = 3])
    printf("%s = %d\n", key, value);
``` when run will produce (possibly in some other order):

```
c = 3
a = 1
b = 2
```

Note in particular the interpretation of the value and key for a set. For consistency with the access method and the behavior of structs and arrays, the values are all 1 and the elements are regarded as the keys, thus:

```
forall (value, key in [set "a", "b", "c"])
    printf("%s = %d\n", key, value);
``` when run will produce:

```
c = 1
a = 1
b = 1
```

But as a special case, when the second expression is omitted, the first is set to each "key" in turn. that is, the elements of the set. Thus:

```
forall (element in [set "a", "b", "c"])
    printf("%s\n", element);
```

- 85 - when run will produce:

```
c
a
b
```

When a forall loop is applied to a string (which is not a true aggregate), the "sub-elements" will be successive one character sub-strings.

Note that although the sequence of choice of elements from a set or struct is at first examination unpredictable, it will be the same in a second forall loop applied without the structure or set being modified in the interim.

The *switch*, *case*, and *default* statements

These statements have the forms:

```
switch ( expression ) compound-statement
case expression :
default :
```

The parser converts the switch statement to an internal form. As it is parsing the compound statement, it notes any *case* and *default* statements it finds at the top level of the compound statement. When a *case* statement is parsed the *expression* is evaluated immediately by the parser. As noted previously for parser evaluated expressions, it may perform arbitrary actions, but it is important to be aware that it is resolved to a particular value just once by the parser. As the *case* and *default* statements are seen their position and the associated expressions are noted in a table.

Upon execution, the *switch* statement's *expression* is evaluated. This value is looked up in the table created by the parser. If a matching *case* statement is found, flow of control immediately moves to immediately after that *case* statement. If there is a *default* statement, flow of control immediately moves to just after that. If there is no matching *case* and no *default* statement, flow of control continues just after the entire *switch* statement.

For example:

```
switch ("a string")
{
case "another string":
    printf("Not this one.\n");
case 2:
    printf("Not this one either.\n");
case "a string":
    printf("This one.\n");
default:
    printf("And this one too.\n");
```

- 86 -

When run will produce:

```
This one.
And this one too.
```

Note that the case and default statements, apart from the part they play in the construction of the look-up table, do not influence the executable code of the compound statement. Notice that once flow of control had transferred to the third case statement above, it continued through the default statement as if it had not been present. This behavior can be modified by the *break* statement described below.

It should be noted that the "match" used to look-up the switch expression against the case expressions is the same as that used for structure element look-up. That is, to match, the switch expression must evaluate to the same object as the case expression. The meaning of this will be made clear in a later section.

The *break* and *continue* statements

The *break* and *continue* statements have the form:

```
break ;
continue ;
```

The parser converts these to an internal form. Upon execution of a break statement the execution engine will cause the nearest enclosing loop (a while, do, for or forall) or switch statement within the same scope to terminate. Flow of control will resume immediately after the affected statement. Note that a *break* statement without a surrounding loop or *switch* in the same function or module is illegal.

Upon execution of a *continue* statement the execution engine will cause the nearest enclosing loop to move to the next iteration. For *while* and *do* loops this means the test. For *for* loops it means the step, then the test. For *forall* loops it means the next element of the aggregate.

The *return* statement

The *return* statement has the form:

```
return [ expression ] ;
```

The parser converts this to an internal form. Upon execution, the execution engine evaluates the *expression* if it is present. If it is not, the value NULL is substituted. Then the current function terminates with that value as its apparent value in any expression it is embedded in. It is an error for there to be no enclosing function.

- 87 -

**The *try* statement**

The *try* statement has the form:

> try *statement* onerror *statement*

The parser converts this to an internal form. Upon execution, the first *statement* is executed. If this statement executes normally flow continues after the *try* statement; the second *statement* is ignored. But if an error occurs during the execution of the first *statement* control is passed immediately to the second *statement*.

Note that "during the execution" applies to any depth of function calls, even to other modules or the parsing of sub-modules. When an error occurs both the parser and execution engine unwind as necessary until an error catcher (that is, a *try* statement) is found.

Errors can occur almost anywhere and for a variety of reasons. They can be explicitly generated with the *fail* function (described below), they can be generated as a side-effect of execution (such as division by zero), and they can be generated by the parser due to syntax or semantic errors in the parsed source. For whatever reason an error is generated, a message (a string) is always associated with it.

When any otherwise uncaught error occurs during the execution of the first *statement*, two things are done:

- Firstly, the string associated with the failure is assigned to the variable *error*. The assignment is made as if by a simple assignment statement within the scope of the *try* statement.
- Secondly, flow of control is passed to the statement following the *onerror* keyword.

Once the second *statement* finishes execution, flow of control continues as if the whole *try* statement had executed normally.

For example:

```
static
div(a, b)
{
    try
        return a / b;
    onerror
        return 0;
} printf("4 / 2 = %d\n", div(4, 2));
printf("4 / 0 = %d\n", div(4, 0));
```

When run will print:

```
4 / 2 = 2
4 / 0 = 0
```

The handling of errors which are not caught by any *try* statement is implementation dependent. A typical action is to prepend the file and line number on which the error occurred to the error string, print this, and exit.

The null statement

The null statement has the form:

> ;

The parser may convert this to an internal form. Upon execution it will do nothing.

Declaration statements

There are two types of declaration statements:

| | |
|---|---|
| *declaration* | *storage-class declaration-list* ;<br>*storage-class identifier function-body* |
| *storage-class* | extern<br>static<br>auto |

The first is the general case while the second is an abbreviated form for function definitions. Declaration statements are syntactically equal to any other statement, but their effect is made entirely at parse time. They act as null statements to the execution engine. There are no restriction on where they may occur, but their effect is a by-product of their parsing, not of any execution.

Declaration statements must start with one of the *storage-class* keywords listed above[3]. Considering the general case first, we next have a *declaration-list*.

| | |
|---|---|
| *declaration-list* | *identifier [ = expression ]*<br>*declaration-list* , *identifier [ = expression ]* |

That is, a comma separated list of identifiers, each with an optional initialisation, terminated by a semicolon. For example:

```
static a, b = 2, c = [array 1, 2, 3];
```

The storage class keyword establishes which scope the variables in the list are established in. as discussed earlier. Note that declaring the same identifier at different scope levels is per-

---

[3] Note that, unlike C, function definitions must be prefixed by a storage class. As executable code may occur anywhere, this is required to distinguish them from a function call.

missible and that they are different variables.

A declaration with no initialisation first checks if the variable already exists at the given scope. If it does, it is left unmodified. In particular, any value it currently has is undisturbed. If it does not exist it is established and is given the value NULL.

A declaration with an initialisation establishes the variable in the given scope and gives it the given value even if it already exists and even if it has some other value.

Note that initial values are parser evaluated expressions. That is they are evaluated immediately by the parser, but may take arbitrary actions apart from that. For example:

```
static
fibonacci(n)
{
    if (n <= 1)
        return 1;
    return fibonacci(n - 1) + fibonacci(n - 2);
} static fib10 = fibonacci(10);
```

The declaration of *fib10* calls a function. But that function has already been defined so this will work.

Note that the scope of a static variable is (normally) the entire module it is parsed in. For example:

```
static
func()
{
    static aStatic = "The value of a static.";
} printf("%s\n", aStatic);
``` when run will print:

```
The value of a static.
```

That is, despite being declared within a function, the declaration of *aStatic* has the same effect as if it had been declared outside the function. Also notice that the function has not been called. The act of parsing the function caused the declaration to take effect.

The behavior of extern variables has already been discussed, that is, they are declared as static in the parent module. The behavior of auto variables, and in particular their initialisation, will be discussed in a later section.

- 90 -

Abbreviated function declarations

As seen above there are two forms of declaration. The second:

*storage-class identifier function-body* is a shorthand for:

*storage-class identifier* = [ func *function-body* ] ;

and is the normal way to declare simple functions. Examples of this have been seen above.

Functions

As with most ICI constructs there are two parts to understanding functions; how they are parsed and how they execute.

When a function is parsed four things are noted:

- the names and positions of the formal parameters;
- the names and initialisation of auto variables;
- the static scope in which the function is declared;
- the code generated by the statements in the function.

The formal parameters (that is, the identifiers in the bracket enclosed list just before the compound statement) are actually implicit auto variable declarations. Each of the identifiers is declared as an auto variable without an initialisation, but in addition, its name and position in the list is noted.

Upon execution (that is, upon a function call), the following takes place:

- The auto variables, as noted by the parser, along with any initialisations, are copied as a group. This copy forms the auto variables of this invocation.
- Any actual parameters (that is, expressions provided by the caller) are matched positionally with the formal parameter names, and the value of those expressions are assigned to the auto variables of those names.
- If there were more actual parameters than formal parameters, and there is an auto variable called *vargs*, the remaining argument values are formed into an array which is assigned to *vargs*.
- The variable scope is set such that the auto variables are the inner-most scope, the static variables noted with the function are the next outer scope etc.
- The flow of control is diverted to the code generated by parsing the function.

A *return* statement executed within the function will cause the function to return to the caller and act as though its value were the expression given in the return statement. If no expression was given in the return statement, or if execution fell through the bottom of the function, the apparent return value is NULL. In any event, upon return the scope is restored to that of the caller. All internal references to the group of automatic variables are lost (although as will be seen later explicit program references may cause them to remain active).

Simple functions have been seen in earlier examples. We will now consider further issues.

It is very important to note that the parser generates a prototype set of auto variables which are copied, along with their initial values, when the function is called. The value which an auto variable is initialised with is a parser evaluated expression just like any other initialisation. It is not evaluated on function entry. But on function entry the value the parser determined is used to initialise the variable. For example:

```
static myVar = 100;

static
myFunc()
{
    auto anAuto = myVar;

printf("%d\n", anAuto);
    anAuto = 500;
} myFunc();
myVar = 200;
myFunc();
```

When run will print:

```
100
100
```

Notice that the initial value of *anAuto* was computed just once, changing *myVar* before the second call did not affect it. Also note that changing *anAuto* during the function did not affect its subsequent re-initialisation on the next invocation.

As stated above, formal parameters are actually uninitialised auto variables. Because of the behavior of variable declarations it is possible to explicitly declare an auto variable as well as include it in the formal parameter list. In addition, such an explicit declaration may have an initialisation. In this case, the explicit initialisation will be effective when there is no actual parameter to override it. For example:

```
static
print(msg, file)
{
    auto file = stdout; /* Default value. */
```

```
    fprintf(file, "%s\n", msg);
} print("Hello world");
print("Hello world", stderr);
```

In the first call to the function *print* there is no second actual parameter. In this case the explicit initialisation of the auto variable *file* (which is the second formal parameter) will have its effect unmolested. But in the second call to *print* a second argument is given. In this case this value will over-write the explicit initialisation given to the argument and cause the output to go to *stderr*.

As indicated above there is a mechanism to capture additional actual parameters which were not mentioned in the formal parameter list. Consider the following example:

```
static
sum()
{
    auto vargs;
    auto total = 0;
    auto arg;

forall (arg in vargs)
        total += arg;
    return total;
} printf("1+2+3 = %d\n", sum(1, 2, 3));
printf("1+2+3+4 = %d\n", sum(1, 2, 3, 4));
```

Which when run will produce:

```
1+2+3 = 6
1+2+3+4 = 10
```

In this example the unmatched actual parameters were formed into an array and assigned to the auto variable *vargs*, a name which is recognised specially by the function call mechanism.

And also consider the following example where a default initialisation to *vargs* is made. In the following example the function *call* is used to invoke a function with an array of actual parameters, the function *array* is used to form an array at run-time, and addition is used to concatenate arrays; all these features will be further explained in later sections:

```
static
debug(fmt)
{
    auto fmt = "Reached here.\n";
```

```
    auto vargs = [array];

call(fprintf, array(stderr, fmt) + vargs);
} debug();
debug("Done that.\n");
debug("Result = %d, total = %d.\n", 123, 456);
```

When run will print:

```
Reached here.
Done that.
Result = 123, total = 456.
```

In the first call to *debug* no arguments are given and both explicit initialisations take effect. In the second call the first argument is given, but the initialisation of *vargs* still takes effect. But in the third call there are unmatched actual parameters, so these are formed into an array and assigned to *vargs*, overriding its explicit initialisation.

Objects

Up till now few exact statements about the nature of values and data have been made. We will now examine values in more detail. Consider the following code fragment:

```
static x;
static y;

x = [array 1, 2, 3, 4];
y = x;
```

After execution of this code the variable x refers to an array. The assignment of x to y causes y to refer to the same array. Diagrammatically:

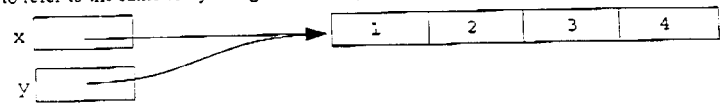

If the assignment:

```
y[1] = 200;
``` is performed, the result is:

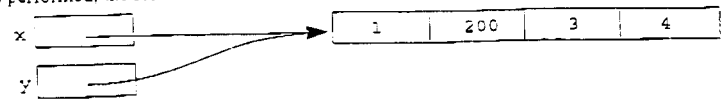

We say that *x* and *y* refer to the same object. Now consider the following code fragment:

```
static x;
static y;

x = [array 1, 2, 3, 4];
y = [array 1, 2, 3, 4];
```

Diagrammatically:

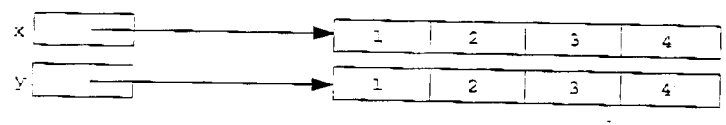

In this case, *x* and *y* refer to different objects, despite that fact they are equal.

Now consider one of the unary operators which was only briefly mentioned in the sections above. The @ operator returns a read-only version of the sub-expression it is applied to. Consider the following statement:

```
y = @y;
```

After this has been executed the result could be represented diagrammatically as:

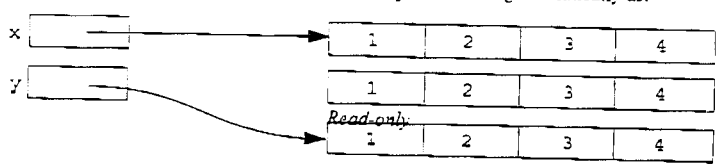

The middle array now has no reference to it and the memory associated with it will be collected by the interpreter's standard garbage collection mechanism. Now consider the following statement:

```
x = @x;
```

This is similar to the previous statement, except that this time *x* is replaced by a read-only version of its old value. But the result of this operation is:

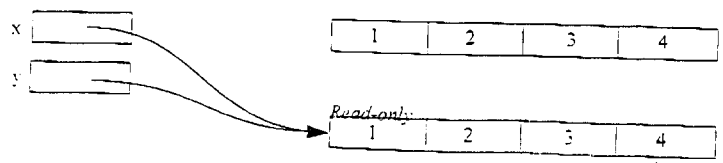

- 95 -

Notice that *x* now refers to the same read-only array that *y* refers to. This is a fundamental property of the @ operator. It returns *the unique* read-only version of its argument value. Such read-only objects are referred to as *atomic* objects. The array which *x* used to refer to was non-atomic, but the array it refers to now is an atomic array. Aggregate types such as arrays, sets and structs are generally non-atomic, but atomic versions can be obtained (as seen above). But most other types, such as integers floats, strings and functions are intrinsically atomic. That is, no matter how a number, say 10, is generated, it will be the same object as every other number 10 in the interpreter For-instance, consider the following example:

```
x = "ab" + "cdefg";
y = "abcde" + "fg";
```

After this is executed the situation can be represented diagrammatically as:

It is important to understand when objects are the same object, when they are different and the effects this has.

Equality

We saw above how two apparently identical arrays were each distinct object. But these two arrays were *equal* in the sense of the equality testing operator ==. If two values are the same object they are said to be *eq*[4], and there is a function of that name to test for this condition. Two objects are *equal* (that is ==) if:

- they are the same object; or
- they are both arithmetic (int and float) and have equivalent numeric values; or
- they are aggregates of the same type and all the sub-elements are the same objects.

This definition of equality is the basis for resolving the merging of aggregates into unique read-only (atomic) versions. Two aggregates will resolve to the same atomic object if they are *equal*. That is, they must contain exactly the same objects as sub-elements, not just equal objects. For example:

```
static x = [array 1, [array 2, 3], 4, 5];
static y = [array 1, [array 2, 3], 4, 5];
```

---
4. As in LISP.

Could be represented diagrammatically as:

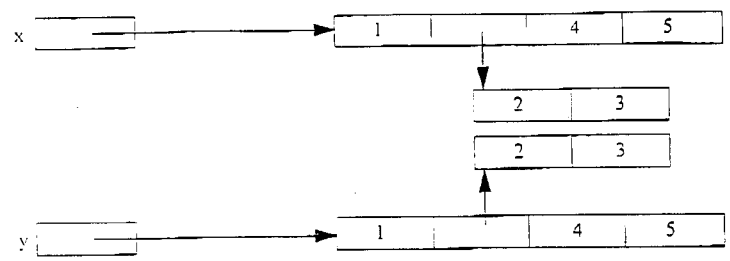

Now, if the following statements were executed:

```
x = @x;
y = @y;
```

The result could be represented diagrammatically as:

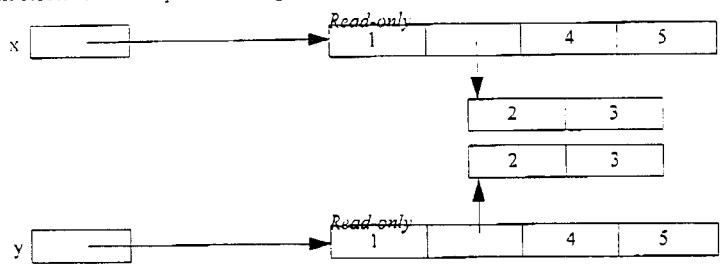

That is, both x and y refer to new read-only objects, but they refer to different read-only objects because they have an element which is not the same object. The simple integers are the same objects because integers are intrinsically atomic objects. But the two sub-arrays are distinct objects. Being equal was not sufficient. The top-level arrays needed to have exactly the same objects as contents to make x and y end up referring to the same read-only array. In contrast to this consider the following similar situation:

```
static z = [array 2, 3];
static x = [array 1, z, 4, 5];
static y = [array 1, z, 4, 5];
```

- 97 -

This could be represented diagrammatically as:

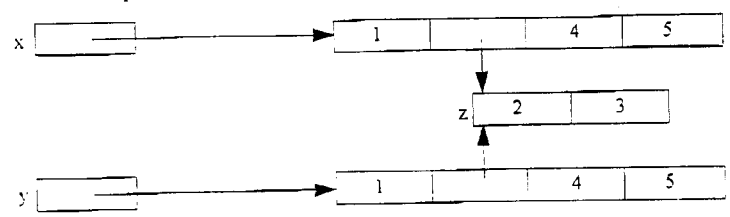

Now, if the following statements were executed:

```
x = @x;
y = @y;
```

The result could be represented diagrammatically as:

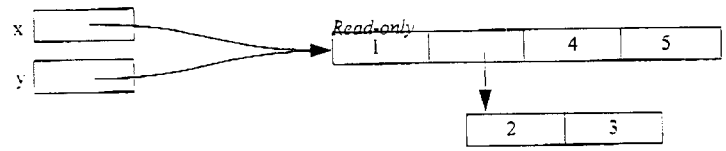

In this case both x and y refer to the same read-only array because the original arrays where equal, that is, all their elements were the same objects. Notice that one of the elements is still a *writeable* array. The read-only property is only referring to the top level array. The sub-array can be changed, but the reference to it from the top level array can not. Thus:

```
x[1][0] = 200;
``` will result in:

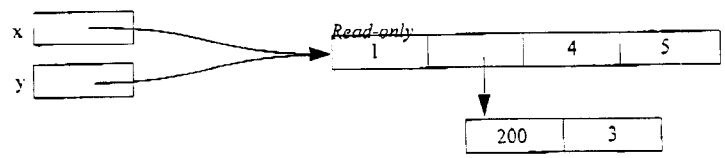

whereas the statement:

```
x[1] = 200;
``` will just result in an error.

Structure and set keys

Any object, not just a string, can be used as a key in a structure. For instance:

```
static x = [struct];
static z = [array 10, 11];

x["abc"] = 1;
x[56] = 2;
x[z] = 3;
```

Could be represented diagrammatically as:

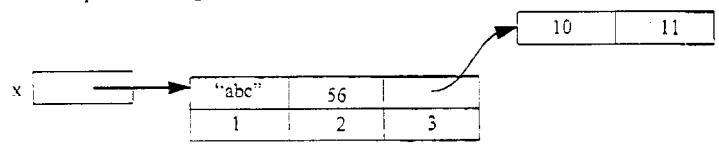

And the assignment:

```
x[z] = 300;
``` would replace the *3* in the above diagram with *300*. But the assignment:

```
x[[array 10, 11]] = 300;
``` would result in a new element being added to the structure because the array given in the above statement is a different object from the one which *z* refers to.

Similarly, elements of sets may be any objects.

Indexing structures by complex aggregates is as efficient as indexing by intrinsically atomic types such as strings and integers.

Structure super types

Up till now structures have been described as simple lookup tables which map a key, or index, to a value. But a structure may have associated with it a *super structure*.

The function *super* can be used to discover the current super of a struct and to set a new super. With just one argument it returns the current super of that struct, with a second argument it also replaces the super by that value.

When a key is being looked-up in a structure for reading, and it is not found and there is a *super struct*, the key is further looked for in the super struct, if it is found there its value from that struct is returned. If it is not found it will be looked for in the next super struct etc. If no

- 99 - structures in the *super chain* contain the key, the special value NULL is returned.

When a key is being looked up in a structure for writing, it will similarly be searched for in the super chain. If it is found in a writeable structure the value in the structure in which it was found will be set to the new value. If it was never found, it will be added along with the given value to the very first struct, that is, the structure at the base, or root, of the super chain.

Consider the following example:

```
static theSuper = [struct a = 1, b = 2, c = 3];
static theStruct = [struct x = 100, y = 200];

super(theStruct, theSuper);
```

After this statement the situation could be represented diagrammatically as:

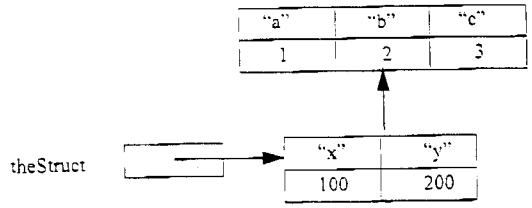

then if the following statements were executed.

```
theStruct.a = 123;
theStruct.x = 456;
theStruct.z = 789;
``` the situation could be diagrammatically represented as:

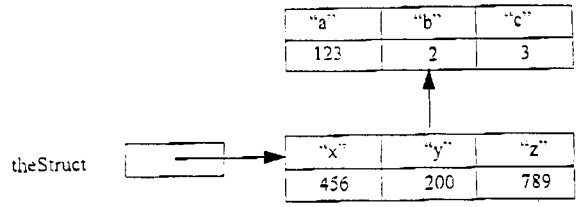

If a super struct is not writeable (that is, it is atomic) values will not be written in it and will lodge in the base structure instead. Thus consider what happens if we replace the super structure in the previous example by its read-only version:

- 100 -

```
super(theStruct, @theSuper);
```

The situation could now be represented diagrammatically as:

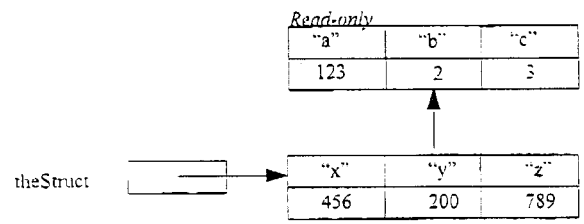

If the assignment statement:

```
theStruct.a += 10;
``` were executed, the value of the element *a* will first be *read* from the super structure, this value will then have ten added to it, and the result will be *written* back into the base structure; because the super structure is read-only and cannot be modified. The finally situation can be represented diagrammatically as:

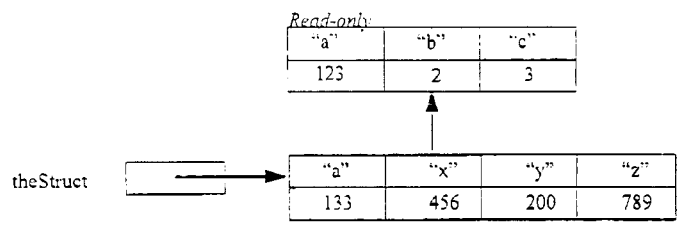

Note that many structs may share the same super struct. Thus a single read-only super struct can be used hold initial values; saving explicit initialisations and storage space.

The function *assign* may be used to set a value in a struct explicitly, without reference to any super structs; and the function *fetch* may be used to read a value from a struct explicitly, without reference to any super structs.

Within a *struct-literal* a colon prefixed expression after the *struct* identifier is used as the super struct. For example, the declarations used in the previous example could be written as:

```
static theSuper = [struct a = 1, b = 2, c = 3];
static theStruct = [struct:theSuper, x = 100, y = 200];
```

- 101 -

An aside on variables and scope

Now that structs and their super have been described a more precise statement about variables and scope can be made.

ICI variables are entries in ordinary structs. At all times, the current scope is identified by a structure. The auto variables are the entries in this base structure. Its super is the struct containing the static variables. The next super struct contains the externs, and successive super structs are successive outer scopes.

Auto, static and extern declarations make explicit assignments to the appropriate structure.

In these terms it can be said that an un-adorned identifier in an expression is an implicit reference to an element of the current scope structure. The inheritance and name hiding of the variable scope mechanism is a product of the super chain. The only difference is that undefined entries produce errors rather than a default value of NULL or implicit creation.

The function *scope* can be used to obtain the current scope structure; and to set it (use with care).

Note that when there is an atomic structure in the scope chain the mechanism described at the end of the previous section does not operate correctly. Writing to a variable in the atomic struct will give a spurious undefined error rather than lodging it in the base structure. This is a deficiency which will be corrected in a later release.

Pointers

Pointers are references to storage locations. Storage locations are the elements of anything which can be indexed. That is, array elements, set elements, struct elements and others (which we will see below) can be pointed to. Variables (which are just struct elements) can be pointed to. In more general terms, any lvalue can be pointed to.

The & operator is used to obtain a pointer to a location. Thus if the following were executed:

```
static x;
static y = [array 1, 2, 3];
static p1 = &x;
static p2 = &y[1];
```

The variable *p1* would be a pointer to *x* and the variables *p2* would be a pointer to the second element of *y*. Reference to the object a pointer points to can be obtained with the * operator. Thus if the following were executed:

```
*p1 = 123;
*p2 = 456;
printf("x = %d, y[1] = %d\n", x, y[1]);
``` the output would be:

```
x = 123, y[1] = 456
```

Pointers are really a bundle of two objects, one is the object pointed into, the other is the key used to access the location in question. For instance, in the example above *p2* remembers the array, and the number 1; that is, the aggregate and the index. The generation of a pointer does not affect the location being pointed to. In fact the location may not even exist yet. When a pointer is referenced the same operation takes place as if the location was referenced explicitly. Thus a search down the super chain of a struct may occur, or an array may be extended to include the index being written to, etc.

In addition to simple indirection (that is the * operator), pointers may be indexed. But the index values must be an integer, and the key stored as part of the pointer must also be an integer. When a pointer is indexed, the index is added to the key which is stored as part of the pointer, the sum forms the actual index to use when referencing the aggregate recorded by the pointer. For instance, continuing the example above:

```
p2[1] = 789;
``` would set the last element of the array to 789, because the pointer currently references element 1, and the given index is 1, and 1 + 1 is 2 which is the last element. The index arithmetic provided by pointers will work with any types, as long as the indexes are integers, thus:

```
static s = [struct (20) = 1, (30) = 2, (40) = 3];
static p = &s[30];

p[-10] = -1;
p[0] = -2;
p[10] = -3;
```

Would replace each of the elements in the struct *s* by their negative value.

This concludes the general discussion of ICI as a whole. We will now examine the exact nature of each of the data types, then each of the expression operators, and finally each of the standard functions.

Data types

ICI supports a base set of standard data types. Each is identified by a simple name. In summary these are:

| | |
|---|---|
| array | An ordered sequence of other objects. |
| file | An open file reference. |
| float | A double precision floating point number. |
| func | A function. |

- 103 -

| | |
|---|---|
| `int` | A signed 32 bit integer. |
| `mem` | References to raw machine memory. |
| `ptr` | A reference to a storage location. |
| `regexp` | A compiled regular expression. |
| `set` | An unordered collection of other objects. |
| `string` | An ordered sequence of 8 bit characters. |
| `struct` | An unordered set of pairs of objects. |

A full explanation of the semantics of each type (including the semantics of indexing an object of that type) will be included in a future version of this document.

Operators

The following table details each of the unary and binary operators with all of the types they may be applied to. Within the first column the standard type names are used to stand for operands of that type, along with *any* to mean any type and *num* to mean an *int* or a *float*. In general, where an *int* and a *float* are combined in an arithmetic operation, the *int* is first converted to a *float* and then the operation is performed.

The following table is in precedence order.

| | |
|---|---|
| *\*ptr* | Indirection: The result references the thing the pointer points to. The result is an lvalue. |
| *&any* | Address of: The result is a pointer to *any*. If *any* is an lvalue the pointer references that storage location. If *any* is not an lvalue but is a *term* other than a bracketed non-*term*, as described in the syntax above, a one element array containing *any* will be fabricated and a pointer to that storage location returned. For example:<br><br>    `p = &1;`<br><br>sets p to be a pointer to the first element of an un-named array, which currently contains the number 1. |
| *-num* | Negation: Returns the negation of *num*. The result is the same type as the argument. The result is not an lvalue. |
| *+any* | Has no effect except the result is not an lvalue. |
| *!any* | Logical negation: If *any* is 0 (integer) or NULL, 1 is returned, else 0 is returned. |
| *~int* | Bit-wise complement: The bit-wise complement of *int* is returned. |

- 104 -

| | |
|---|---|
| ++any | Pre-increment: Equivalent to (any += 1). any must be an lvalue and obey the restrictions of the binary + operator. See + below. |
| --any | Pre-decrement: Equivalent to (any -= 1). any must be an lvalue and obey the restrictions of the binary - operator. See - below. |
| @any | Atomic form of: Returns the unique, read-only form of any. If any is already atomic, it is returned immediately. Otherwise an atomic form of any is found or generated and returned: this is of execution time order equal to the number of elements in any. See the section on objects above for more explanation. |
| $any | Immediate evaluation: Recognised by the parser. The sub-expression any is immediately evaluated by invocation of the execution engine. The result of the evaluation is substituted directly for this expression term by the parser. |
| any++ | Post-increment: Notes the value of any, then performs the equivalent of (any += 1), except any is only evaluated once, and finally returns the original noted value. any must be an lvalue and obey the restrictions of the binary + operator. See + below. |
| any-- | Post-increment: Notes the value of any, then performs the equivalent of (any -= 1), except any is only evaluated once, and finally returns the original noted value. any must be an lvalue and obey the restrictions of the binary - operator. See - below. |
| num1 * num2 | Multiplication: Returns the product of the two numbers, if both nums are ints, the result is int, else the result is float. |
| set1 * set2 | Set intersection: Returns a set that contains all elements that appear in both set1 and set2. |
| num1 / num2 | Division: Returns the result of dividing num1 by num2. If both numbers are ints the result is int, else the result is float. If num2 is zero the error *division by 0* is generated, or *division by 0.0* if the result would have been a float. |
| int1 % int2 | Modulus: Returns the remainder of dividing int1 by int2. If int2 is zero the error *modulus by 0* is generated. |
| num1 + num2 | Addition: Returns the sum of num1 and num2. If both numbers are ints the result is int, else the result is float. |

- 105 -

| | |
|---|---|
| *ptr* + *int* | Pointer addition: *ptr* must point to an element of an indexable object whose index is an *int*. Returns a new pointer which points to an element of the same aggregate which has the index which is the sum of *ptr*'s index and *int*. The arguments may be in any order. |
| *string1* + *string2* | String concatenation: Returns the string which is the concatenation of the characters of *string1* then *string2*. The execution time order is proportional to the total length of the result. |
| *array1* + *array2* | Array concatenation: Returns a new array which is the concatenation of the elements from *array1* then *array2*. The execution time order is proportional to the total length of the result. Note the difference between the following:

```
a += [array 1];
push(a, 1);
```

In the first case a is replaced by a newly formed array which is the original array with one element added. But in the second case the *push* function (see below) appends an element to the array *a* refers to, without making a new array. The second case is much faster, but modifies an existing array. |
| *struct1* + *struct2* | Structure concatenation: Returns a new struct which is a copy of *struct1*, with all the elements of *struct2* assigned into it. Obeys the semantics of copying and assignment discussed in other sections with regard to super structs.. The execution time order is proportional to the sum of the lengths of the two arguments. |
| *set1* + *set2* | Set union: Returns a new set which contains all the elements from both sets. The execution time order is proportional to the sum of the lengths of the two arguments. |
| *num1* - *num2* | Subtraction: Returns the result of subtracting *num2* from *num1*. If both numbers are ints the result is *int*, else the result is *float*. |
| *set1* - *set2* | Set subtraction: Returns a new set which contains all the elements of *set1*, less the elements of *set2*. The execution time order is proportional to the sum of the lengths of the two arguments. |
| *ptr1* - *ptr2* | Pointer subtraction: *ptr1* and *ptr2* must point to elements of indexable objects whose indexs are *ints*. Returns an *int* which is the the index of *ptr1* less the index of *ptr2*. |
| *int1* >> *int2* | Right shift: Returns the result of right shifting *int1* by *int2*. Equivalent to division by $2^{**}int2$. *int1* is interpreted as a signed quantity. |

| | |
|---|---|
| *int1* << *int2* | Left shift: Returns the result of left shifting *int1* by *int2*. Equivalent to multiplication by 2\*\**int2*. |
| *array* << *int* | Left shift array: Returns a new array which contains the elements of *array* from index *int* onwards. Equivalent to the function call *interval(array, int)* (which is considered preferable, this operator may disappear in future releases). |
| *num1* < *num2* | Numeric test for less than: Returns 1 if *num1* is less than *num2*, else 0. |
| *set1* < *set2* | Test for subset: Returns 1 if *set1* contains only elements that are in *set2*, else 0. |
| *string1* < *string2* | Lexical test for less than: Returns 1 if *string1* is lexically less than *string2*, else 0. |
| *ptr1* < *ptr2* | Pointer test for less than: *ptr1* and *ptr2* must point to elements of indexable objects whose indexes are *ints*. Returns 1 if *ptr1* points to an element with a lesser index than *ptr2*, else 0. |

The >, <= and >= operators work in the same fashion as <, above. For sets > tests for one set being a superset of the other. The <= and >= operators test for proper sub- or super-sets. That is one set can contain only those elements contained in the other set but cannot be equal to the other set.

| | |
|---|---|
| *any1* == *any2* | Equality test: Returns 1 if *any1* is equal to *any2*, else 0. Two objects are equal when: they are the same object; or they are both arithmetic (*int* and *float*) and have equivalent numeric values; or they are aggregates of the same type and all the sub-elements are the same objects. |
| *any1* != *any2* | Inequality test: Returns 1 if *any1* is not equal to *any2*, else 0. See above. |
| *string* ~ *regexp* | Logical test for regular expression match: Returns 1 if *string* can be matched by *regexp*, else 0. The arguments may be in any order. |
| *string* !~ *regexp* | Logical test for regular expression non-match: Returns 1 if *string* can not be matched by *regexp*, else 0. The arguments may be in any order. |
| *string* ~~ *regexp* | Regular expression sub-string extraction: Returns the sub-string of *string* which is matched by the first bracket enclosed portion of *regexp*, or NULL if there is no match or *regexp* does not contain a (...) portion. The arguments may be in any order. For example, a "basename" operation can be performed with: |

```
argv[0] ~~= #([^/]*)$#;
```

- 107 -

| | |
|---|---|
| *string* --- *regexp* | Regular expression multiple sub-string extraction: Returns an array of the the sub-strings of *string* which are matched by the ( ... ) enclosed portions of *regexp*, or NULL if there is no match. The arguments may be in any order. |
| *int1* & *int2* | Bit-wise and: Returns the bit-wise and of *int1* and *int2*. |
| *int1* ^ *int2* | Bit-exclusive or: Returns the bit-wise exclusive or of *int1* and *int2*. |
| *int1* \| *int2* | Bit-wise or: Returns the bit-wise or of *int1* and *int2*. |
| *any1* && *any2* | Logical and: Evaluates the expression which determines *any1*, if this evaluates to 0 or NULL (i e. *false*), 0 is returned, else *any2* is evaluated and returned[5]. Note that if *any1* does not evaluate to a *true* value, the expression which determines *any2* is never evaluated. |
| *any1* \|\| *any2* | Logical or: Evaluates the expression which determines *any1*, if this evaluates to other than 0 or NULL (i.e. *true*), 1 is returned, else *any2* is evaluated and returned. Note that if *any1* does not evaluate to a *false* value, the expression which determines *any2* is never evaluated. |
| *any1* ? *any2* : *any3* | Choice: If *any1* is neither 0 or NULL (i.e. *true*), the expression which determines *any2* is evaluated and returned, else the expression which determines *any3* is evaluated and returned. Only one of *any2* and *any3* are evaluated. The result may be an lvalue if the returned expression is. Thus:<br><br>    `flag ? a : b = value`<br><br>is a legal expression and will assign *value* to either *a* or *b* depending on the state of *flag*. |
| *any1* = *any2* | Assignment: Assigns *any2* to *any1*. *any1* must be an lvalue. The behavior of assignment is a consequence of aggregate access as discussed in earlier sections. In short, an lvalue (in this case *any1*) can always be resolved into an aggregate and an index into the aggregate. Assignment sets the element of the aggregate identified by the index to *any2*. The returned result of the whole assignment is *any1*, after the assignment has been performed.<br><br>The result is an lvalue, thus:<br><br>    `++(a = b)` |

---

[5] Note that this is different from C where the result is always completely resolved to a 0 or 1. Use !! to force a 0/1 value from a generic true/false.

- 108 - will assign *b* to *a* and then increment *a* by 1.

Note that assignment operators (this and following ones) associate right to left, unlike all other binary operators, thus:

```
a = b += c -= d
```

Will subtract *d* from *c*, then add the result to *b*, then assign the final value to *a*.

+= -= *= /= %= >>= <<= &= ^= |= --=

Compound assignments: All these operators are defined by the rewriting rule:

*any1 op= any2* is equivalent to:

*any1 = any1 op any2* except that *any1* is not evaluated twice. Type restrictions and the behavior or *op* will follow the rules given with that binary operator above. The result will be an lvalue (as a consequence of = above). There are no further restrictions Thus:

```
a = "Hello";
a += " world.\n";
``` will result in the variable *a* referring to the string:

```
"Hello world.\n".
```

*any1* <=> *any2*   Swap: Swaps the current values of *any1* and *any2*. Both operands must be lvalues. The result is *any1* after the swap and is an lvalue, as in other assignment operators. Also like other assignment operators, associativity is right to left, thus:

```
a <=> b <=> c <=> d
``` rotates the values of *a*, *b* and *c* towards *d* and brings *d*'s original value back to *a*.

- 109 -

*any1* , *any2*  Sequential evaluation: Evaluates *any1*, then *any2*. The result is *any2* and is an lvalue if *any2* is. Note that in situations where comma has meaning at the top level of parsing an expression (such as in function call arguments), expression parsing precedence starts at one level below the comma, and a comma will not be recognised as an operator. Surround the expression with brackets to avoid this if necessary.

Standard functions

The following list summarises the standard functions. Following this is a detailed descriptions of each of them.

```
   float = acos(number)
     mem = alloc(int [, int])
   array = array(any...)
   float = asin(number)
     any = assign(struct, any, any)
   float = atan(number)
   float = atan2(number, number)
     any = call(func, array)
   float = ceil(number)
           close(file)
     any = copy(any)
   float = cos(number)
    file = currentfile()
           del(struct, any)
     int = eq(any, any)
     int = eof(file)
           exit([int|string|NULL])
   float = exp(number)
   array = explode(string)
           fail(string)
     any = fetch(struct, any)
   float = float(any)
   float = floor(number)
     int = flush(file)
   float = fmod(number, number)
    file = fopen(string [, string])
           flush([file])
  string = getchar([file])
  string = getfile([file])
  string = getline([file])
```

-110-

```
       string = getenv(string)
       string = gettoken([file|string [,string]])
        array = gettokens([file|string [,string
                          [,string]]])
       string = gsub(string, regexp, string)
       string = implode(array)
       struct = include(string)
          int = int(any)
 string|array = interval(string|array, int [, int])
          int = isatom(any)
        array = keys(struct)
        float = log(number)
        float = log10(number)
          mem = mem(int, int [,int])
         file = mopen(string [, string])
          int = nels(any)
    int|float = num(string|int|float)
       struct = parse(file|string [, struct])
          any = pop(array)
         file = popen(string [, string])
        float = pow(number, number)
                printf([[file,] string [, any...])
          any = push(array, any)
                put(string)
                putenv(string [, string])
          int = rand([int])
       regexp = regexp(string)
       regexp = regexpi(string)
       struct = scope([struct])
                seek(file, int, int)
          set = set(any...)
        float = sin(number)
          int = sizeof(any)
        array = smash(string, string)
         file = sopen(string [, string])
                sort(array, func)
       string = sprintf(string [, any...])
        float = sqrt(number)
       string = string(any)
       struct = struct(any, any...)
       string = sub(string, regexp, string)
```

-111-

```
     struct = super(struct [, struct])
        int = system(string)
      float = tan(number)
     string = tochar(int)
        int = toint(string)
        any = top(array [, int])
        int = trace(string)
     string = typeof(any)
      array = vstack()
file,int,float = waitfor(file|int|float...)
```

The following is an alphabetic listing of each of the standard functions.

angle = acos(x)

Returns the arc cosine of $x$ in the range 0 to pi.

mem = alloc(nwords [, wordz])

Returns a new *mem* object referring to *nwords* (an int) of newly allocated and cleared memory. Each word is either 1, 2, or 4 bytes as specified by *wordz* (an int, default 1). Indexing of *mem* objects performs the obvious operations, and thus pointers work too.

array = array(any...)

Returns an array formed from all the arguments. For example:

array()

will return a new empty array; and array(1, 2, "a string")

will return a new array with three elements, *1, 2,* and *"the string"*.

This is the run-time equivalent of the array literal. Thus the following two expressions are equivalent:

$array(1, 2, "a string")

[array 1, 2, "a string"]

float = asin(x)

Returns the arc sine of $x$ in the range -pi/2 to pi/2.

- 112 - value = assign(struct, key, value)

Sets the element of *struct* identified by *key* to *value*, ignoring any super struct. Returns *value*.

angle = atan(x)

Returns the arc tangent of *x* in the range -pi/2 to pi/2.

angle = atan2(y, x)

Returns the angle from the origin to the rectangular coordinates *x, y* (floats) in the range -pi to pi.

return = call(func, args)

Calls the function *func* with arguments taken from the array *args*. Returns the return value of the function.

This is often used to pass on an unknown argument list. For example:

```
static
db()
{
    auto vargs;

if (debug)
        return call(printf, vargs);
}
``` new = copy(old)

Returns a copy of *old*. If *old* is an intrinsically atomic type such as an int or string, the *new* will be the same object as the old. But if *old* is an array, set, or struct, a copy will be returned. The copy will be a new non-atomic object (even if *old* was atomic) which will contain exactly the same objects as *old* and will be *equal* to it (that is ==). If *old* is a struct with a super struct, *new* will have the same super (exactly the same super, not a copy of it).

x = cos(angle)

Returns the cosine of *angle* (a float interpreted in radians).

file = currentfile()

Returns the file associated with the innermost parsing context, or NULL if there is no module being parsed.

This function can be used to include data in a program source file which is out-of-band with respect to the normal parse stream. But to do this it is necessary to know up to what character in the file in question the parser has consumed.

- 113 -

In general: after having parsed any simple statement the parser will have consumed up to and including the terminating semicolon, and no more. Also, after having parsed a compound statement the parser will have consumed up to and including the terminating close brace and no more. For example:

```
static help = gettokens(currentfile(), "", "!")[0]

;This is the text of the help message.
It follows exactly after the ; because
that is exactly up to where the parser
will have consumed. We are using the
gettokens() function (as described below)
to read the text.
!

static otherVariable = "etc...";
```

This function can also be used to parse the rest of a module within an error catcher. For example:

```
try
    parse(currentfile(), scope())
onerror
    printf("That didn't work, but never mind.\n");

static this = that;
etc();
```

The functions *parse* and *scope* are described below.

del(struct, key)

Deletes the element of *struct* identified by *key*. Any super structs are ignored. Returns NULL. For example:

```
static s = [struct a = 1, b = 2, c = 3];
static v, k;
forall (v, k in s)
    printf("%s=%d\n", k, v);
del(s, "b");
printf("\n");
forall (v, k in s)
    printf("%s=%d\n", k, v);
```

When run would produce (possibly in some other order):

```
a=1
c=3
```

- 114 -

```
b=2
a=1
c=3
``` eq(obj1, obj2)

Returns 1 (one) if *obj1* and *obj2* are the same object, else 0 (zero).

exit([string|int|NULL])

Causes the interpreter to finish execution and exit. If no parameter, the empty string or NULL is passed the exit status is zero. If an integer is passed that is the exit status. If a non-empty string is passed then that string is printed to the interpreter's standard error output and an exit status of one used. This is implementation dependent and may be replaced by a more general exception mechanism. Avoid.

float = exp(x)

Returns the exponential function of *x*.

array = explode(string)

Returns an array containing each of the integer character codes of the characters in *string*.

fail(string)

Causes an error to be raised with the message *string* associated with it. See the section of error handling in the *try* statement above. For example:

```
if (qf > 255)
    fail(sprintf("Q factor %d is too large", qf));
``` value = fetch(struct, key)

Returns the *value* from *struct* associated with *key*, ignoring any super structs. Returns NULL is *key* is not an element of *struct*.

value = float(x)

Returns a floating point interpretation of *x*, or 0.0 if no reasonable interpretation exists. *x* should be an int, a float, or a string, else 0.0 will be returned.

file = fopen(name [, mode])

Opens the named file for reading or writing according to *mode* and returns a file object that may be used to perform I/O on the file. *Mode* is the same as in C and is passed directly to the C library fopen function. If mode is not specified "r" is assumed.

- 115 - fprintf(file, fmt, args...)

Formats a string based on *fmt* and *args* as per *sprintf* (below) and outputs the result to *file*. See *sprintf*. Changes to ICI's printf have made fprintf redundant and it may be removed in future versions of the interpreter. Avoid.

string = gettoken([file [, seps]])

Read a token (that is, a string) from *file*.

Seps must be a string. It is interpreted as a set of characters which do not from part of the token. Any leading sequence of these characters is first skipped. Then a sequence of characters not in seps is gathered until end of file or a character from seps is found. This terminating character is not consumed. The gathered string is returned, or NULL if end of file was encountered before any token was gathered.

If *file* is not given the current value of *stdin* in the current scope is used.

If *seps* is not given the string " \t\n" is assumed.

array = gettokens([file [, seps [, terms]]])

Read tokens (that is, strings) from *file*. The tokens are character sequences separated by *seps* and terminated by *terms*. Returns an array of strings, NULL on end of file.

If *seps* is a string, it is interpreted as a set of characters, any sequence of which will separate one token from the next. In this case leading and trailing separators in the input stream are discarded.

If *seps* is an integer it is interpreted as a character code. Tokens are taken to be sequences of characters separated by exactly one of that character.

Terms must be a string. It is interpreted as a set of characters, any one of which will terminate the gathering of tokens. The character which terminated the gathering will be consumed.

If *file* is not given the current value of *stdin* in the current scope will be used.

If *seps* is not given the string " \t" is assumed.

If *terms* is not given the string "\n" is assumed.

For example:

```
forall (token in gettokens(currentfile()))
    printf("<%s>", token)
;   This    is my line    of data.
printf("\n") ; ("\n");
``` when run will print:

```
<This><is><my><line><of><data.>
```

Whereas:

```
forall (token in gettokens(currentfile(), ':', "*"))
    printf("<%s>", token)
;:abc::def:ghi:*
printf("\n");
``` when run will print:

```
<><abc><><def><ghi><>
``` string = gsub(string, string|regexp, string)

gsub performs text substitution using regular expressions. It takes the first parameter, matches it against the second parameter and then replaces the matched portion of the string with the third parameter. If the second parameter is a string it is converted to a regular expression as if the regexp function had been called. Gsub does the replacement multiple times to replace all occurrances of the pattern. It returns the new string formed by the replacement. If there is no match this is original string. The replacement string may contain the special sequence "\&" which is replaced by the string that matched the regular expression. Parenthesized portions of the regular expression may be matched by using \n where n is a decimal digit.

string = implode(array)

Returns a *string* formed from the concatenation of elements of *array*. Integers in the *array* will be interpreted as character codes; strings in the array will be included in the concatenation directly. Other types are ignored.

value = int(x)

Returns an integer interpretation of *x*, or 0 if no reasonable interpretation exists. *x* should be an int, a float, or a string, else 0 will be returned.

subpart = interval(str_or_array, start [, length])

Returns a sub-interval of *str_or_array*, which may be either a string or an array.

If *start* (an integer) is positive the sub-interval starts at that offset (offset 0 is the first element). If *start* is negative the sub-interval starts that many elements from the end of the string (offset -1 is the last element, -2 the second last etc).

If *length* is absent, all the elements from the *start* are included in the interval. Otherwise that many elements are included (or till the end, whichever is smaller).

- 117 -

For example, the last character in a string can be accessed with:

```
last = interval(str, -1);
```

And the first three elements of an array with:

```
first3 = interval(ary, 0, 3);
``` isatom(any)

Return 1 (one) if *any* is an atomic (read-only) object, else 0 (zero). Note that integers, floats and strings are always atomic.

array = keys(struct)

Returns an array of all the keys from *struct*. The order is not predictable, but is repeatable if no elements are added or deleted from the struct between calls and is the same order as taken by a *forall* loop.

float = log(x)

Returns the natural logarithm of *x* (a float).

float = log10(x)

Returns the log base 10 of *x* (a float).

mem = mem(start, nwords [, wordz])

Returns a memory object which refers to a particular area of memory in the ICI interpreter's address space. Note that this is a highly dangerous operation. Many implementations will not include this function or restrict its use. It is designed for diagnostics, embedded systems and controllers. See the *alloc* function above.

file = mopen(mem [, mode])

Returns a *file*, which when read will fetch successive bytes from the given *memory object*. The memory object must have an access size of one (see *alloc* and *mem* above). The file is read-only and the *mode*, if passed, must be one of "r" or "rb".

int = nels(any)

Returns the number of elements in *any*. The exact meaning depends on the type of *any*. If *any* is an:

- *array*   the length of the array is returned; if it is a
- *struct*  the number of key/value pairs is returned; if it is a
- *set*     the number of elements is returned; if it is a

- 118 -

*string*    the number of characters is returned; and if it is a

*mem*    the number of words (either 1, 2 or 4 byte quantities) is returned;

and if it is anything else, one is returned number = num(x)

If *x* is an int or float, it is returned directly. If *x* is a string it will be converted to an int or float depending on its appearance: applying octal and hex interpretations according to the normal ICI source parsing conventions. (That is, if it starts with a 0x it will be interpreted as a hex number, else if it starts with a 0 it will be interpreted as an octal number, else it will be interpreted as a decimal number.)

If *x* can not be interpreted as a number the error *%s is not a number* is generated.

scope = parse(source [, scope])

Parses *source* in a new variable scope, or, if *scope* (a struct) is supplied, in that scope. *Source* may either be a file or a string, and in either case it is the source of text for the parse. If the parse is successful, the variables scope structure of the sub-module is returned. If an explicit scope was supplied this will be that structure.

If *scope* is not supplied a new struct is created for the auto variables. This structure in turn is given a new structure as its super struct for the static variables. Finally, this structure's super is set to the current static variables. Thus the static variables of the current module form the externs of the sub-module.

If *scope* is supplied it is used directly as the scope for the sub-module. Thus the base structure will be the struct for autos, its super will be the struct for statics etc.

For example:

```
static x = 123;
parse("static x = 456;", scope());
printf("x = %d\n", x);
```

When run will print:

```
x = 456
```

Whereas:

```
static x = 123;
parse("static x = 456;");
printf("x = %d\n", x);
```

- 119 -

When run will print:

```
x = 123
```

Note that while the following will work:

```
parse(fopen("my-module.ici"));
```

It is preferable in a large program to use:

```
parse(file = fopen("my-module.ici"));
close(file);
```

In the first case the file will eventually be closed by garbage collection, but exactly when this will happen is unpredictable. The underlying system may only allow a limited number of simultaneous open files. Thus if the program continues to open files in this fashion a system limit may be reached before the unused files are garbage collected.

any = pop(array)

Returns the last element of *array* and reduces the length of *array* by one. If the array was empty to start with, NULL is returned.

file = popen(string, [flags])

Executes a new process, specified as a shell command line as for the *system* function, and returns a file that either reads or writes to the standard input or output of the process according to *mode*. If mode is "r" the reading from the file reads from the standard output of the process. If mode is "w" writing to the file writes to the standard input of the process. If mode is not speicified it defaults to "r".

float = pow(x, y)

Returns $x^y$ where both $x$ and $y$ are floats.

printf([file,] fmt, args...)

Formats a string based on *fmt* and *args* as per *sprintf* (below) and outputs the result to the *file* or to the current value of the *stdout* variable in the current scope if the first parameter is not a file. The current stdout must be a file. See *sprintf*.

any = push(array, any)

Appends *any* to *array*, increasing its length in the process. Returns *any*.

int = rand([seed])

Returns an pseudo random integer in the range 0..0x7FFF. If *seed* (an int) is supplied the random number generator is first seeded with that number. The sequence is predictable based on a given seed.

re = regexp(string)

Returns a compiled regular expression derived from *string*. This is the method of generating regular expressions at run-time, as opposed to the direct lexical form. For example, the following three expressions are similar:

```
str - #*\.c#
str - regexp("*\\.c");
str - $regexp("*\\.c");
``` except that the middle form computes the regular expression each time it is executed. Note that when a regular expression includes a # character the *regexp* function must be used, as the direct lexical form has no method of escaping a #.

Note that regular expressions are intrinsically atomic. Also note that non-equal strings may sometimes compile to the same regular expression.

re = regexpi(string)

Returns a compiled regular expression derived from *string* that is case-insensitive. I.e., the regexp will match a string regardless of the case of alphabetic characters. Note that there is no literal form of regular expressions that has this property.

current = scope([replacement])

Returns the current scope structure. This is a struct whose base element holds the auto variables, the super of that hold the statics, the super of that holds the externs etc. Note that this is a real reference to the current scope structure. Changing, adding and deleting elements of these structures will affect the values and presence of variables in the current scope.

If a *replacement* is given, that struct replaces the current scope structure, with the obvious implications. This should clearly be used with caution. Replacing the current scope with a structure which has no reference to the standard functions also has the obvious effect.

set = set(any...)

Returns a set formed from all the arguments. For example:

```
set()
``` will return a new empty set; and

```
set(1, 2, "a string")
``` will return a new set with three elements, *1*, *2*, and *"the string"*.

- 121 -

This is the run-time equivalent of the set literal. Thus the following two expressions are equivalent:

```
$set(1, 2, "a string")

{set 1, 2, "a string"}
``` x = sin(angle)

Returns the sine of *angle* (a float interpreted in radians).

int = sizeof(any)

Sizeof is the old name of the nels function (described above).

file = sopen(string [, mode])

Returns a *file*, which when read will fetch successive characters from the given *string*. The file is read-only and the *mode*, if passed, must be one of "r" or "rb".

Files are, in general, system dependent. This is the only standard routine which opens a file. But on systems that support byte stream files, the function *fopen* will be set to the most appropriate method of opening a file for general use. The interpretation of *mode* is largely system dependent, but the strings *"r"*, *"w"*, and *"rw"* should be used for read, write, and read-write file access respectively.

sort(array, func)

Sort the content of the array using the heap sort algorithm with func as the comparison function. The comparison function is called with two elements of the array as parameters, *a* and *b*. If *a* is equal to *b* the function should return zero. If *a* is less than *b*, -1, and if *a* is greater than *b*, 1.

For example,

```
static cmp(a, b)
{
    if (a == b)
        return 0;
    if (a < b)
        return -1;
    return 1;
} static a = array(1, 3, 2);

sort(a, cmp);
```

- 122 - string = sprintf(fmt, args...)

Return a formatted string based on *fmt* (a string) and *args*. Most of the usual % format escapes of ANSI C printf are supported. In particular; the integer format letters *diouxXc* are supported, but if a float is provided it will be converted to an int. The floating point format letters *feEgG* are supported, but if the argument is an int it will be converted to a float. The string format letter. *s* is supported and requires a string. Finally the % format to get a single % works.

The flags, precision, and field width options are supported. The indirect field width and precision options with * also work and the corresponding argument must be an int.

For example:

```
sprintf("%08X <%4s> <%-4s>", 123, "ab", "cd")
``` will produce the string:

```
0000007B <  ab> <cd  >
``` and

```
sprintf("%0*X", 4, 123)
``` will produce the string:

```
007B
``` x = sqrt(float)

Returns the square root of *float*.

string = string(any)

Returns a short textual representation of *any*. If *any* is an int or float it is converted as if by a %d or %g format. If it is a string it is returned directly. Any other type will returns its type name surrounded by angle brackets. as in <*struct*>.

struct = struct([super,] key, value...)

Returns a new structure. This is the run-time equivalent of the struct literal. If there are an odd number of arguments the first is used as the super of the new struct; it must be a struct. The remaining pairs of arguments are treated as key and value pairs to initialise the structure with; they may be of any type. For example:

```
struct()
``` returns a new empty struct:

- 123 -

```
struct(anotherStruct)
``` returns a new empty struct which has *anotherStruct* as its super;

```
struct("a", 1, "b", 2)
``` returns a new struct which has two entries *a* and *b* with the values *1* and *2*; and

```
struct(anotherStruct, "a", 1, "b", 2)
``` returns a new struct which has two entries *a* and *b* with the values *1* and *2* and a super of *anotherStruct*.

Note that the super of the new struct is set *after* the assignments of the new elements have been made. Thus the initial elements given as arguments will not affect values in any super struct.

The following two expressions are equivalent:

```
$struct(anotherStruct, "a", 1, "b", 2)
[struct:anotherStruct, a = 1, b = 2]
``` string = sub(string, string|regexp, string)

Sub performs text substitution using regular expressions. It takes the first parameter, matches it against the second parameter and then replaces the matched portion of the string with the third parameter. If the second parameter is a string it is converted to a regular expression as if the regexp function had been called. Sub does the replacement once (unlike gsub). It returns the new string formed by the replacement. If there is no match this is original string. The replacement string may contain the special sequence "\&" which is replaced by the string that matched the regular expression. Parenthesized portions of the regular expression may be matched by using \n where *n* is a decimal digit.

current = super(struct [, replacement])

Returns the current super struct of *struct*, and, if *replacement* is supplied, sets it to a new value. If *replacement* is NULL any current super struct reference is cleared (that is, after this *struct* will have no super).

x = tan(angle)

Returns the tangent of *angle* (a float interpreted in radians).

string = tochar(int)

Returns a one character string made from the character code specified by *int*.

- 124 - string = typeof(any)

Returns the type name (a string) of *any*. See the section on types above for the possible type names.

array = vstack()

Returns a representation of the call stack of the current program at the time of the call. It can be used to perform stack tracebacks and related debugging operations. The result is an array of structures, each of which is a variable scope (see *scope*) structure of succesively deeper nestings of the current function nesting.

event = waitfor(event...)

Blocks (waits) until an *event* indicated by any of its arguments occurs, then returns that argument. The interpretation of an event depends on the nature of each argument. A file argument is triggered when input is available on the file. A float argument waits for that many seconds to expire, an int for that many millisecond (they then return 0, not the argument given). Other interpretations are implementation dependent. Where several events occur simultaneously, the first as listed in the arguments will be returned.

Note that in some implementations some file types may always appear ready for input, despite the fact that they are not.

- 125 -

Unix System Calls

Most Unix implementation of ICI provide access to many of the Unix system calls and other useful C library functions. Note that not all system calls are supported and those that are may be incompletely supported (e.g.. *signal*). Most system call functions return integers, zero if the call succeeded. Errors are reported using ICI's error handling and "system calls" will never return the -1 error return value. If an error is raised by a system call the value of "error" in the error handler will be the error message (as printed by the perror(3) function or returned by the ANSI C strerror() function).

To assist in the use of system calls ICI pre-defines variables to hold the various flags and other values used when calling the system calls. These variables are equivalent to the macros used in C. Not all systems support all these variables. If the C header files do not define a value then ICI will not pre-define the variable.

The following list summarises the Unix system call interface pre-defined variables. See the documentation for the C macros for information as to their use.

Values for open's *flags* parameter,

```
O_RDONLY
O_WRONLY
O_RDWR
O_APPEND
O_CREAT
O_TRUNC
O_EXCL
O_SYNC
O_NDELAY
O_NONBLOCK
```

Values for access's *mode* parameter,

```
R_OK
W_OK
X_OK
F_OK
```

Values for lseek's *whence* parameter,

```
SEEK_SET
SEEK_CUR
SEEK_END
```

- 126 -

The following list summarises the Unix system call interface functions. Following this is a detailed descriptions of each of them.

```
    int = access(string [, int])
    int = creat(string, int)
    int = dup(int [, int])
          exec(string, array)
          exec(string, string...)
    int = lseek(int, int [, int])
    int = open(string, int [, int])
  array = pipe()
 struct = stat(string|int|file)
    int = wait()
 string = ctime(int)
    int = time()
   file = fdopen(int)
          alarm(int)
          acct(string)
          chdir(string)
          chmod(string, int)
          chown(string, int, int)
          chroot(string)
          _close(int)
          _exit(int)
    int = fork()
    int = getpid()
    int = getpgrp()
    int = getppid()
    int = getuid()
    int = geteuid()
    int = getgid()
    int = getegid()
          kill(int, int)
          link(string, string)
          mkdir(string, int)
          mknod(string, int, int)
          nice(int)
          pause()
          rmdir(string)
          setpgrp()
          setuid(int)
```

- 127 -

```
setgid(int)
signal(int, int)
sync()
ulimit(int, int)
umask(int)
unlink(string)
clock()
system(string)
lockf(int, int, int)
sleep(int)
```

- 128 - int = access(string *[*, int*]*)

Call the access(2) function to determine the accessibility of a file. The first parameter is the pathname of the file system object to be tested. The second, optional, parameter is the *mode* (a bitwise combination of R_OK, W_OK and X_OK or the special value, F_OK). If *mode* is not passed F_OK is assumed. Access returns 0 if the file system object is accessible.

int = creat(string, int)

Create a new ordinary file with the given pathname and mode (permissions etc...) and return the file descriptor, open for writing, for the file.

int = dup(int *[*, int*]*)

Duplicate a file descriptor by calling dup(2) or dup2(2) and return a new descriptor. If only a single parameter is passed dup(2) is called otherwise dup2(2) is called.

exec(string, array)

exec(string, string,...)

Execute a new program in the current process. The first parameter to exec is the pathname of an executable file (the program). The remaining parameters are either; an array of strings defining the parameters to be passed to the program, or, a variable number of strings that are passed, in order, to the program as its parameters. The first form is similar to C's execv function and the second form to C's execl functions. Note that no searching of the user's path is performed and the environment passed to the program is that of the current process (i.e., both are implemented by calls to execv(2)).

int = lseek(int, int *[*, int*]*)

Set the read/write position for an open file. The first parameter is the file descriptor associated with the file system object, the second parameter the offset. The third is the *whence* value which determines how the new file position is calculated. The whence value may be one of SEEK_SET, SEEK_CUR or SEEK_END and defaults to SEEK_SET if not specified.

int = open(string, int *[*, int*]*)

Open the named file for reading or writing depending upon the value of the second parameter, *flags*, and return a file descriptor. The second parameter is a bitwise combination of the various O_ values (see above) and if this set includes the O_CREAT flag a third parameter, *mode*, must also be supplied.

array = pipe()

Create a pipe and return an array containing two, integer, file descriptors used to refer to the input and output endpoints of the pipe.

- 129 - struct = stat(string|int|file)

Obtain information on the named file system object, file descriptor or file underlying an ICI file object and return a struct containing that information. If the parameter is a file object that file object must refer to a file opened with ICI's fopen function. The returned struct contains the following keys (which have the same names as the fields of the Unix statbuf structure with the leading "st_" prefix removed).

```
dev
ino
mode
nlink
uid
gid
rdev
size
atime
mtime
ctime
blksize
blocks
```

All values are integers.

int = wait()

Wait until a signal is received or a child process terminates or stops due to tracing and return the status returned by system call.

string = ctime(int)

Convert a time value (see time, below) to a string of the form "Sun Sep 16 01:03:52 1973\n" and return that string. This is primarily of use when converting the time values returned by stat.

int = time()

Return the time since 00:00:00 GMT, Jan. 1, 1970, measured in seconds.

file = fdopen(int [, mode])

Returns a file object that can be used to perform I/O on the specified file descriptor. The file is opened for reading or writing according to *mode* (see *fopen*). If mode is specified "r" (reading) is assumed.

alarm(int)

Schedule a SIGALRM signal to be posted to the current process in the specified number of

- 130 - seconds. If the parameter is zero any alarm is cancelled.

acct(string)

Enable accounting on the specified file.

chdir(string)

Change the process's current working directory to the specified path.

chmod(string, int)

Change the mode of a file system object.

chown(string, int, int)

Change the owner and group identifiers for a file system object.

chroot(string)

Change root directory for process.

_close(int)

Close a file descriptor.

_exit(int)

Exit the current process returning an integer exit status to the parent.

int = fork()

Create a new process. In the parent this returns the process identifier for the newly created process. In the newly created process it returns zero.

int = getpid()

Get the process identifier for the current process.

int = getpgrp()

Get the current process group identifier.

int = getppid()

Get the parent process identifier.

int = getuid()

Get the real user identifier of the owner of the current process.

- 131 - int = geteuid()

Get the effective user identifier for the owner of the current process.

int = getgid()

Get the real group identifier for the current process.

int = getegid()

Get the effective group identifier for the current process.

kill(int, int)

Post a signal to a process.

link(string, string)

Create a link to an existing file.

mkdir(string, int)

Create a directory with the specified mode.

mknod(string, int, int)

Create a special file.

nice(int)

Change the *nice* value of a process.

pause()

Wait until a signal is delivered to the process.

rmdir(string)

Remove a directory.

setpgrp()

Set the process group.

setuid(int)

Set the real and effective user identifier for the current process.

setgid(int)

Set the real and effective group identifier for the current process.

- 132 - signal(int, int)

Control signal handling in the process. Note at present handlers cannot be installed so signals are of limited use in ICI programs.

sync()

Schedule in-memory file data to be written to disk.

ulimit(int, int)

Get and set user limits.

umask(int)

Set file creation mask.

unlink(string)

Remove a file.

system(string)

Execute a system command and return its exit status.

sleep(int)

Suspend the process for the specified number of seconds.

Sockets Interface

The *sockets* extension is available on systems that provide BSD-compatible sockets calls. The extension allows ICI programs to access network functions. The sockets extension is generally compatible with the C sockets functions but uses types and calling semantics more akin to the ICI environment.

The sockets extension introduces a new type, *socket*, to hold socket objects. The new intrinsic function, *socket*, returns a socket object.

Network Addresses

The sockets interfaces specifies IP network addresses using strings. Network addresses are of the form *port@host* where the @host part is optional. The port may be specified as an integer number or a string which is looked up in the services database. If the port is a service name it may be in the form *name/protocol* with protocol being either *tcp* or *udp*. The host portion of the address may be a domain name, an IP address in dotted decimal notation or one of the special addresses local ("." - dot), any ("?") or all ("*"). If the host portion is omitted the default host depends on the context. See the descriptions of the *connect* and *bind* functions below.

- 133 -

The following list summarises the sockets interface functions. Following this is a detailed descriptions of each of them.

```
        skt = socket(string)
        skt = listen(skt)
        skt = accept(skt)
        skt = connect(skt, string)
        skt = bind(skt, string)
     struct = select([int,] set [, set [, set]])
        int = getsockopt(skt, string)
              setsockopt(skt, string, int)
     string = domainname()
     string = hostname()
     string = username([int])
     string = getpeername(skt)
     string = getsockname(skt)
              sendto(skt, string, string)
     struct = recvfrom(skt, int)
              send(skt, string)
     string = recv(skt, int)
        int = getportno(skt)
     string = gethostbyname(string)
        int = sktno(skt)
       file = sktopen(skt [, mode])
``` skt = socket(string)

Create and return a new socket object of the specified protocol. The string, the protocol, may be one of *tcp* or *udp*. For example,

```
    skt = socket("tcp");
``` skt = accept(skt)

Accept a connection to a TCP socket and return a new socket for that connection.

skt = listen(skt)

Allow connections to a TCP socket. Returns the socket passed.

skt = connect(skt, address)

Establish a TCP connection to the specified address or associate the address with as the destination for messages on a UDP socket. If the host portion of the address is not specified "." (dot) is used to connect to the local host. The original socket is returned.

```
skt = bind(skt, address)
```

Associate a local address for the socket (TCP or UDP). If the host portion of the address is not specified "*" (any) is used. Returns the socket.

```
struct = select([int,] set|NULL [, set|NULL [, set|NULL]])
```

Check sockets for I/O readiness with optional timeout. Select may be passed up to three sets of sockets that are checked for readiness to perform I/O. The first set holds the sockets to test for input pending, the second set the sockets to test for output able and the third set the sockets to test for exceptional states. NULL may be passed in place of a set parameter to avoid passing empty sets. An integer may also appear in the parameter list. This integer specifies the number of milliseconds to wait for the sockets to become ready. If a zero timeout is passed the sockets are polled to test their state. If no timeout is passed the call blocks until at least one of the sockets is ready for I/O.

The result of select is a struct containing three sets, of sockets, identified by the keys read, write and except.

```
int = getsockopt(skt, string, int)
```

Retrieve the value of a socket *option*. A socket may have various attributes associated with it. These are accessed via the getsockopt and setsockopt functions. The attributes are identified using string keys from the following list.

```
    debug
    reuseaddr
    keepalive
    dontroute
    useloopback
    linger
    broadcast
    oobinline
    sndbuf
    rcvbuf
    type
    error
```

```
setsockopt(skt, string, int)
```

Set a socket option (see getsockopt for option names) to the integer value.

```
string = domainname()
```

Return the domain name of the current host.

```
string = hostname()
```

Return the name of the current host.

- 135 -

```
string = username([int])
```

Return the name of the owner of the current process or if an integer, user number, is passed, of that user.

```
string = getpeername(skt)
```

Return the address of the *peer* of a TCP socket.

```
string = getsockname(skt)
```

Return the local address of a socket.

```
sendto(skt, string, string)
```

Send the data in the second parameter to the specified address.

```
struct = recvfrom(skt, int)
```

Receive a message on a socket and return a struct containing the data of the message, in string, and the source address of the data. The int parameter gives the maximum number of bytes to receive. The result is a struct with the keys msg and addr used to access the returned information.

```
send(skt, string)
```

Send the content of the string on a socket.

```
string = recv(skt, int)
```

Receive data from a socket and return it as a string. The int parameter fives the maximum size of message that will be received.

```
int = getportno(skt)
```

Return the local port number assigned to a TCP or UDP socket.

```
string = gethostbyname(string)
```

Match a network address against the hosts database and return a hostname.

```
int = sktno(skt)
```

Return the file descriptor associated with a socket.

```
file = sktopen(skt [, mode])
```

Open a socket as a file, for input or output according to *mode* (see *fopen*).

Future things

Structures should have multiple inheritance. I.e., an array of super structs.

There are a few missing maths functions: round.

There is no built in deepcopy(), deepequal(), and deepatom(). They can be coded fairly easily in ICI (ignoring recusive data structures). But there should be.

The claims defining the invention are as follows.

I claim:

1. A method for displaying a grouped structure in a computer graphics image, said method comprising the steps of:
   providing at least one selection tag for said grouped structure;
   utilising a group display mode, whereby portions of the structure of said grouped structure are determined when a selection tag of said grouped structure is selected in said group display mode; and
   displaying said portions of the structure of said grouped structures.

2. The method according to claim 1, wherein said displayed portions initially comprise a top level portion of said grouped structure, and said method further comprises providing a means for displaying further levels of said grouped structure.

3. The method according to claim 1, wherein said step of displaying said portions of said grouped structure includes a step of displaying said portions in a tree format.

4. The method according to claim 3, wherein said tree format includes nodes denoting part of said grouped structure, and said method further comprises the steps of:
   providing means for selecting a current node within said tree format; and
   displaying at least the child nodes, if any, of said current node upon selection of said current node.

5. The method according to claim 1, further comprising the step of providing means for selecting a sub-portion of said displayed portions of said grouped structure and providing interactive access to said selected sub-portion.

6. An apparatus for displaying a grouped structure in a computer graphics image, comprising:
   means for providing at least one selection tag for said grouped structure,
   means for providing a group display mode and for determining portions of the structure of said grouped structure in response to selection of a selection tag of said grouped structure in a group display mode; and
   means for displaying said portions of the structure of said grouped structures, said display means coupled to said group display mode means.

7. The apparatus according to claim 6, wherein said means for displaying said portions displays a top level portion of said grouped structure and further comprises means for displaying further levels of said grouped structure.

8. The apparatus according to claim 6, wherein said means for displaying said portions includes means for displaying said portions in a tree format.

9. The apparatus according to claim 8, wherein said tree format includes nodes denoting part of said grouped structure.

10. The apparatus according to claim 9, further comprising:
    means for selecting a current node within said tree format; and
    means for displaying at least the child nodes, if any, of said current node in response to selection of said current node.

11. The apparatus according to claim 6, further comprising:
    means for selecting a sub-portion of said displayed portions of said grouped structure; and
    means for interactively accessing said selected sub-portion.

12. A computer program product comprising a computer readable medium having a computer program recorded thereon for displaying a grouped structure in a computer graphics image, said computer program product comprising:
    means for providing at least one selection tag for said grouped structure;
    means for utilizing a group display mode, whereby portions of the structure of said grouped structure are determined when a selection tag of said grouped structure is selected in said group display mode; and
    means for displaying said portions of the structure of said grouped structures.

13. The computer program product according to claim 12, wherein said displayed portions initially comprise a top level portion of said grouped structure, and further comprising means for displaying further levels of said grouped structure.

14. The computer program product according to claim 12, wherein said displaying of said portions of said grouped structure includes displaying said portions in a tree format.

15. The computer program product according to claim 14, wherein said tree format includes nodes denoting part of said grouped structure, and further comprises:
    means for selecting a current node within said tree format; and
    means for displaying at least the child nodes, if any, of said current node upon selection of said current node.

16. The computer program product according to claim 12, further comprising means for selecting a sub-portion of said displayed portions of said grouped structure and providing interactive access to said selected sub-portion.

17. Computer apparatus for displaying a grouped structure in a computer graphics image, said apparatus comprising:
    at least one data entry device operable by a user of said apparatus;
    a video display device;
    a computer module operatively coupled to said data entry device and said video display device and including a storage device for storing information related to said computer graphics image and a processor arranged to process said information, said computer module further comprising:
    means for providing at least one selection tag for said grouped structure;
    means for providing a group display mode and for determining portions of the structure of said grouped structure in response to selection of a selection tag of said grouped structure in a group display mode; and
    means, operatively coupled to said group display mode means of said computer module, for displaying on said video display device said portions of the structure of said grouped structures.

18. Computer apparatus according to claim 17, wherein said display device displays a top level portion of said grouped structure, and said computer module further comprises means for displaying on said video display device further levels of said grouped structure.

19. Computer apparatus according to claim 17, wherein means for displaying said portions of said grouped structure includes means for displaying said portions in a tree format.

20. Computer apparatus according to claim 19, wherein said tree format includes nodes denoting part of said grouped structure.

21. Computer apparatus according to claim 20, wherein said computer module further comprising:

means for selecting a current node within said tree format; and means for displaying on said display means at least the child nodes, if any, of said current node in response to selection of said current node.

22. Computer apparatus according to claim 17, further comprising;

means for selecting a sub-portion of said displayed portions of said grouped structure; and means for interactively accessing said selected sub-portion.

23. A method of controlling the display of an image, said method comprising the steps of:

displaying a grouped image on a display screen;

designating a desired portion of the displayed image;

displaying a tag according to the designating step; and displaying a component image corresponding to the selection tag.

24. The method according to claim 23, wherein said displayed component image initially comprises a top level portion of said grouped image, and said method further comprises the step of displaying further levels of said grouped image.

25. The method according to claim 24, wherein said step of displaying said component image of said grouped image includes a step of displaying said portions in a tree format.

26. The method according to claim 25, wherein said tree format includes nodes denoting part of said grouped image, and said method further comprises the steps of:

selecting a current node within said tree format; and displaying at least the child nodes, if any, of said current node upon selection of said current node.

27. The method according to claim 24, further comprising the step of selecting a sub-portion of said displayed portions of said grouped image and providing interactive access to said selected sub-portion.

* * * * *

UNITED STATES PATENT AND TRADEMARK OFFICE
CERTIFICATE OF CORRECTION

PATENT NO.    : 6,020,899
DATED         : Februry 1, 2000
INVENTOR(S)   : Timothy M. Long It is certified that error appears in the above-identified patent and that said Letters Patent is hereby corrected as shown below:

<u>Title page,</u>
Item [73], Assignees, "Austrailia" should read -- Australia --.
Item [57], ABSTRACT,
Line 5, "tar" should read -- tag --.

<u>Column 1,</u>
Line 25, "entiry" should read -- entity -- and "resealing," should read -- rescaling, --.
Line 37, "chanced" should read -- changed --.

<u>Column 3,</u>
Line 63, "left-had" should read -- left-hand --.
Line 65, "point 3" should read -- point 5 --.

<u>Column 6,</u>
Line 18, "verge" should read -- very --.

<u>Column 205,</u>
Last line, "stre = getline ([file])" should read -- string = getline ([file]) --.

<u>Column 221,</u>
Last line, "set     the number of elements is returned: if it is a" should read
-- set     the number of elements is returned; if it is a --.

<u>Column 225,</u>
Last line, "dom number generator is first seeded with that member. The sequence is predictable based" should read -- dom number generator is first seeded with that number. The sequence is predictable based --.

<u>Column 239,</u>
Last line, "setuid(int)" should read -- setuid (int) --.

<u>Column 255,</u>
Last line, Return the name of the current host" should read -- Return the name of the current host --.

UNITED STATES PATENT AND TRADEMARK OFFICE
CERTIFICATE OF CORRECTION

PATENT NO.    : 6,020,899
DATED         : Februry 1, 2000
INVENTOR(S)   : Timothy M. Long It is certified that error appears in the above-identified patent and that said Letters Patent is hereby corrected as shown below:

Column 257,
Last line, "Structures should have multiple inheritance. I.e., an array of super structs" should read -- Structures should have multiple inheritance. I.e., an array of super structs --.

Signed and Sealed this

Eleventh Day of March, 2003

JAMES E. ROGAN
*Director of the United States Patent and Trademark Office*